US012102577B2

(12) United States Patent
Meyer et al.

(10) Patent No.: US 12,102,577 B2
(45) Date of Patent: Oct. 1, 2024

(54) MATTRESS BLADDER CONTROL USING A BLEED VALVE

(71) Applicant: Hill-Rom Services, Inc., Batesville, IN (US)

(72) Inventors: Eric R. Meyer, Greensburg, IN (US); Darrell Borgman, Batesville, IN (US); Timothy Joseph Receveur, Guilford, IN (US); Gregory W. Branson, Batesville, IN (US); Sandy Mark Richards, Pershing, IN (US); Howard J. Boyd, Troy, OH (US); David W. Hornbach, Brookville, IN (US); Robert Mark Zerhusen, Cincinnati, OH (US); James Maurice Allen, Batesville, IN (US); Jennifer Fearing, West Chester, OH (US); Mark S. Chiacchira, Lawrenceburg, IN (US); Jonathan D. Turner, Dillsboro, IN (US); Mark Lanning, Mt. Pleasant, SC (US); Aziz A. Bhai, Fishers, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 1049 days.

(21) Appl. No.: 17/024,858

(22) Filed: Sep. 18, 2020

(65) Prior Publication Data

US 2021/0000669 A1 Jan. 7, 2021

Related U.S. Application Data

(63) Continuation of application No. 15/784,281, filed on Oct. 16, 2017, now Pat. No. 10,806,655, which is a (Continued)

(51) Int. Cl.
*A61G 7/015* (2006.01)
*A61G 7/002* (2006.01)
(Continued)

(52) U.S. Cl.
CPC ............ *A61G 7/015* (2013.01); *A61G 7/002* (2013.01); *A61G 7/0509* (2016.11); (Continued)

(58) Field of Classification Search
CPC ........ A61G 7/001; A61G 7/002; A61G 7/015; A61G 7/018; A61G 7/0509; A61G 7/0514;
(Continued)

(56) References Cited

U.S. PATENT DOCUMENTS 1,772,310 A * 8/1930 Hart ...................... A61G 7/001 91/40
2,538,993 A 1/1951 Travis
(Continued)

FOREIGN PATENT DOCUMENTS

EP 2433605 3/2012
EP 2574322 9/2012
(Continued)

OTHER PUBLICATIONS

Extended EP Search Report for Application No. 13807132.9, dated Sep. 8, 2015 (9 pages).
(Continued)

*Primary Examiner* — David R Hare
(74) *Attorney, Agent, or Firm* — Barnes & Thornburg LLP

(57) ABSTRACT

The present disclosure relates to patient support systems, such as hospital beds, and particularly to reconfigurable patient support systems movable among a number of different positions. The present disclosure further relates to (Continued)

control algorithms and interfaces for use in patient support systems.

20 Claims, 36 Drawing Sheets

Related U.S. Application Data continuation of application No. 14/409,271, filed as application No. PCT/US2013/046796 on Jun. 20, 2013, now Pat. No. 9,833,369, said application No. 15/784,281 is a continuation-in-part of application No. 13/828,186, filed on Mar. 14, 2013, now Pat. No. 9,329,076, and a continuation-in-part of application No. 13/798,359, filed on Mar. 13, 2013, now Pat. No. 9,228,885.

(60) Provisional application No. 61/722,663, filed on Nov. 5, 2012, provisional application No. 61/663,311, filed on Jun. 22, 2012, provisional application No. 61/662,711, filed on Jun. 21, 2012.

(51) Int. Cl.
*A61G 7/018* (2006.01)
*A61G 7/05* (2006.01)
*A61G 7/057* (2006.01)
*A61G 7/16* (2006.01)

(52) U.S. Cl.
CPC .......... *A61G 7/0514* (2016.11); *A61G 7/0524* (2016.11); *A61G 7/05715* (2013.01); *A61G 7/05769* (2013.01); *A61G 7/05776* (2013.01); *A61G 7/018* (2013.01); *A61G 7/16* (2013.01); *A61G 2203/16* (2013.01); *A61G 2203/42* (2013.01); *A61G 2203/44* (2013.01); *A61G 2203/74* (2013.01); *A61G 2205/50* (2013.01)

(58) Field of Classification Search
CPC .. A61G 7/0524; A61G 7/053; A61G 7/05715; A61G 7/05769; A61G 7/05776; A61G 7/05792; A61G 7/16; A61G 2203/16; A61G 2203/20; A61G 2203/32; A61G 2203/34; A61G 2203/42; A61G 2203/44; A61G 2203/726; A61G 2203/74; A61G 2203/78; A61G 2205/50
USPC .............................................................. 5/710
See application file for complete search history.

(56) References Cited

U.S. PATENT DOCUMENTS

| | | | | | |
|---|---|---|---|---|---|
| 3,340,550 | A | | 9/1967 | Hopkins et al. | |
| 3,340,551 | A | | 9/1967 | Hopkins | |
| 3,354,476 | A | | 11/1967 | Scales et al. | |
| 3,428,973 | A | | 2/1969 | Hargest et al. | |
| 3,434,165 | A | | 3/1969 | Keane | |
| 3,485,240 | A | * | 12/1969 | Fountain | A61G 7/001 5/624 |
| 3,492,988 | A | | 2/1970 | De Mare | |
| 3,644,950 | A | | 2/1972 | Lindsay, Jr. | |
| 3,674,019 | A | | 7/1972 | Grant | |
| 3,757,366 | A | | 9/1973 | Sacher | |
| 3,775,781 | A | * | 12/1973 | Bruno | A61G 7/001 5/607 |
| 3,778,851 | A | | 12/1973 | Howorth | |
| 3,822,425 | A | * | 7/1974 | Scales | A61G 7/05769 5/699 |
| 3,867,732 | A | | 2/1975 | Morrell | |
| 4,127,906 | A | | 12/1978 | Zur | |
| 4,193,149 | A | | 3/1980 | Welch | |
| 4,224,706 | A | | 9/1980 | Young et al. | |
| 4,279,044 | A | | 7/1981 | Douglas | |
| 4,347,633 | A | | 9/1982 | Gammons et al. | |
| 4,357,722 | A | | 11/1982 | Thompson | |
| 4,391,009 | A | | 7/1983 | Schild et al. | |
| 4,394,784 | A | | 7/1983 | Swenson et al. | |
| 4,411,035 | A | | 10/1983 | Fenwick | |
| 4,435,864 | A | | 3/1984 | Callaway et al. | |
| 4,483,030 | A | | 11/1984 | Flick et al. | |
| 4,525,409 | A | | 6/1985 | Elesh | |
| 4,525,885 | A | | 7/1985 | Hunt et al. | |
| 4,628,557 | A | | 12/1986 | Murphy | |
| 4,638,519 | A | | 1/1987 | Hess | |
| 4,803,744 | A | | 2/1989 | Peck et al. | |
| 4,852,195 | A | * | 8/1989 | Schulman | A61G 7/05776 297/DIG. 8 |
| 4,862,529 | A | | 9/1989 | Peck | |
| 4,897,890 | A | | 2/1990 | Walker | |
| 4,944,060 | A | | 7/1990 | Peery et al. | |
| 4,951,335 | A | | 8/1990 | Eady | |
| 4,953,247 | A | | 9/1990 | Hasty | |
| 4,962,552 | A | | 10/1990 | Hasty | |
| 4,970,743 | A | | 11/1990 | Wride et al. | |
| 4,977,633 | A | | 12/1990 | Chaffee | |
| 4,982,466 | A | | 1/1991 | Higgins et al. | |
| 4,986,738 | A | | 1/1991 | Kawasaki et al. | |
| 4,991,244 | A | | 2/1991 | Walker et al. | |
| 4,993,920 | A | * | 2/1991 | Harkleroad | A47C 27/082 417/63 |
| 4,999,867 | A | | 3/1991 | Toivio et al. | |
| 5,003,654 | A | | 4/1991 | Vrzalik | |
| 5,005,240 | A | | 4/1991 | Vrzalik | |
| 5,007,123 | A | | 4/1991 | Salyards | |
| 5,010,608 | A | | 4/1991 | Barnett et al. | |
| 5,018,786 | A | | 5/1991 | Goldstein et al. | |
| 5,022,110 | A | | 6/1991 | Stroh | |
| 5,023,967 | A | | 6/1991 | Ferrand | |
| 5,044,029 | A | | 9/1991 | Vrzalik | |
| 5,044,364 | A | | 9/1991 | Crowther | |
| 5,052,068 | A | | 10/1991 | Graebe | |
| 5,060,174 | A | | 10/1991 | Gross | |
| 5,060,896 | A | | 10/1991 | Hobbins | |
| 5,062,169 | A | | 11/1991 | Kennedy et al. | |
| 5,068,933 | A | | 12/1991 | Sexton et al. | |
| 5,083,335 | A | | 1/1992 | Krouskop et al. | |
| 5,095,568 | A | | 3/1992 | Thomas et al. | |
| 5,103,519 | A | * | 4/1992 | Hasty | A61G 7/05776 5/624 |
| 5,129,117 | A | | 7/1992 | Celestina et al. | |
| 5,142,719 | A | | 9/1992 | Vrzalik et al. | |
| 5,142,720 | A | * | 9/1992 | Kelso | A61G 7/001 5/648 |
| 5,152,021 | A | | 10/1992 | Vrzalik et al. | |
| 5,157,800 | A | | 10/1992 | Borders et al. | |
| 5,170,364 | A | | 12/1992 | Gross et al. | |
| 5,179,742 | A | | 1/1993 | Oberle | |
| 5,216,768 | A | | 6/1993 | Bodine et al. | |
| 5,251,349 | A | | 10/1993 | Thomas et al. | |
| 5,267,364 | A | | 12/1993 | Volk | |
| 5,269,030 | A | | 12/1993 | Pahno et al. | |
| 5,277,474 | A | | 1/1994 | Hannagan et al. | |
| 5,325,551 | A | | 7/1994 | Tappel et al. | |
| 5,331,698 | A | | 7/1994 | Newkirk et al. | |
| 5,335,384 | A | | 8/1994 | Foster et al. | |
| 5,367,728 | A | | 11/1994 | Chang et al. | |
| 5,370,439 | A | | 12/1994 | Lowe et al. | |
| 5,375,273 | A | | 12/1994 | Bodine et al. | |
| 5,438,721 | A | | 8/1995 | Pahno et al. | |
| 5,454,126 | A | | 10/1995 | Foster et al. | |
| 5,479,666 | A | | 1/1996 | Foster et al. | |
| 5,483,709 | A | | 1/1996 | Foster et al. | |
| 5,487,196 | A | | 1/1996 | Wilkinson et al. | |
| 5,493,742 | A | | 2/1996 | Klearman et al. | |
| 5,509,155 | A | | 4/1996 | Zigarac et al. | |
| 5,513,406 | A | | 5/1996 | Foster et al. | |
| 5,539,943 | A | | 7/1996 | Romano | |
| 5,542,136 | A | | 8/1996 | Tappel | |
| 5,560,057 | A | | 10/1996 | Madsen et al. | |
| 5,586,346 | A | | 12/1996 | Stacy et al. | |

(56) References Cited

U.S. PATENT DOCUMENTS

| | | | | |
|---|---|---|---|---|
| 5,592,706 | A | 1/1997 | Pearce | |
| 5,603,133 | A | 2/1997 | Vrzalik et al. | |
| 5,606,754 | A | 3/1997 | Hand et al. | |
| 5,611,096 | A * | 3/1997 | Bartlett | A61G 7/001 5/713 |
| 5,630,238 | A | 5/1997 | Weismiller et al. | |
| 5,647,079 | A | 7/1997 | Hakamiun et al. | |
| 5,664,270 | A | 9/1997 | Bell et al. | |
| 5,666,681 | A | 9/1997 | Meyer et al. | |
| 5,669,094 | A | 9/1997 | Swanson | |
| 5,687,438 | A | 11/1997 | Biggie et al. | |
| 5,699,570 | A * | 12/1997 | Wilkinson | A61G 7/05792 5/713 |
| 5,715,548 | A | 2/1998 | Weismiller | |
| 5,729,853 | A | 3/1998 | Thompson et al. | |
| 5,755,000 | A | 5/1998 | Thompson et al. | |
| 5,781,949 | A | 7/1998 | Weismiller et al. | |
| 5,787,534 | A | 8/1998 | Hargest et al. | |
| 5,790,997 | A | 8/1998 | Ruehl | |
| 5,815,864 | A | 10/1998 | Sloop | |
| 5,829,081 | A | 11/1998 | Pearce | |
| 5,870,785 | A | 2/1999 | Hoorens | |
| 5,882,349 | A | 3/1999 | Wilkerson et al. | |
| 5,887,304 | A | 3/1999 | von der Heyde | |
| 5,904,172 | A | 5/1999 | Gifft et al. | |
| 5,926,884 | A | 7/1999 | Biggie et al. | |
| 5,983,429 | A | 11/1999 | Stacy et al. | |
| 6,008,598 | A | 12/1999 | Luff | |
| 6,012,186 | A | 1/2000 | Soltani et al. | |
| 6,021,533 | A | 2/2000 | Ellis et al. | |
| 6,047,424 | A | 4/2000 | Osborne et al. | |
| 6,056,353 | A | 5/2000 | Meara | |
| 6,062,215 | A | 5/2000 | Leininger et al. | |
| 6,073,291 | A | 6/2000 | Davis et al. | |
| 6,079,090 | A | 6/2000 | Ongaro | |
| 6,085,372 | A | 7/2000 | James et al. | |
| 6,115,860 | A | 9/2000 | Vrzalik | |
| 6,119,291 | A | 9/2000 | Osborne et al. | |
| 6,126,152 | A | 10/2000 | Santos et al. | |
| 6,145,142 | A | 11/2000 | Rechin et al. | |
| 6,148,461 | A | 11/2000 | Cook et al. | |
| 6,155,641 | A | 12/2000 | Frost | |
| 6,163,903 | A | 12/2000 | Weismiller et al. | |
| 6,202,239 | B1 | 3/2001 | Ward et al. | |
| 6,282,737 | B1 | 9/2001 | Vrzalik | |
| 6,295,675 | B1 | 10/2001 | Ellis et al. | |
| 6,339,410 | B1 | 1/2002 | Milner et al. | |
| 6,347,420 | B2 | 2/2002 | Elliott | |
| 6,370,716 | B1 * | 4/2002 | Wilkinson | A61G 5/1043 297/452.41 |
| 6,421,859 | B1 | 7/2002 | Hicks et al. | |
| 6,430,763 | B2 | 8/2002 | Kosumsuppamala et al. | |
| 6,499,167 | B1 | 12/2002 | Ellis et al. | |
| 6,510,573 | B1 | 1/2003 | Grabe | |
| 6,516,480 | B2 | 2/2003 | Elliott | |
| 6,536,056 | B1 | 3/2003 | Vrzalik et al. | |
| 6,584,628 | B1 | 7/2003 | Smith et al. | |
| 6,698,046 | B1 | 3/2004 | Wu | |
| 6,708,352 | B2 | 3/2004 | Salvatini et al. | |
| 6,715,171 | B2 | 4/2004 | Grabe | |
| 6,721,980 | B1 | 4/2004 | Price et al. | |
| 6,730,115 | B1 | 5/2004 | Heaton | |
| 6,735,799 | B1 | 5/2004 | Ellis et al. | |
| 6,745,996 | B1 | 6/2004 | Guthrie | |
| 6,782,574 | B2 | 8/2004 | Totton et al. | |
| 6,813,790 | B2 * | 11/2004 | Flick | A47C 27/082 5/713 |
| 6,855,158 | B2 | 2/2005 | Stolpmann | |
| 6,892,405 | B1 * | 5/2005 | Dimitriu | A61G 7/001 5/713 |
| 6,928,681 | B1 * | 8/2005 | Stacy | A61G 7/05776 5/713 |
| 6,942,687 | B1 | 9/2005 | Heaton et al. | |
| 6,953,439 | B1 | 10/2005 | Kabemba | |
| 7,007,330 | B2 * | 3/2006 | Kuiper | A61G 7/1021 5/733 |
| 7,036,166 | B2 | 5/2006 | Kramer et al. | |
| 7,036,171 | B2 | 5/2006 | Wu | |
| 7,086,107 | B2 | 8/2006 | Ellis et al. | |
| 7,171,711 | B2 | 2/2007 | Gowda | |
| 7,216,389 | B2 | 5/2007 | Ellis et al. | |
| 7,253,366 | B2 | 8/2007 | Bhai | |
| 7,260,860 | B2 | 8/2007 | Chambers et al. | |
| 7,296,312 | B2 | 11/2007 | Menkedick et al. | |
| 7,296,315 | B2 | 11/2007 | Totton et al. | |
| 7,319,386 | B2 | 1/2008 | Collins, Jr. et al. | |
| 7,330,127 | B2 | 2/2008 | Price et al. | |
| 7,334,280 | B1 | 2/2008 | Swartzburg | |
| 7,346,945 | B2 * | 3/2008 | Phillips | A61G 7/0514 5/616 |
| 7,441,290 | B1 | 10/2008 | Flick | |
| 7,458,119 | B2 | 12/2008 | Hornbach et al. | |
| 7,469,436 | B2 | 12/2008 | Meyer et al. | |
| 7,512,998 | B2 | 4/2009 | Martin et al. | |
| 7,515,059 | B2 | 4/2009 | Price et al. | |
| 7,520,012 | B2 | 4/2009 | Robins | |
| 7,538,659 | B2 | 5/2009 | Ulrich et al. | |
| 7,587,776 | B2 * | 9/2009 | Poulos | A61G 7/05776 5/713 |
| 7,610,637 | B2 | 11/2009 | Menkedick | |
| 7,610,638 | B2 | 11/2009 | Kramer et al. | |
| 7,644,460 | B2 | 1/2010 | Calvo | |
| 7,712,171 | B2 * | 5/2010 | Butler | A61G 7/05715 5/81.1 R |
| 7,779,547 | B2 | 8/2010 | Townsend | |
| 7,797,771 | B1 | 9/2010 | Bossen et al. | |
| 7,861,334 | B2 | 1/2011 | Lemire et al. | |
| 7,926,131 | B2 | 4/2011 | Menkedick | |
| 8,028,359 | B2 | 10/2011 | Parson et al. | |
| 8,037,563 | B2 | 10/2011 | Richards et al. | |
| 8,051,512 | B2 | 11/2011 | Teeter | |
| RE43,193 | E | 2/2012 | Osborne | |
| 8,108,957 | B2 | 2/2012 | Richards et al. | |
| 8,127,380 | B2 | 3/2012 | Wurdeman | |
| 8,245,341 | B2 | 8/2012 | Oh | |
| 8,381,337 | B2 | 2/2013 | Zerhusen et al. | |
| 8,413,273 | B2 | 4/2013 | Hornbach et al. | |
| 8,474,074 | B2 | 7/2013 | O'Keefe et al. | |
| 8,474,921 | B2 | 7/2013 | Newkirk et al. | |
| 8,555,438 | B2 | 10/2013 | Turner et al. | |
| 8,640,285 | B2 | 2/2014 | Heimbrock et al. | |
| 8,677,535 | B2 | 3/2014 | Turner | |
| 8,756,735 | B2 | 6/2014 | Heimbrock et al. | |
| 8,844,078 | B2 | 9/2014 | Hornbach et al. | |
| 8,997,287 | B2 | 4/2015 | Lanning et al. | |
| 9,228,885 | B2 | 1/2016 | Zerhusen et al. | |
| 9,329,076 | B2 | 5/2016 | Meyer et al. | |
| 9,833,369 | B2 | 12/2017 | Meyer et al. | |
| 10,806,655 | B2 | 10/2020 | Meyer et al. | |
| 2001/0033925 | A1 | 10/2001 | Trapp et al. | |
| 2002/0111701 | A1 | 8/2002 | Borders | |
| 2002/0152551 | A1 | 10/2002 | Perez et al. | |
| 2004/0163181 | A1 * | 8/2004 | Wu | A61G 7/05776 5/713 |
| 2004/0189073 | A1 | 9/2004 | Chadwick et al. | |
| 2006/0019581 | A1 | 1/2006 | Zhang et al. | |
| 2006/0026765 | A1 | 2/2006 | Hornbach et al. | |
| 2006/0085914 | A1 | 4/2006 | Peterson et al. | |
| 2006/0101581 | A1 | 5/2006 | Blanchard et al. | |
| 2007/0050910 | A1 | 3/2007 | Blanchard et al. | |
| 2007/0143928 | A1 | 6/2007 | Biggie et al. | |
| 2007/0157385 | A1 | 7/2007 | Lemire et al. | |
| 2007/0163043 | A1 | 7/2007 | Lemire et al. | |
| 2007/0169268 | A1 | 7/2007 | Lemire | |
| 2007/0174965 | A1 | 8/2007 | Lemire et al. | |
| 2007/0210917 | A1 | 9/2007 | Collins et al. | |
| 2008/0109964 | A1 | 5/2008 | Flocard | |
| 2008/0201851 | A1 | 8/2008 | Menkedick | |
| 2009/0000033 | A1 | 1/2009 | Hempker | |
| 2009/0038074 | A1 | 2/2009 | Barthelt | |
| 2009/0044334 | A1 | 2/2009 | Parsell et al. | |
| 2009/0212925 | A1 | 8/2009 | Schuman, Sr. et al. | |
| 2009/0212926 | A1 | 8/2009 | Du et al. | |

(56) References Cited

U.S. PATENT DOCUMENTS

| | | | | |
|---|---|---|---|---|
| 2009/0217080 | A1 | 8/2009 | Ferguson et al. | |
| 2010/0064439 | A1 | 3/2010 | Soltani | |
| 2010/0244522 | A1 | 9/2010 | Fukai | |
| 2010/0293718 | A1 | 11/2010 | Wurdeman | |
| 2011/0035879 | A1 | 2/2011 | Grinstead et al. | |
| 2011/0047704 | A1 | 3/2011 | DeBraal et al. | |
| 2011/0277242 | A1 | 11/2011 | Dionne et al. | |
| 2012/0005832 | A1 | 1/2012 | Turner et al. | |
| 2012/0023673 | A1 | 2/2012 | Hornbach | |
| 2012/0047655 | A1 | 3/2012 | O'Keefe | |
| 2012/0054965 | A1 | 3/2012 | Kummer et al. | |
| 2012/0060290 | A1 | 3/2012 | Jones et al. | |
| 2012/0079662 | A1* | 4/2012 | Dzioba .................. | A47C 27/10 5/713 |
| 2012/0089419 | A1 | 4/2012 | Huster et al. | |
| 2012/0096644 | A1 | 4/2012 | Heimbrock | |
| 2012/0124744 | A1 | 5/2012 | Hornbach | |
| 2012/0124746 | A1 | 5/2012 | Andrienko | |
| 2012/0144584 | A1 | 6/2012 | Vrzalik et al. | |
| 2012/0144588 | A1 | 6/2012 | Heimbrock | |
| 2012/0198627 | A1 | 8/2012 | Turner et al. | |
| 2015/0182400 | A1 | 7/2015 | Meyer et al. | |
| 2017/0224560 | A1 | 8/2017 | Meyer et al. | |

FOREIGN PATENT DOCUMENTS

| | | |
|---|---|---|
| GB | 932779 | 7/1963 |
| GB | 1545806 | 5/1979 |
| GB | 2134379 | 5/1984 |
| JP | 2001-513384 | 9/2001 |
| JP | 2004-57601 | 2/2024 |
| WO | 8809651 | 12/1988 |
| WO | 9427544 | 12/1994 |
| WO | 9909865 | 3/1999 |

OTHER PUBLICATIONS

User Manual, Total Care Bed System and Total Care Duo 2 System, by Hill-Rom, Inc., 2008.

Service Manual, Total Care Bed System, by Hill-Rom, Inc., 2008.

PCT International Search Report for PCT/US2013/046796, dated Jun. 20, 2013, 5 pages.

Supplemental Partial European Search Report for Application No. 13807132.9 completed on May 12, 2015 (9 pages).

JP Office Action with English translation dated Jan. 12, 2016 (6 pages).

EP partial supplementary search report for Application No. 13807132.9, dated May 20, 2015 (5 pages).

Communication pursuant to Article 94(3) EPC for European Patent Application No. 13807132.9 dated Jul. 23, 2018; 4 pages.

* cited by examiner

MATTRESS BLADDER CONTROL USING A BLEED VALVE

CROSS REFERENCE TO RELATED APPLICATIONS

The present application is a continuation of U.S. application Ser. No. 15/784,281, filed Oct. 16, 2017, now U.S. Pat. No. 10,806,655, which is a continuation of U.S. application Ser. No. 14/409,271, filed Dec. 18, 2014, now U.S. Pat. No. 9,833,369, which is a U.S. national counterpart application of international application serial no. PCT/US2013/046796 filed Jun. 20, 2013, which claims the benefit, under 35 U.S.C. § 119(e), of U.S. Provisional Application Nos. 61/662,711 filed Jun. 21, 2012, 61/663,311 filed Jun. 22, 2012, and 61/722,663 filed Nov. 5, 2012, each of which is hereby incorporated by reference herein. U.S. application Ser. No. 15/784,281, filed Oct. 16, 2017, also claimed priority, under 35 U.S.C. § 120, as a continuation-in-part of U.S. application Ser. No. 13/798,359, filed Mar. 13, 2013, now U.S. Pat. No. 9,228,885, and Ser. No. 13/828,186, filed Mar. 14, 2013, now U.S. Pat. No. 9,329,076, each of which is hereby incorporated by reference herein.

PART A

Field of the Disclosure

A patient support system includes a patient support apparatus and a support surface mounted on the patient support apparatus. The patient support apparatus is reconfigurable among a plurality of different configurations for supporting a patient on the support surface in a plurality of positions. The support surface is mounted on the patient support apparatus to move in response to reconfiguration of the patient support apparatus.

Background

The present disclosure is related to patient support systems and methods of using patient support systems. Specifically, the present disclosure is related to a patient support system embodied as a hospital bed including a patient support apparatus (sometimes called a bed frame) and a support surface (sometimes called a mattress) mounted on the patient support apparatus.

Some modern hospital beds include patient support apparatuses that are reconfigurable to support a patient while laying flat or sitting up in bed. Some hospital beds include support surfaces that cushion a patient supported on the reconfigurable patient support apparatus. However, some support surfaces may be unable to properly cushion a patient when mounted on a patient support apparatus that is reconfigured via tilting, pivoting, expansion, and sliding of a multi-component deck.

SUMMARY

The present application discloses one or more of the features recited in the appended claims and/or the following features which, alone or in any combination, may comprise patentable subject matter:

According to a first aspect of the present application, a patient support system may include a patient support apparatus, a support surface, and a controller. The patient support apparatus may include a moveable deck with a seat-deck section and a head-deck section. The head-deck section may be movable relative to the seat-deck section between a first position and a second position. In the first position, the head-deck section may be adjacent the seat-deck section. In the second position, the head-deck section may be spaced apart from the seat-deck section forming a gap between the seat-deck section and the head-deck section. The support surface may be mounted on the patient support apparatus to cover the movable deck. The support surface may include a cover, a plurality of support bladders positioned in the cover, and a fill bladder positioned in the cover. The fill bladder may be arranged over the interface of the seat-deck section and the head-deck section. The controller may be coupled to the movable deck, the support bladders, and the fill bladder. The controller may be configured to inflate the fill bladder in response to movement of the head-deck section from the first position to the second position so that the fill bladder covers the gap formed between the seat-deck section and the head-deck section.

In some embodiments, the cover may include a head-end section, a foot-end section, and expandable folds coupled between the head-end section and the foot-end section. The expandable folds may be arranged over the interface of the seat-deck section and the head-deck section so that the cover extends over the gap formed between the seat-deck section and the head-deck section when the head-deck section is moved from the first position to the second position.

In some embodiments, the support surface may include a plurality of lugs coupled to a bottom side of the cover. The lugs may be configured to be received in lug-receiving apertures formed in the moveable deck when the support surface is mounted on the patient support apparatus. The lugs may include a stem and a ball, the ball spaced apart from the cover. The lug-receiving apertures may include at least one keyhole slot with a wide portion and a narrow portion.

In some embodiments, the support surface may include a trunk carrying pneumatic and electrical lines. The trunk may extend downwardly from a bottom surface of the cover to be received by the patient support apparatus when the support surface is mounted on the patient support apparatus. In some embodiments, the seat-deck section may be formed to include a channel sized to receive the trunk of the support surface when the support surface is mounted on the patient support apparatus.

In some embodiments, the movable deck may include a foot-deck section. The plurality of support bladders may include a head-support bladder arranged to extend over the head-deck section, a seat-support bladder arranged to extend over the seat-deck section, and a foot support bladder arranged to extend over the foot-deck section.

In some embodiments, the foot-support bladder may include a plurality of cells that cooperate to form a left rail section a right rail section and a central section. The central section may have a diminishing cross-sectional area to form a space under the central section defined between the left rail section, the right rail section, and the central section.

In some embodiments, the controller may be configured to actively deflate the fill bladder in response to movement of the head-deck section from the second position toward the first position. The controller may be configured to deflate the fill bladder for a predetermined time period in response to movement of the head-deck section from the second position toward the first position.

In some embodiments, the controller may be configured to determine a desired pressure for the fill bladder based on a position of the head-deck section after movement from the second position toward the first position. The desired pressure may be determined based on one of a predetermined equation and a lookup table. The lookup table may include a plurality of head-deck section positions and a corresponding plurality of fill bladder pressures.

In some embodiments, the controller may be configured to inflate the fill bladder if the actual pressure of the fill bladder is less than the determined desired pressure and to deflate the fill bladder if the actual pressure in the fill bladder is greater than the determined desired pressure. The controller may be configured to passively deflate the fill bladder if the actual pressure in the fill bladder is greater than the determined desired pressure. The controller may be configured to actively deflate the fill bladder in response to movement of the head-deck section from the second position toward the first position.

According to another aspect of the present disclosure, a patient support surface may include a cover and a cushion. The cover may have a head end, a foot end, a left side, and a right side. The cushion may be encased in the cover and may include a first foam pad and a second foam pad and arranged below the first foam pad. The second foam pad may be formed to include a plurality of perforations extending through the second foam pad.

In some embodiments, the cushion may include a third foam pad extending from the foot end of the cover toward the head end of the cover. The second foam pad may be arranged between the third foam pad and the head end of the cover. The third foam pad may be formed to include a plurality of perforations.

In some embodiments, the cushion may include a first bolster arranged to extend along a first side of the second foam pad and a second bolster arranged along a second side of the second foam pad. The first and the second bolsters may each be formed to include slits extending upwardly from a bottom side of the left and the right bolsters toward a top side of the left and the right bolsters. The first and the second bolsters may each be formed to include slits extending downwardly from the top side of the left and the right bolsters toward the bottom side of the left and the right bolsters.

In some embodiments, the cover may include a head section, a foot section, and an expandable section coupled between the head section and the foot section. The expandable section may include an elastic material arranged to extend from the left side to the right side of the cover over a portion of a bottom surface of the cover. The expandable section may include a plurality of expandable folds arranged to extend from the left side to the right side of the cover over a portion of a bottom surface of the cover.

In some embodiments, the patient support surface may include a plurality of lugs extending downwardly from the cover. Each lug may include a stem extending from the cover and a ball spaced apart from the cover.

In some embodiments, a patient support surface may include an overlay arranged to extend over a top side of the cover. The overlay may include a head portion, a foot portion, and an expandable portion. The head portion may be arranged to extend from the head end of the cover toward the foot end of the cover. The foot portion may be arranged to extend from the foot end of the cover toward the head end of the cover. The expandable portion may be coupled between the head portion and the foot portion. The expandable portion may include a plurality of expandable folds arranged to extend from a left side to a right side of the overlay over a portion of a bottom surface of the overlay.

According to another aspect of the present disclosure, a patient support system may include a patient support apparatus, a patient support surface, and a controller. The patient support apparatus may be movable from a first configuration to a second configuration. The patient support surface may be mounted on the patient support apparatus and may include a cover and a plurality of inflatable bladders encased in the cover. The controller may be configured to adjust the pressure in at least one of the inflatable bladders during movement of the patient support apparatus from the first configuration to the second configuration, to monitor the pressure in the at least one of the inflatable bladders during movement of the patient support apparatus from the first position to the second position, and to adjust the speed of movement from the first configuration to the second configuration of the patient support apparatus based on the monitored pressure.

In some embodiments, the controller may be configured to stop movement from the first configuration to the second configuration of the patient support apparatus based on the monitored pressure if the rate of change of the monitored pressure is below a threshold. The controller may be configured to trigger an alarm if the rate of change of the monitored pressure is below a threshold.

In some embodiments, the first position may be a lie-flat configuration. The second position may be a chair-egress configuration.

In some embodiments, the patient support system may include a plurality of sensors configured to detect pressure in the plurality of bladders and the position of the patient support apparatus. The sensors may be coupled to the controller.

According to another aspect of the present disclosure, A patient support system may include a patient support apparatus, a support surface, a valve box, and a controller. The patient support apparatus may include an articulatable deck movable from a lie-flat configuration to a chair-egress configuration and a footboard removably coupled to the deck. The support surface may include a seat-support bladder arranged to underlie the buttocks of a patient on the patient support system. The valve box may be coupled to the seat-support bladder and configured to selectively couple the seat-support bladder to the atmosphere so that the seat-support bladder deflates. The controller may be coupled to the valve box.

In some embodiments, the controller may be configured to operate the valve box to couple the seat-support bladder to the atmosphere in response to receipt of a chair-egress request for movement of the articulatable deck toward the chair-egress configuration, if the controller determines that the footboard is removed from the deck. The controller may be configured to open the vent valve if the controller determines that the footboard was removed from the deck within a predetermined time period.

In some embodiments, the patient support system may include an air source coupled to the controller. The air source may be coupled to the foot-support bladder. The controller may be configured to inflate the seat-support bladder in response to a request for movement of the articulatable deck from the flat position to the chair-egress configuration if the controller determines that the footboard is not removed from the deck.

In some embodiments, the support surface may include a foot-support bladder arranged to underlie the feet of a patient on the patient support system. The valve box may be coupled to the foot-support bladder and may be configured to selectively couple the seat-support bladder to the atmosphere so that the seat-support bladder deflates. The controller may be configured to operate the valve box to couple the foot-support bladder to the atmosphere in response to a request for movement of the articulatable deck from the flat position to the chair-egress configuration if the controller determines that the footboard was removed from the deck during the predetermined time period.

In some embodiments, the support surface may include a boost bladder arranged to underlie the torso of a patient on the patient support system. The boost bladder may be coupled to the air source. The controller may be configured to operate the air source to inflate the boost bladder in response to receipt of a boost request when the deck is in the chair-egress configuration and the seat-support bladder is deflated. The boost request and the chair-egress request may be generated by a user pressing a single button.

According to another aspect of the present disclosure, a patient support system may include a support surface, an air source, and a controller. The support surface may include a head-support bladder, a seat-support bladder, and a foot-support bladder. The air source may be coupled to the head-support bladder, the seat-support bladder, and the foot support bladder. The controller may be coupled to the air source.

In some embodiments, the controller may be configured to inflate the head-support bladder to a head-bladder egress pressure and to inflate the foot-support bladder to a foot-bladder egress pressure in response to receipt of a side-egress request. The head-bladder egress pressure and the foot-bladder egress pressures may be based, at least in part, on a weight of a patient associated with the patient support system.

In some embodiments, the controller may be configured to inflate the seat-support bladder to a seat-bladder egress pressure in response to receipt of the side-egress request. The seat-bladder egress pressure may be based, at least in part, on a weight of a patient associated with the patient support system. The controller may be configured to inflate the head-support bladder to the head-bladder egress pressure and to inflate the foot-support bladder to the foot-bladder egress pressure before inflating the seat-support bladder to the seat-bladder egress pressure.

In some embodiments, the patient support system may include a patient support apparatus. The patient support apparatus may include a lower frame, an upper frame, and a lift system coupled to the lower frame and the lower frame to raise and lower the upper frame relative to the lower frame. The controller may be coupled to the lift system and may be configured to lower the upper frame relative to the lower frame in response to receipt of the side-egress request.

In some embodiments, the patient support system may include a patient support apparatus. The patient support apparatus may include a patient support apparatus including an articulatable deck that underlies the support surface. The articulatable deck may be movable between a lie-flat configuration in which a top side of the support surface is generally flat and a plurality of other positions in which the top side of the support surface is not flat. The controller may be coupled to the head-deck section. The controller may be configured to move the articulatable deck to the lie-flat configuration in response to receipt of the side-egress request.

According to another aspect of the present disclosure, a patient support system may include a support surface, an air source, a bleed valve, and a controller. The support surface may include a head-support bladder, a seat-support bladder, and a foot-support bladder. The air source may be coupled to the head-support bladder, the seat-support bladder, and the foot-support bladder of the support surface. The bleed valve may be coupled to the air source. The bleed valve may be configured to be selectively opened to connect the air source to atmosphere. The controller may be coupled to the air source and the bleed valve.

In some embodiments, the controller may be configured to open the bleed valve and to operate the air source to inflate at least one of the head-support bladder, the seat-support bladder, and the foot-support bladder to inflate the at least one bladder to a therapy pressure. Accordingly, inflation may occur at an inflation rate slower than if the bleed valve was closed in response to receiving an alternating-pressure therapy request.

In some embodiments, the patient support system may also include a valve box. The valve box may be coupled to the head-support bladder, the seat-support bladder, and the foot-support bladder and may be configured to selectively couple one or more of the head-support bladder, the seat-support bladder, and the foot-support bladder to the atmosphere.

In some embodiments, the controller may be configured to operate the valve box to couple the at least one of the head-support bladder, the seat-support bladder, and the foot-support bladder to the atmosphere. The controller may couple the at least one of the head-support bladder, the seat-support bladder, and the foot-support bladder to the atmosphere after the at least one of the head-support bladder, the seat-support bladder, and the foot-support bladder are inflated to the therapy pressure so that the at least one of the head-support bladder, the seat-support bladder, and the foot-support bladder deflates.

In some embodiments, the controller may be configured to open the bleed valve and to operate the air source to inflate another of the at least one of the head-support bladder, the seat-support bladder, and the foot-support bladder to inflate the other at least one of the head-support bladder, the seat-support bladder, and the foot-support bladder to a therapy pressure. Accordingly, inflation may occur at an inflation rate slower than if the bleed valve was closed in response to receiving an alternating-pressure therapy request.

In some embodiments, the controller may be configured to operate the valve box to couple the other of the at least one of the head-support bladder, the seat-support bladder, and the foot-support bladder to the atmosphere. The controller may couple the other of the at least one of the head-support bladder, the seat-support bladder, and the foot-support bladder to the atmosphere after the other of the at least one of the head-support bladder, the seat-support bladder, and the foot-support bladder is inflated to the therapy pressure so that the other of the at least one of the head-support bladder, the seat-support bladder, and the foot-support bladder deflates.

In some embodiments, the controller may be configured to close the bleed valve when the at least one of the head-support bladder, the seat-support bladder, and the foot-support bladder reaches the therapy pressure. The bleed valve may be coupled between the support surface and the air source. The controller may be configured to operate the valve box to stop deflation of the at least one of the head-support bladder, the seat-support bladder, and the foot-support bladder when the at least one of the head-support bladder, the seat-support bladder, and the foot-support bladder reaches a baseline pressure established prior to inflation to the therapy pressure.

According to another aspect of the present disclosure, a patient support system may include a support surface, an air source, a bleed valve, and a controller. The support surface may include a right-turn inflatable cell and a left-turn inflatable cell. The air source may be coupled to the right-turn inflatable cell and the left-turn inflatable cell of the support surface. The air source may be configured to actively inflate and actively deflate the right-turn inflatable cell and the left-turn inflatable cell. The bleed valve may be coupled to the air source, the bleed valve may also be configured to be selectively opened to connect the air source to the atmosphere. The controller may be coupled to the air source and the bleed valve.

In some embodiments, the controller may be configured to open the bleed valve and to operate the air source to actively deflate the right-turn inflatable cell. The controller may actively deflate the right-turn inflatable cell during the application of a lateral rotation therapy in which the controller operates the air source to actively inflate the right-turn inflatable cell and the left-turn inflatable cell to rotate a patient about a longitudinal axis of the support surface.

In some embodiments, the patient support system may also include a valve box. The valve box may be coupled to the right-turn inflatable cell and may be configured to selectively couple the right-turn inflatable cell to the atmosphere to passively deflate the right-turn inflatable cell.

In some embodiments, the controller may be coupled to the valve box. The controller may be configured to operate the valve box to couple the right-turn inflatable cell to the atmosphere to passively deflate the right-turn inflatable cell. The controller may be configured to operate the valve box to couple the right-turn inflatable cell to the atmosphere to passively deflate the right-turn inflatable cell before opening the bleed valve and operating the air source to actively deflate the right-turn inflatable cell.

In some embodiments, the controller may be configured to open the bleed valve and to operate the air source to actively deflate the left-turn inflatable cell. In some embodiments, The patient support system may also include a valve box. The valve box may be coupled to the left-turn inflatable cell and may be configured to selectively couple the left-turn inflatable cell to the atmosphere to passively deflate the left-turn inflatable cell. The controller may be coupled to the valve box. The controller may be configured to operate the valve box to couple the left-turn inflatable cell to the atmosphere to passively deflate the left-turn inflatable cell. The controller may be configured to operate the valve box to couple the left-turn inflatable cell to the atmosphere before opening the bleed valve and operating the air source to actively deflate the left-turn inflatable cell.

In some embodiments, the right-turn inflatable cell may include a right head-turn bladder arranged to underlie the right side of a patient torso when a patient is supported on the support surface and a right seat-turn bladder arranged to underlie a right side of a patient's seat when a patient is supported on the support surface. The right head-turn bladder may be pneumatically coupled to the right seat-turn bladder and is moveable away from the right seat-turn bladder.

In some embodiments, the left-turn inflatable cell may include a left head-turn bladder arranged to underlie the left side of a patient torso when a patient is supported on the support surface and a left seat-turn bladder arranged to underlie a left side of a patient's seat when a patient is supported on the support surface. The left head-turn bladder may be pneumatically coupled to the left seat-turn bladder and is moveable away from the left seat-turn bladder.

According to another aspect of the present disclosure, a patient support surface may include a cover and a cushion. The cushion may be encased in the cover. The cushion may include a first foam pad having a head section, a seat section, and an expandable section coupled between the head section and the seat section. The expandable section may be configured to allow the head section to move away from the seat section.

In some embodiments, the expandable section may be a serpentine foam band configured to expand when the head section moves away from the seat section. The expandable section may include a honeycombed foam section forming a plurality of holes extending through the cushion from a top side to a bottom side of the cushion. The first pad may be a monolithic foam component.

In some embodiments, the cushion may include a second foam pad coupled to the seat section of the first foam pad. The second foam pad may be formed to include a plurality of perforations extending through the second foam pad.

In some embodiments, the support surface may include a plurality of lugs coupled to the cover and adapted to couple the support surface to a patient support apparatus. Each lug may include a stem and a ball coupled to the stem. Each ball may spaced apart from the cover. Each lug may be coupled to a bottom side of the cover.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 6A is a partially diagrammatic side elevation view of the deck and the support surface showing the deck of the patient support apparatus includes a head-deck section, a seat deck section, a thigh-deck section, and a foot deck section arranged in the flat position, and showing that the fill bladder included in the mattress is deflated when the deck is arranged in the flat configuration;

FIG. 8A is a view similar to FIGS. 6A and 7A, showing the deck moved by pivoting and sliding to a fully-inclined position in which the head deck section is further spaced apart from the seat deck section expanding the gap in the support bladders and the gap between the head deck section and the seat deck section, and showing that the fill bladder is inflated when the deck is moved to the fully-inclined configuration to fill the gap between the head deck section and the seat deck section;

FIG. 11A is a is a partially diagrammatic side elevation view of the deck and the support surface showing a seat bladder and a foot bladder of the support surface inflated prior to the patient support apparatus moving from a fully inclined configuration toward the chair-egress configuration;

FIG. 13A is a view similar to FIGS. 11A and 12A showing a turn bladder included in the surface underlying the patient's torso inflated to help push a patient exiting the patient support system to stand up out of the patient support system;

FIG. 16A is a is a partially diagrammatic side elevation view of the deck and the support surface showing the head bladder, the seat bladder, and the foot bladder inflated to a normal inflation level prior to sequenced inflation to support a patient exiting the patient support system;

FIG. 18A is a view similar to FIGS. 16A and 17A the seat bladder inflated to an exit inflation level, after the head and foot bladder are inflated to exit inflation levels, to help push a patient exiting the patient support system to stand up out of the patient support system;

FIGS. 19A-21A are a series of partially diagrammatic side elevation views of the deck and the support surface during the application of an opti-rest (alternating-pressure) therapy to a patient supported on the patient support system showing the head bladder, the seat bladder, and the foot bladder inflating and deflating to shift the pressure profile of the patient support surface under a patient;

FIG. 19A is a partially diagrammatic side elevation view of the deck and the support surface showing the head, seat, and foot bladders at normal inflation during opti-rest therapy;

FIG. 21A is a view similar to FIGS. 19A and 20A showing the seat bladder at an opti-rest inflation level, greater than normal inflation, while the head and foot bladders are returned to the normal inflation level during opti-rest therapy;

FIGS. 23A-25A are a series of partially diagrammatic head-end elevation views of the deck and the support surface during the application of a lateral rotation therapy to a patient supported on the patient support system showing the right and left rotation bladders of the support surface inflated to rotate a patient about the longitudinal axis of the support surface;

FIG. 23A is a partially diagrammatic head-end elevation view of the deck and support surface showing the right and the left rotation bladders deflated during lateral rotation therapy so that a patient is supported on a generally flat top side of the support surface;

FIG. 25A is a view similar to FIGS. 24A and 25A showing the right rotation bladders deflated and the left rotation bladders inflated so that a patient is supported on an inclined top side of the support surface and is rotated about the longitudinal axis of the support surface;

FIG. 27AA is a detail view of one of the lugs shown in FIG. 27A;

BRIEF DESCRIPTION OF THE DRAWINGS—PART B

Figure 1A:
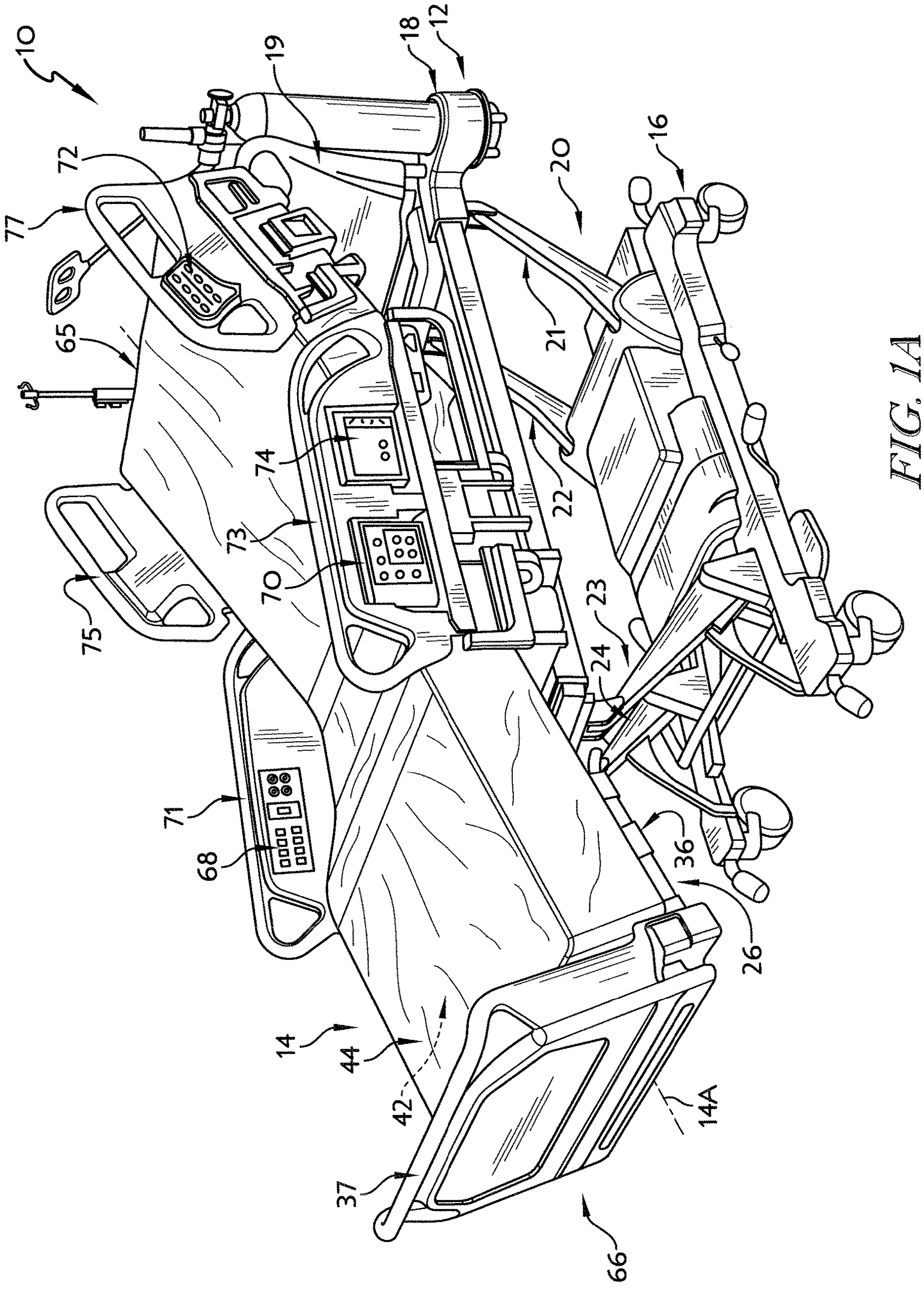
FIG. 1A is a perspective view of a patient support system including a patient support apparatus with a movable deck arranged in a partially-inclined configuration and a support surface mounted on the deck of patient support apparatus.
Figure 1B:
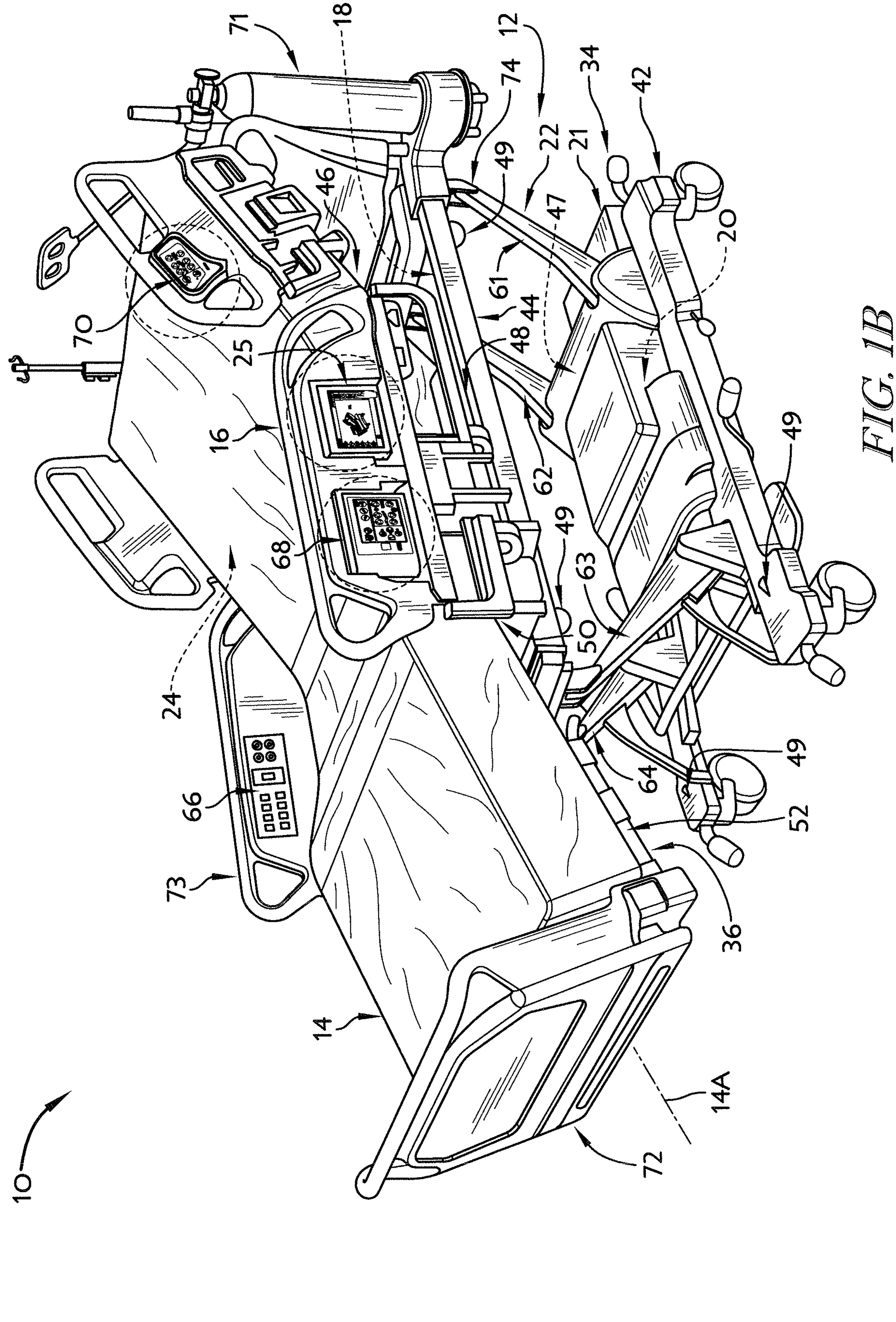
Figure 2A:
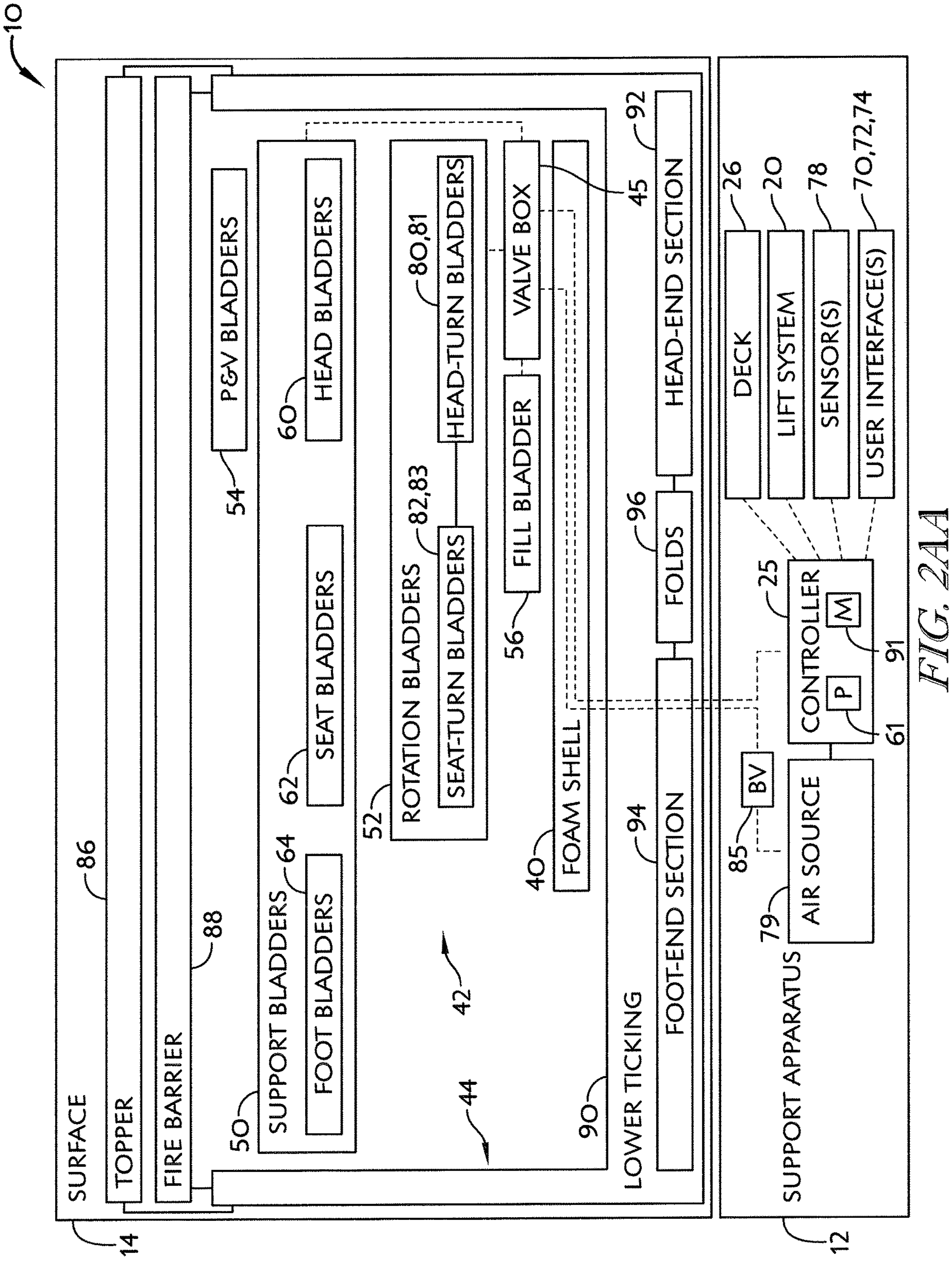
FIG. 2AA is a diagrammatic view of the patient support system of FIG. 1A showing that the patient support apparatus includes an air source and a controller, and showing that the support surface includes a valve box and a plurality of bladders coupled to the valve box.
Figure 2B:
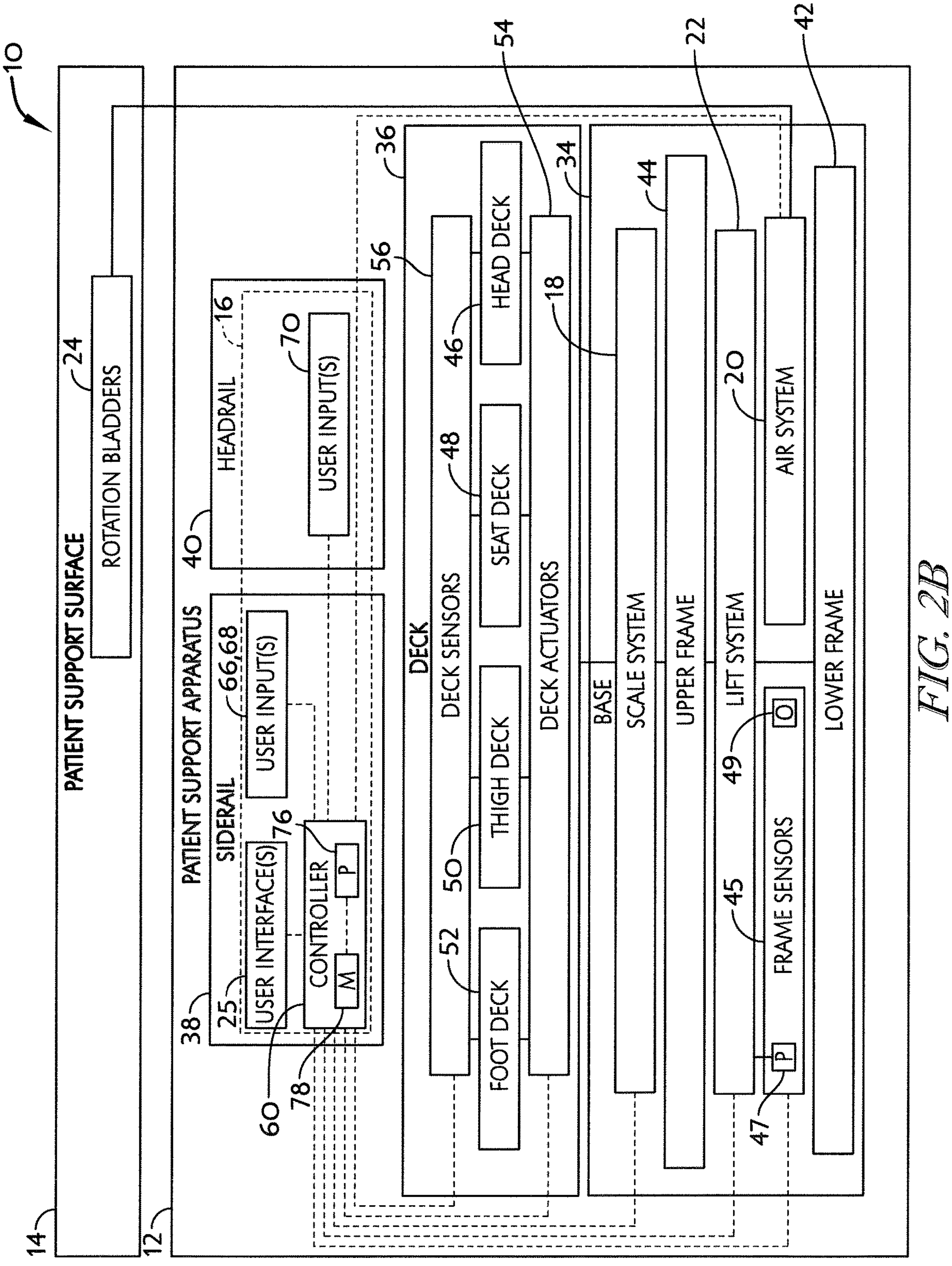
FIG. 2BA is a diagrammatic view of the pneumatic system included in the patient support system of FIGS. 1A and 2AA showing that the air source includes a pump and a valve configured to reverse the flow of air to inflate and deflate the plurality of bladders coupled to the valve box and that the valve box includes a vent for venting the plurality of bladders to the atmosphere.
Figure 2B:
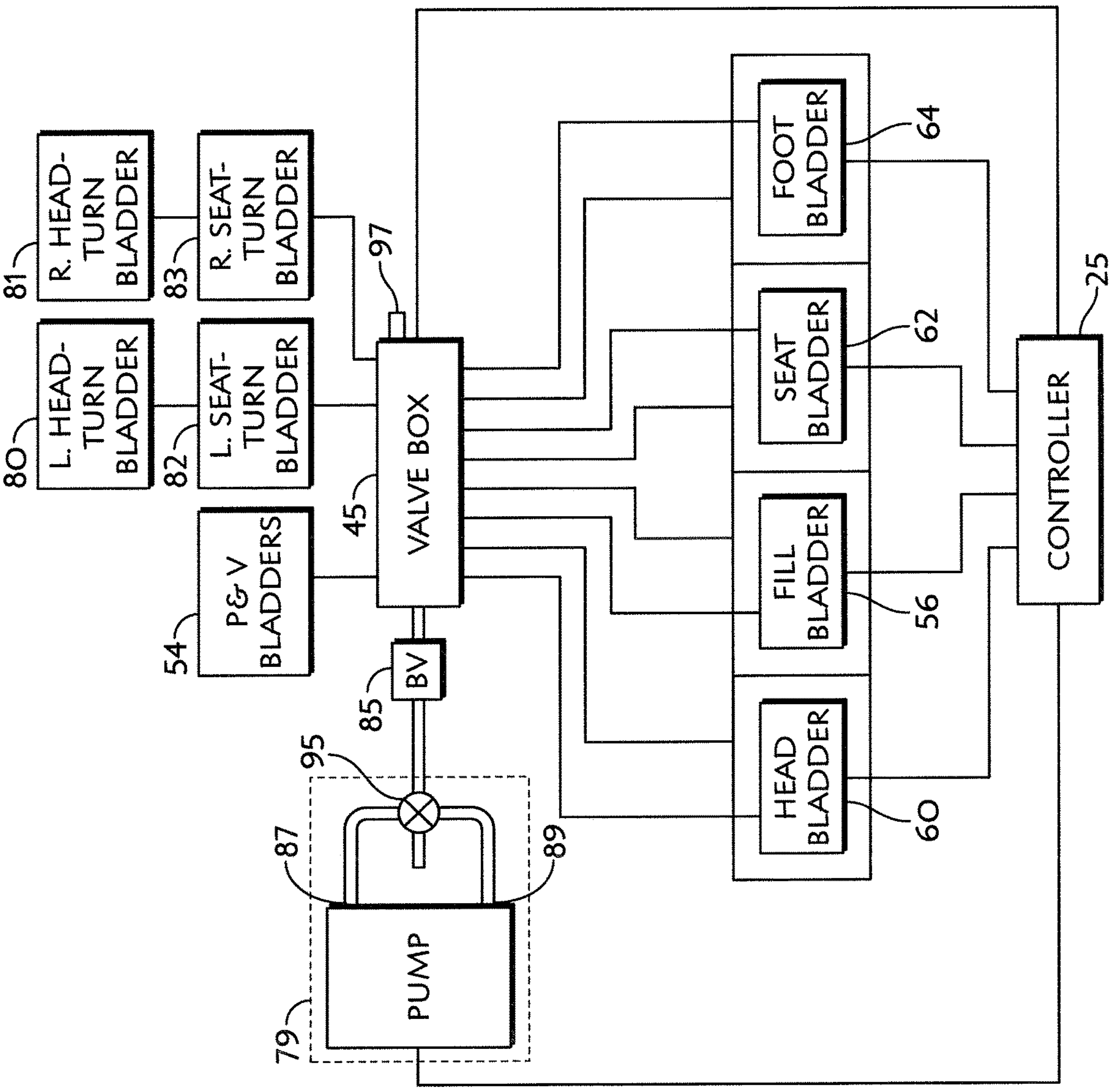
Figure 3A:
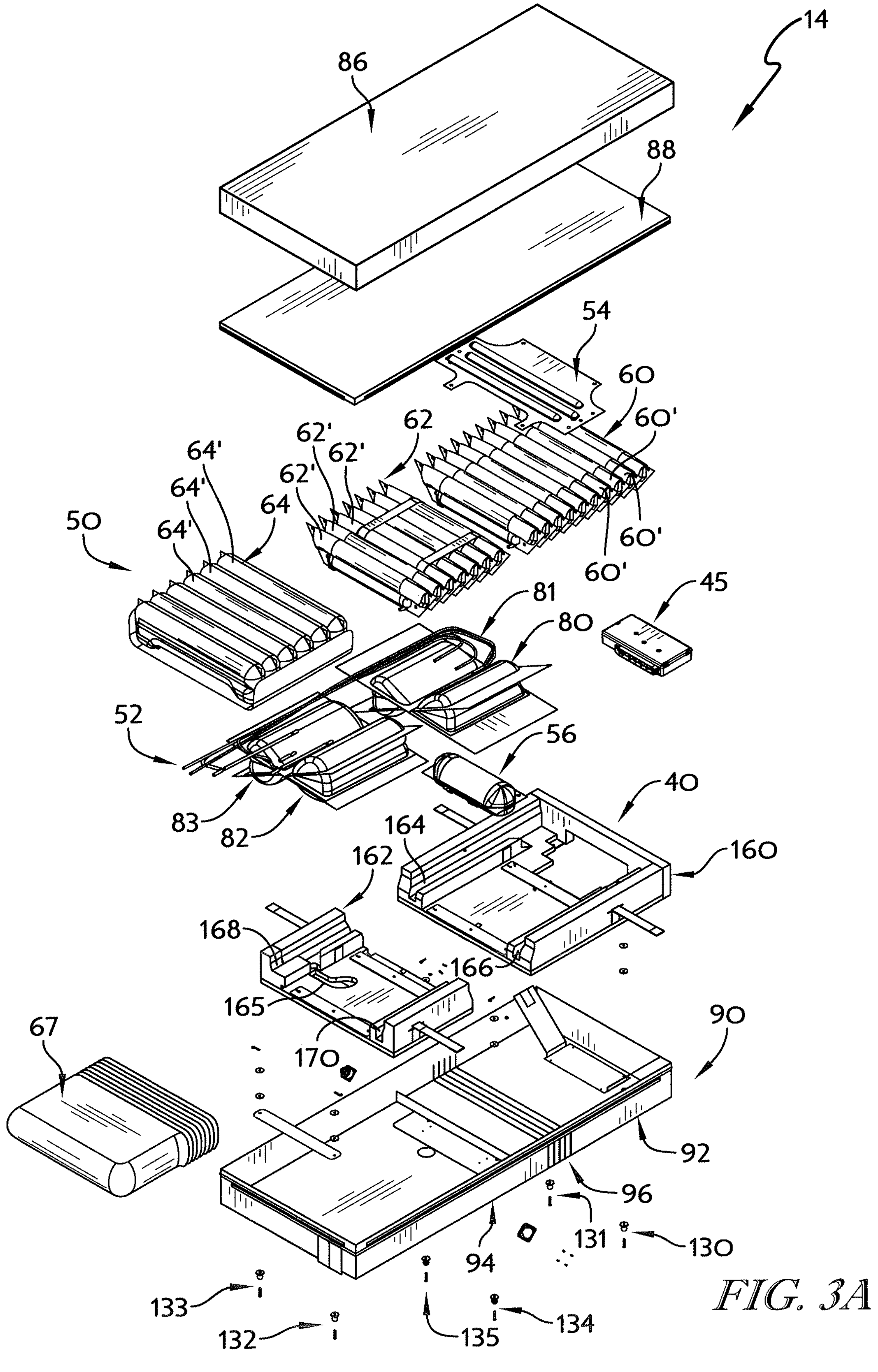
FIG. 3A is an exploded perspective view of the support surface of FIGS. 1A and 2AA showing that the support surface includes (from bottom to top) a lower ticking, a foam shell, a fill bladder, lateral rotation bladders, support bladders, percussion and vibration therapy bladders, a fire barrier, and a low-air-loss topper.
Figure 3B:
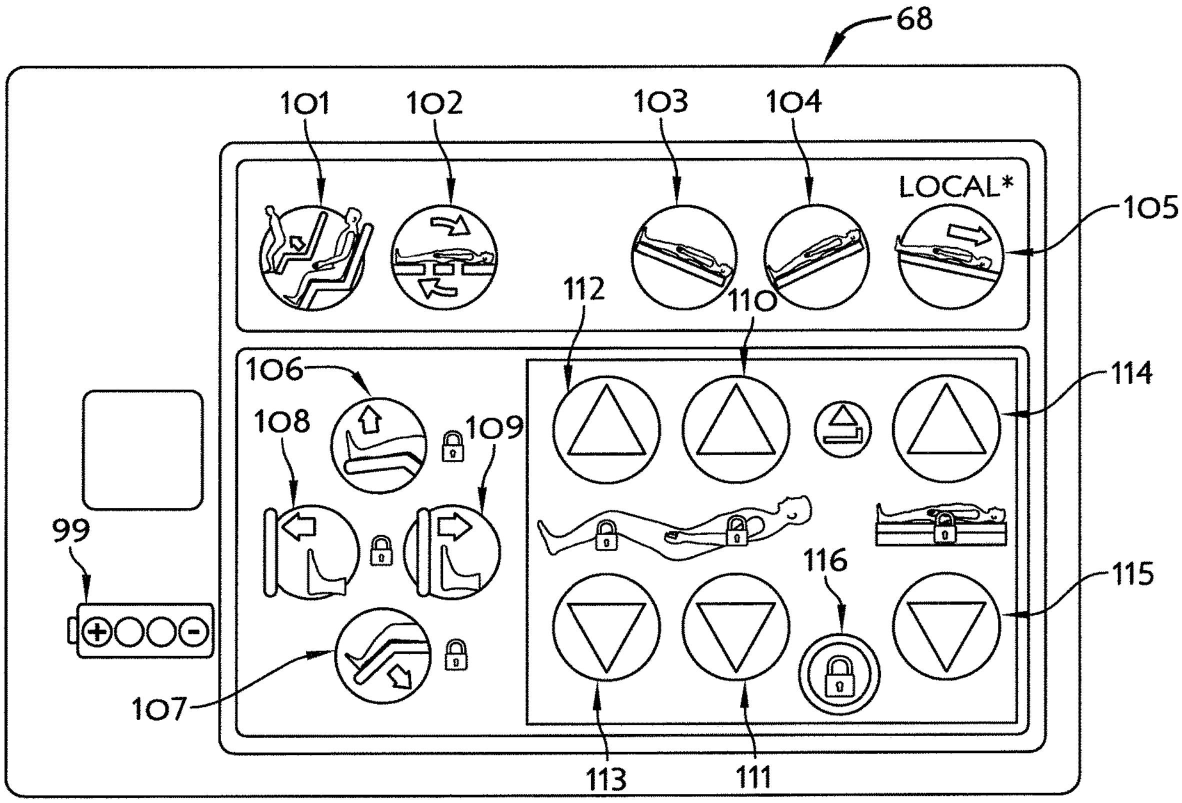
Figure 4B:
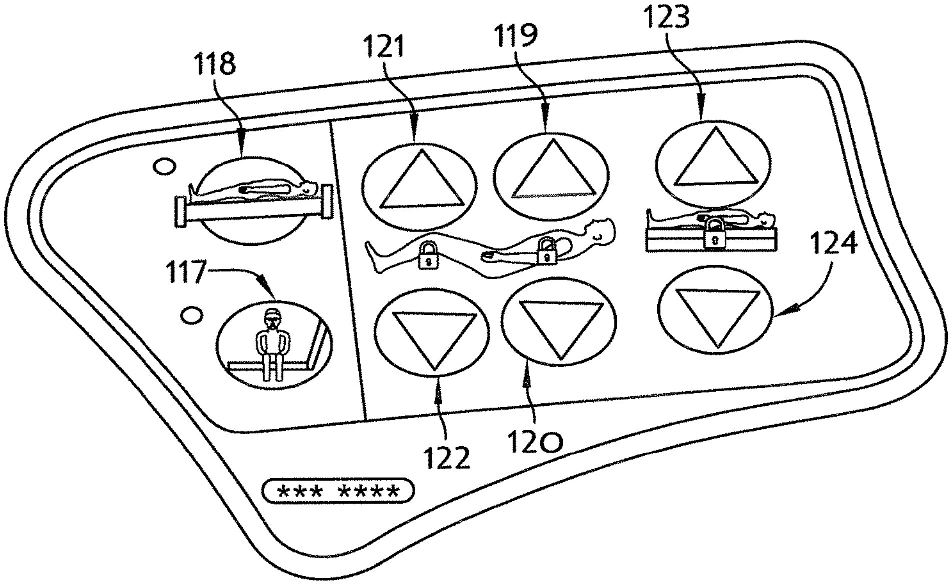
FIG. 4A is a side elevation view of a first user interface panel included in the patient support apparatus of FIG. 1A.
Figure 5A:
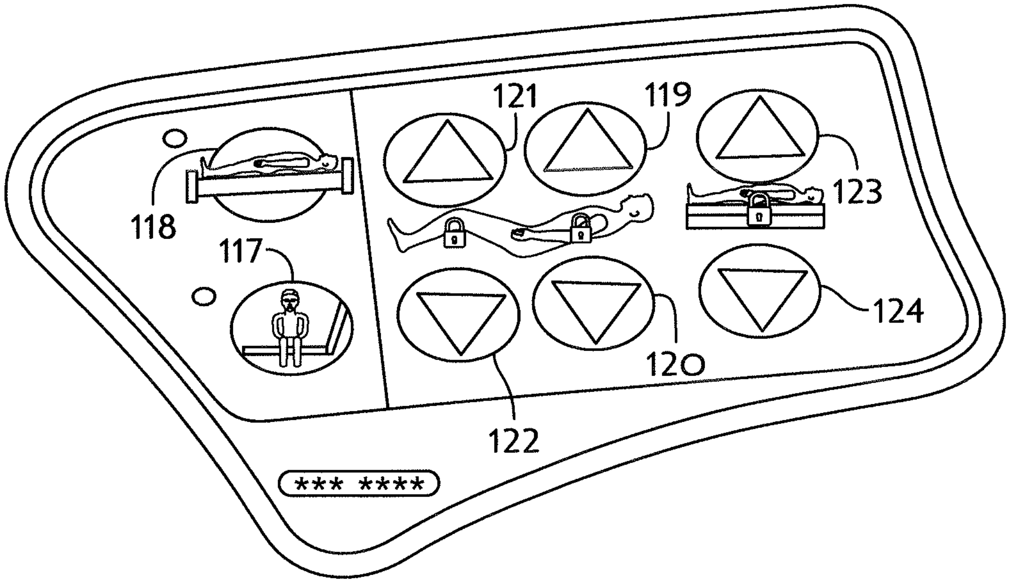
FIG. 5A is a side elevation view of a second user interface panel included in the patient support apparatus of FIG. 1A.
Figure 5B:
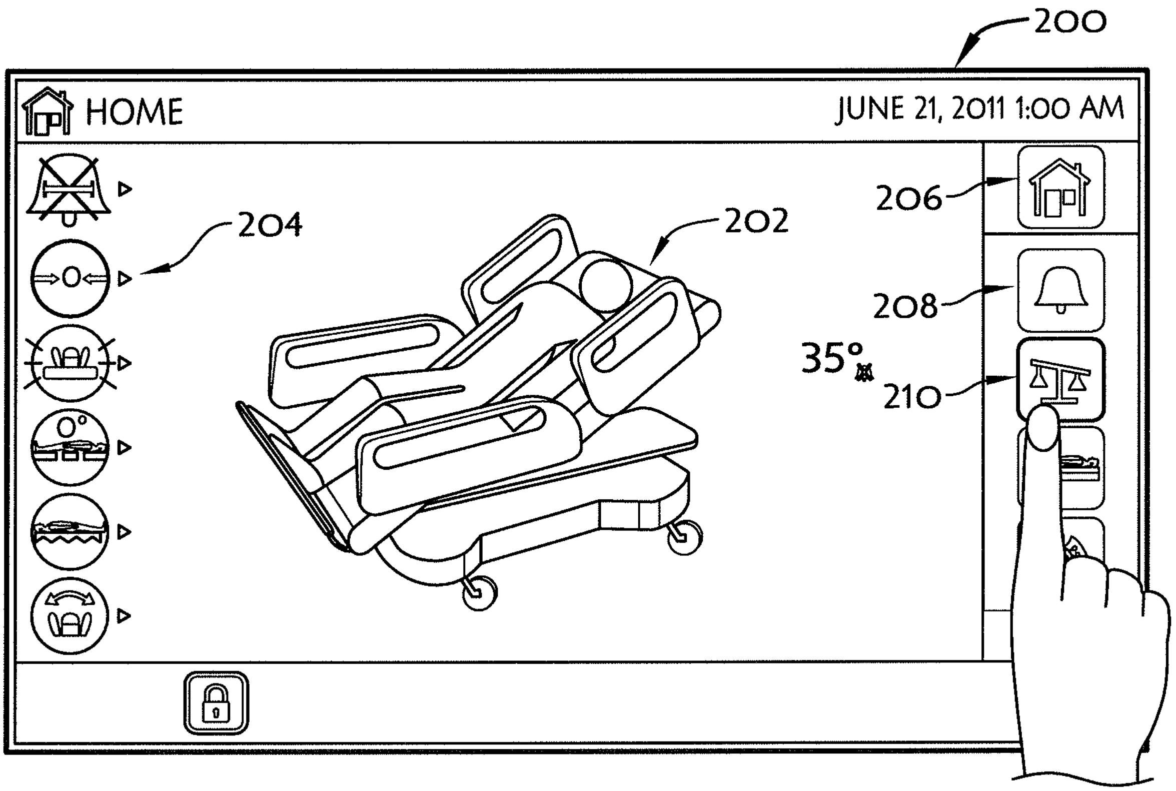
Figure 6B:
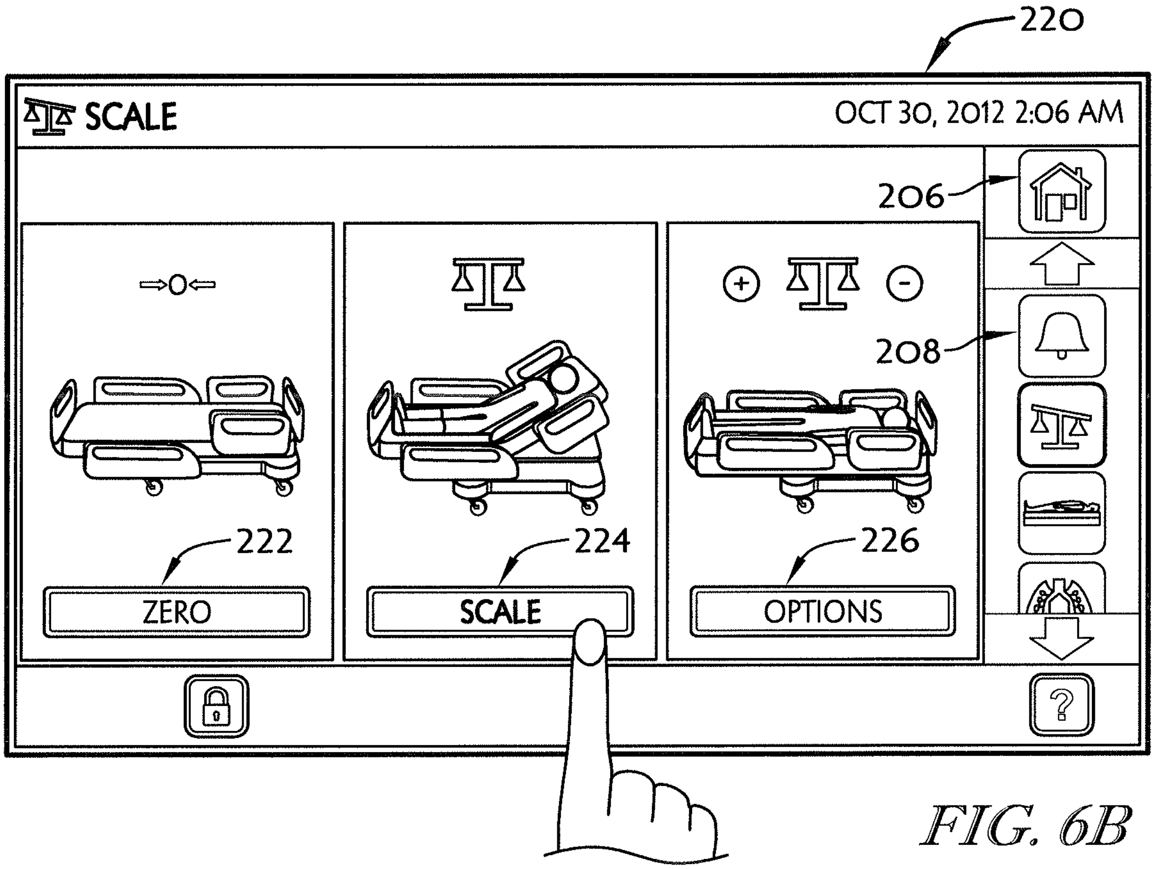
FIGS. 6A-8A are a series of partially diagrammatic side elevation views of the deck and the support surface showing the deck of the patient support apparatus moving from a flat configuration, shown in FIG. 6A, to a fully-inclined configuration, shown in FIG. 8A, and showing that the fill bladder of the support surface is configured to inflate in response to movement of the deck to fill a gap created in the support surface and a gap formed in the deck during movement to the fully-inclined configuration.
Figure 6A:
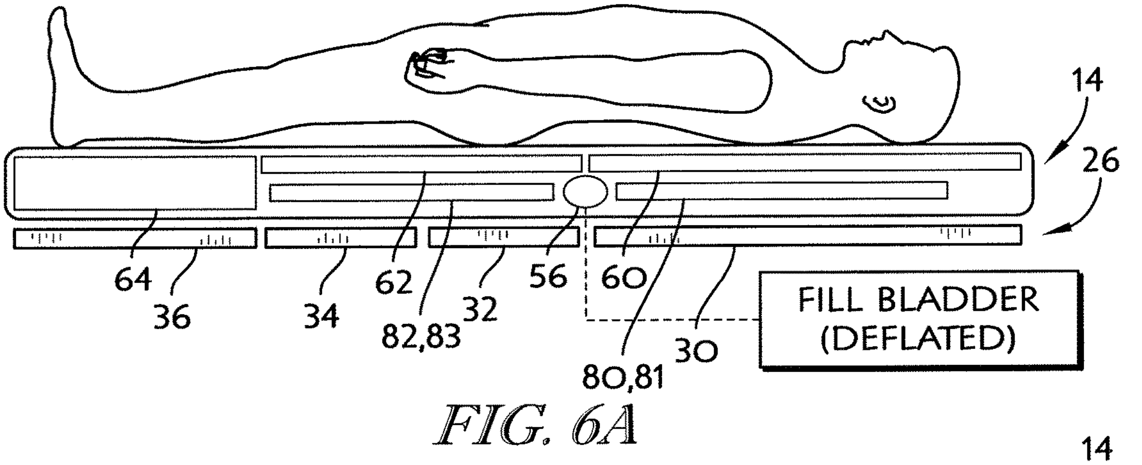
Figure 7A:
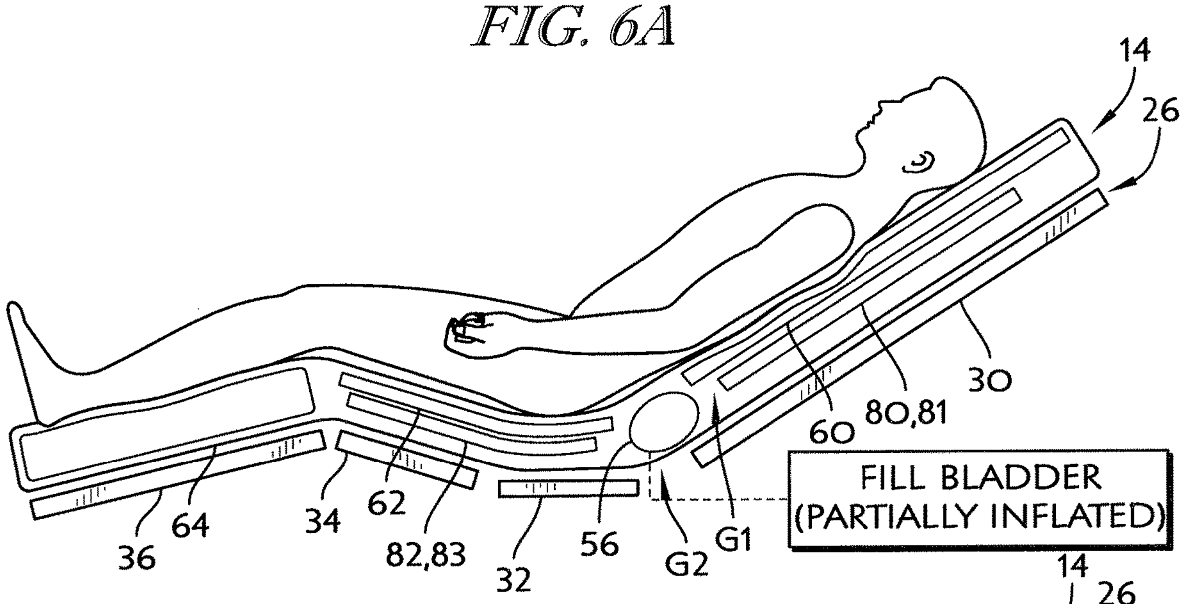
FIG. 7A is a view similar to FIG. 6A showing the deck moved by pivoting and sliding to a partially-inclined position in which the head deck section is spaced apart from the seat deck section forming a gap in the support bladders of the support surface and a gap between the head deck section and the seat deck section, and showing that the fill bladder is partially-inflated when the deck is moved to the partially-inclined configuration to fill the gaps.
Figure 8A:
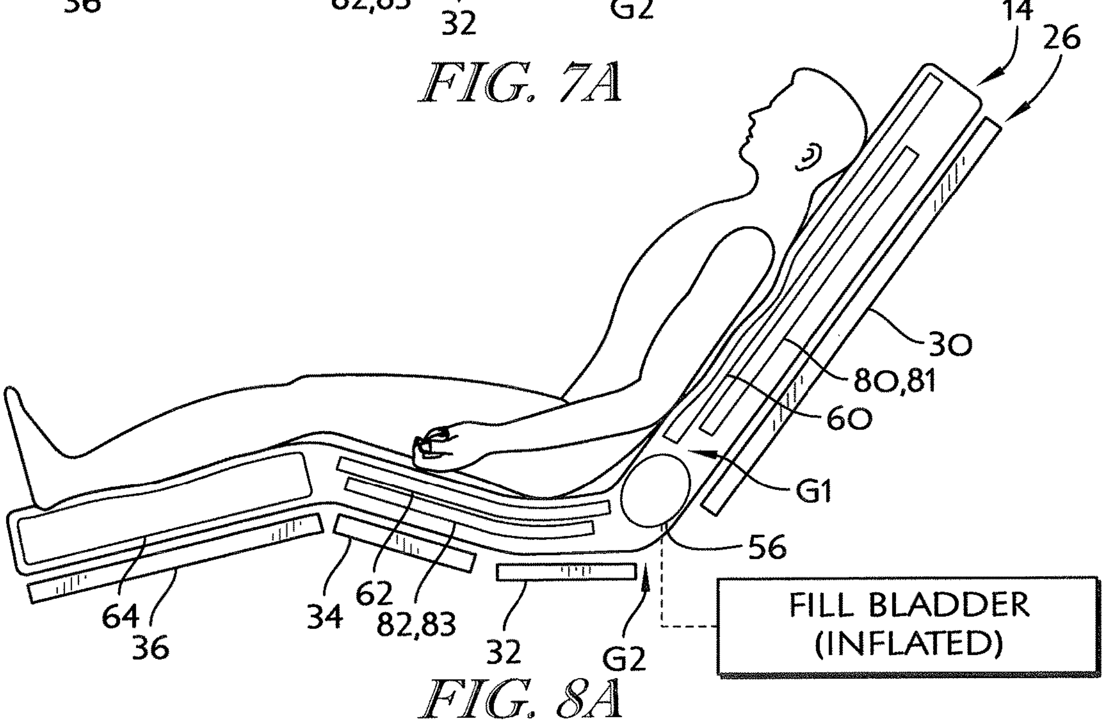
Figure 7B:
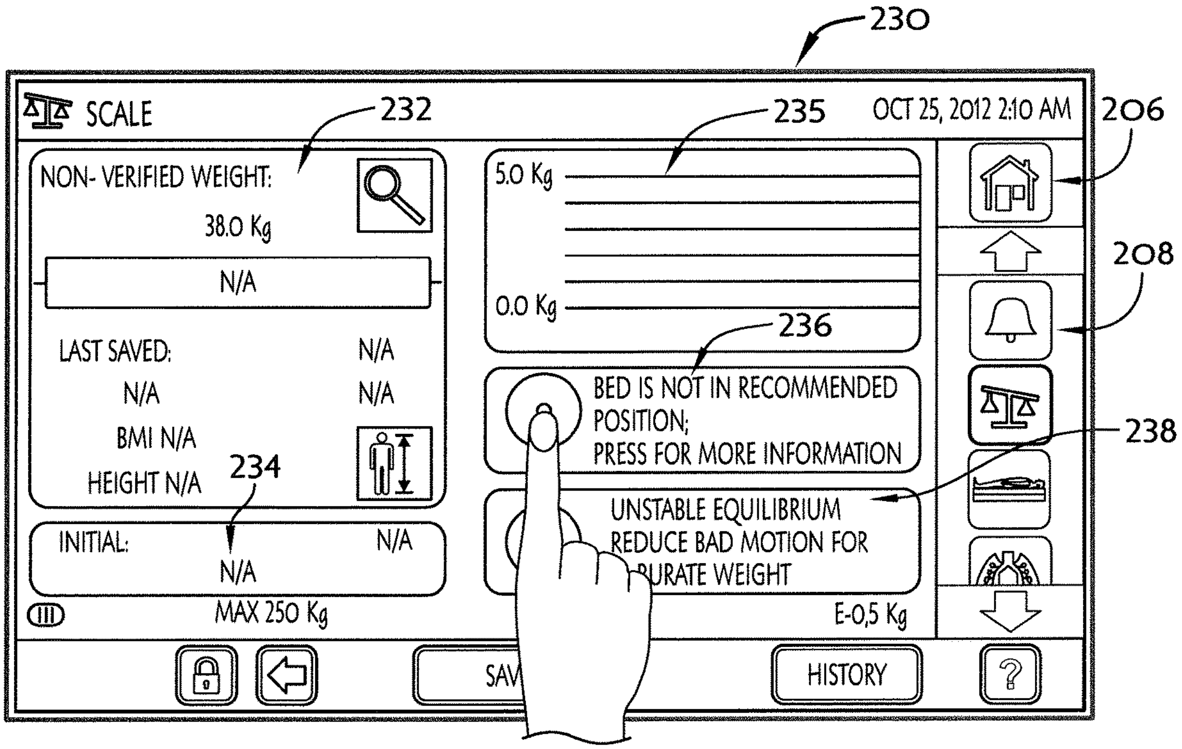
Figure 8B:
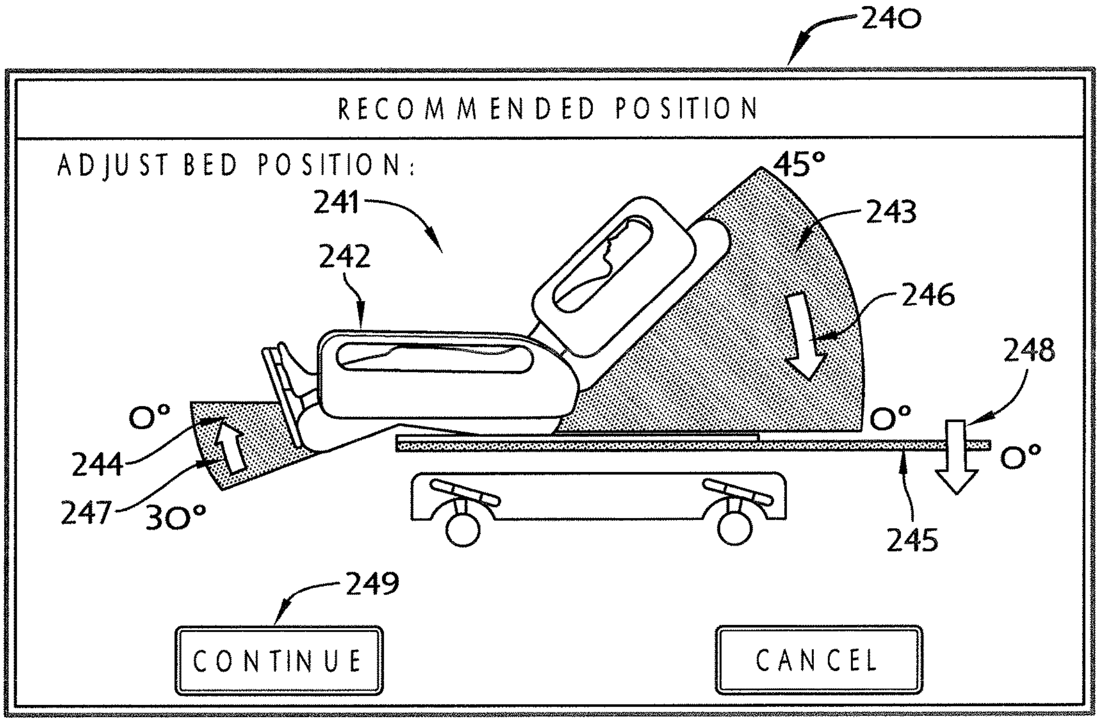
Figure 9A:
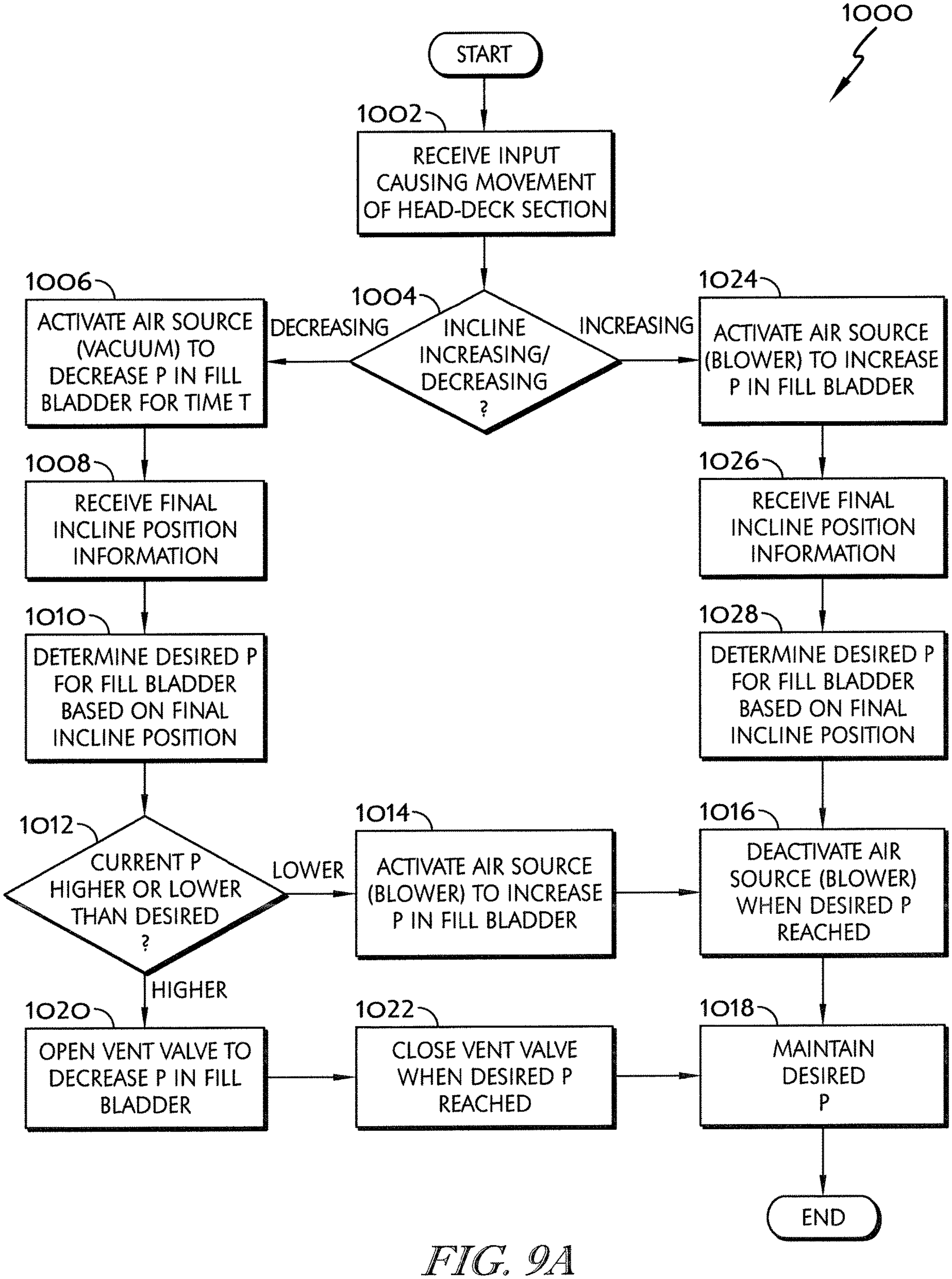
FIG. 9A is a is a block diagram showing a program executed by the controller in response to movement of the head deck section as shown in FIGS. 6A-8A.
Figure 9B:
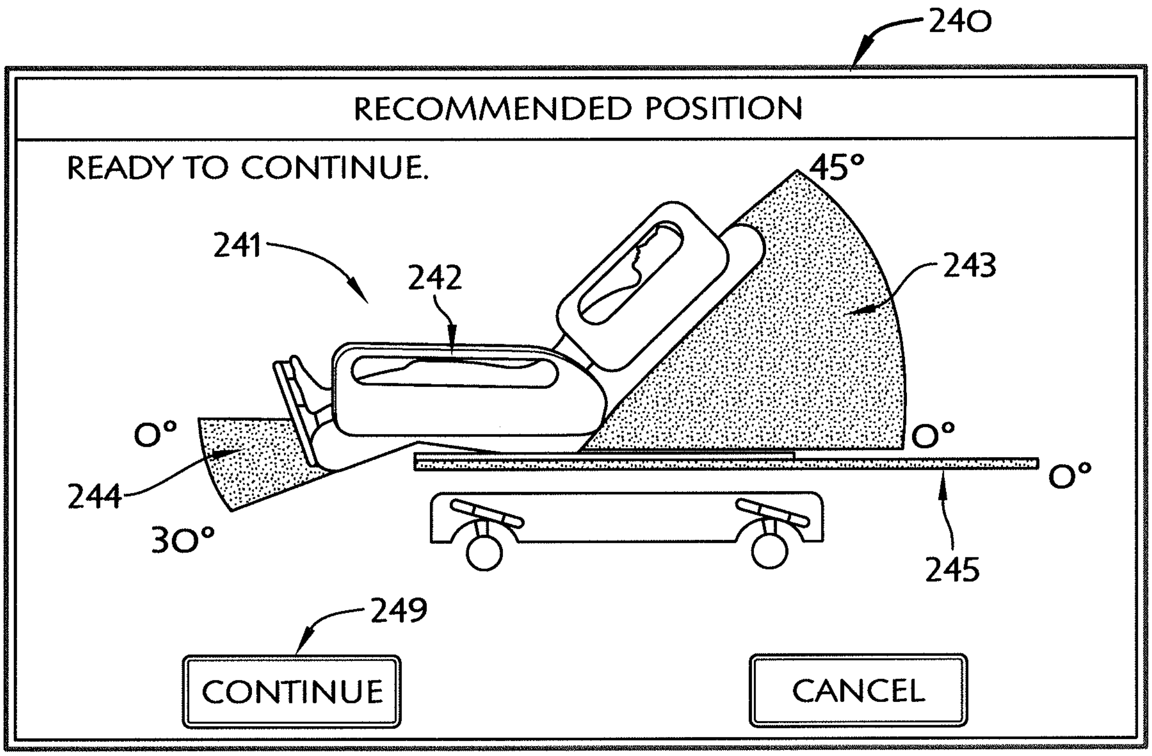
Figure 10B:
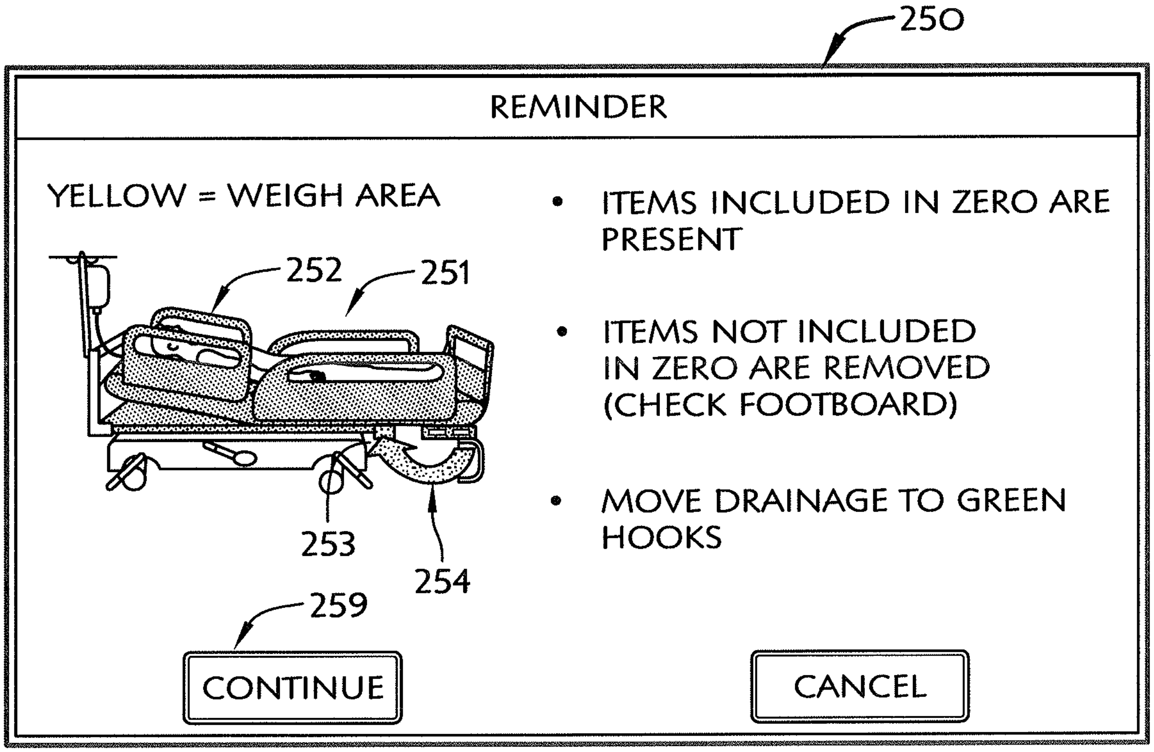
FIG. 10A is a perspective view of the patient support system moved to the chair-egress configuration in response to a caregiver pressing and holding a chair-egress button included in the first user interface panel (shown in FIG. 4A) to reconfigure the patient support system for a patient exiting the patient support system.
Figure 13A:
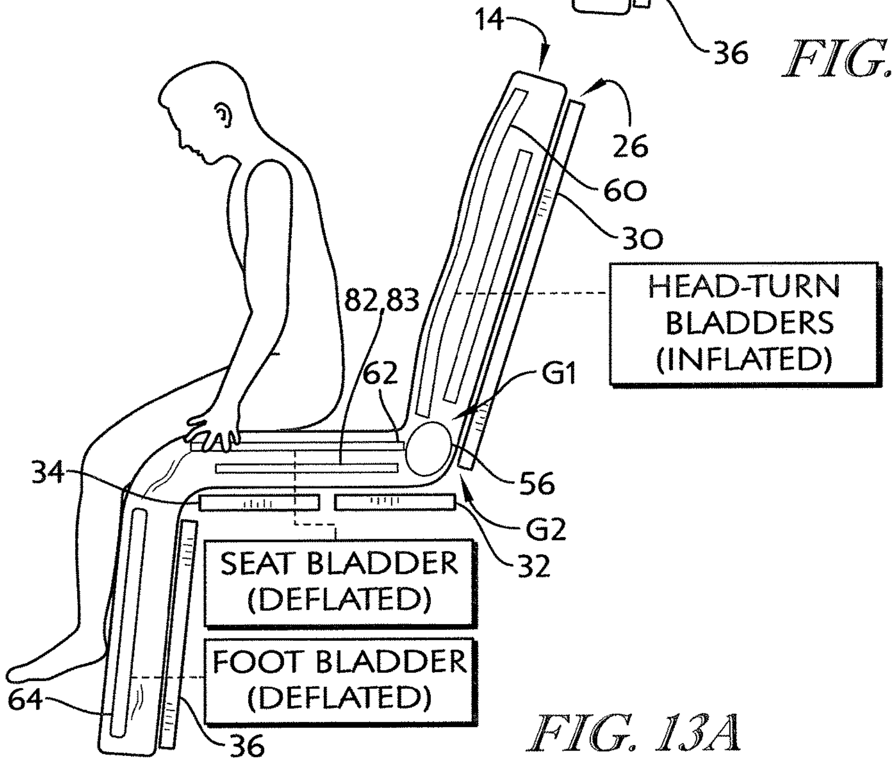
Figure 11B:
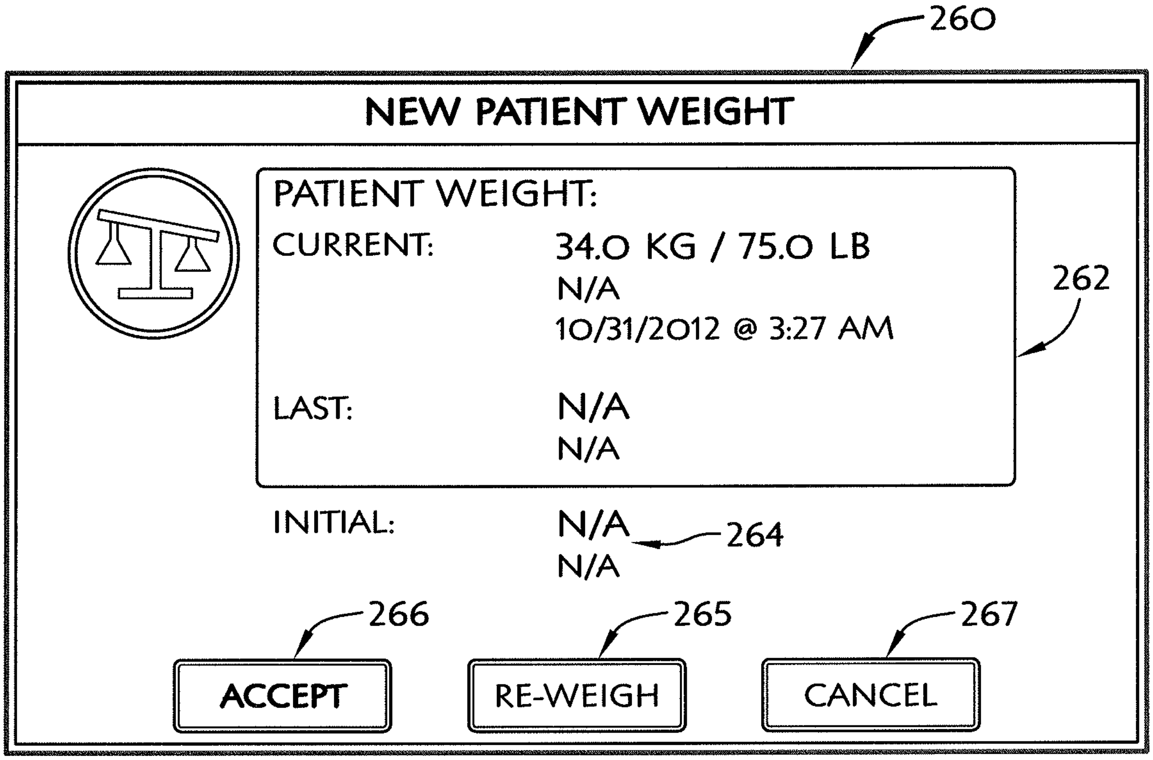
Figure 12B:
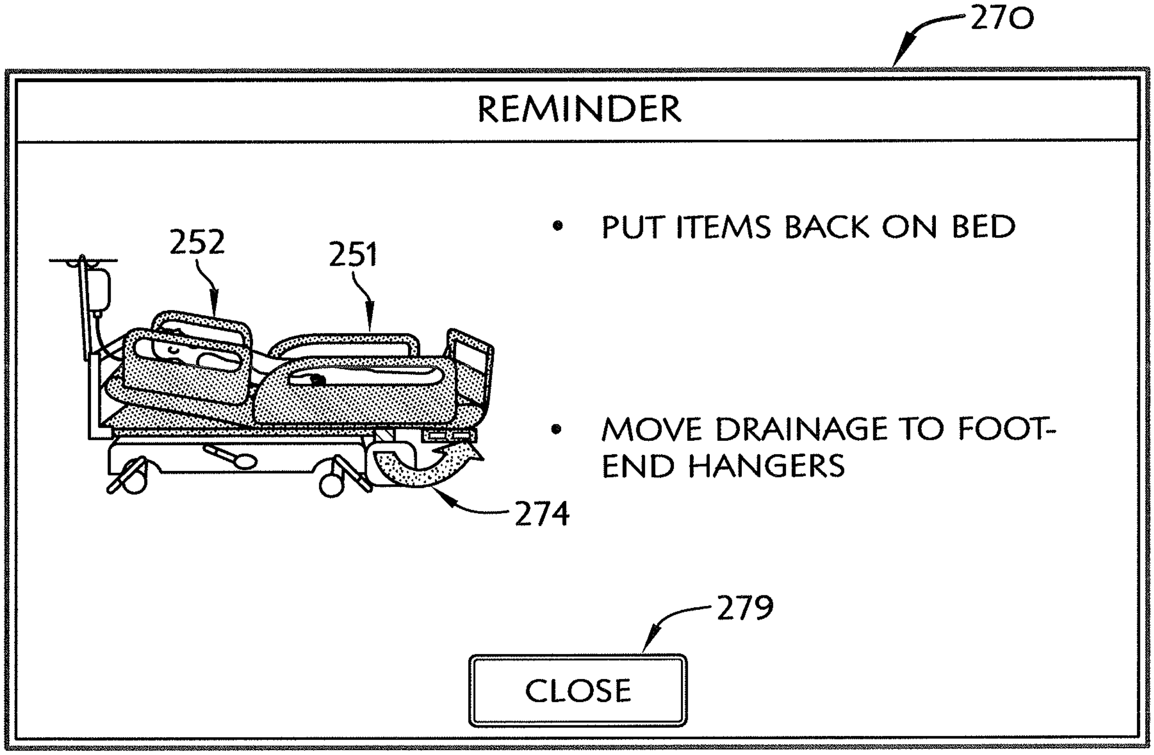
Figure 13B:
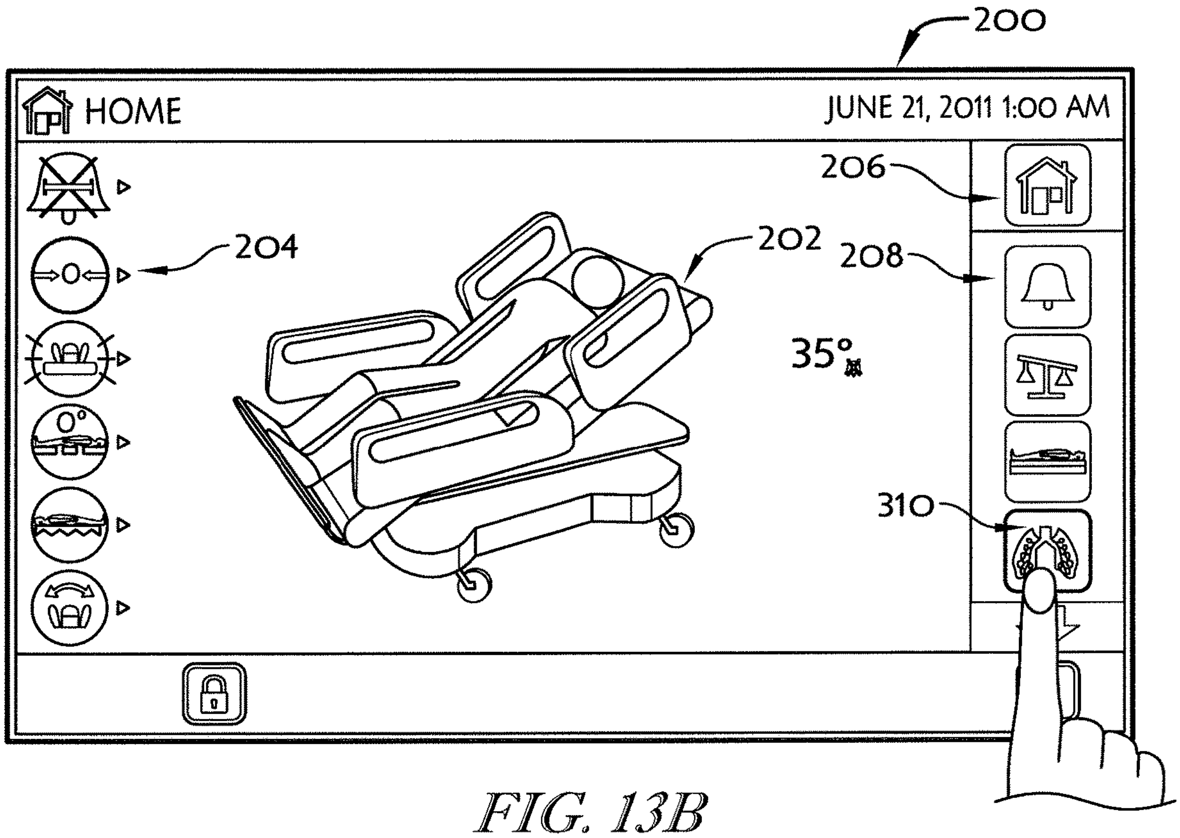
Figure 14B:
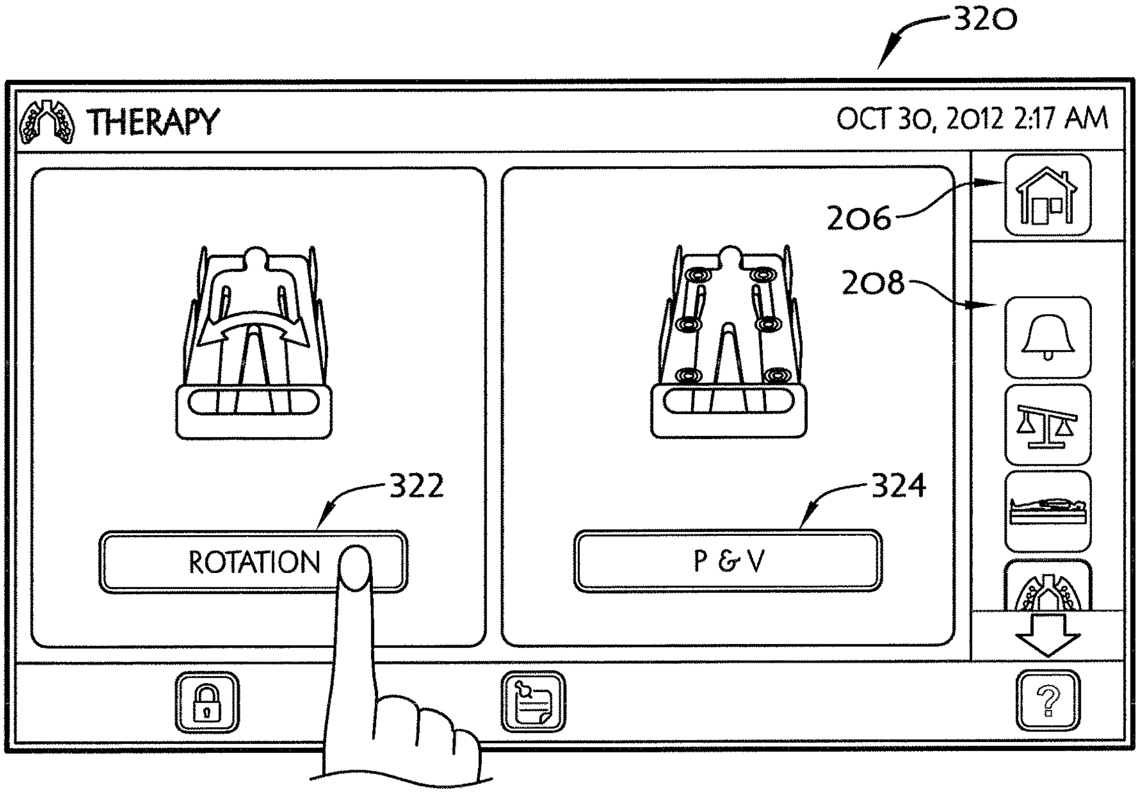
FIG. 14A is a is a block diagram showing a program executed by the controller in response to a user pressing the chair-egress button.
Figure 15A:
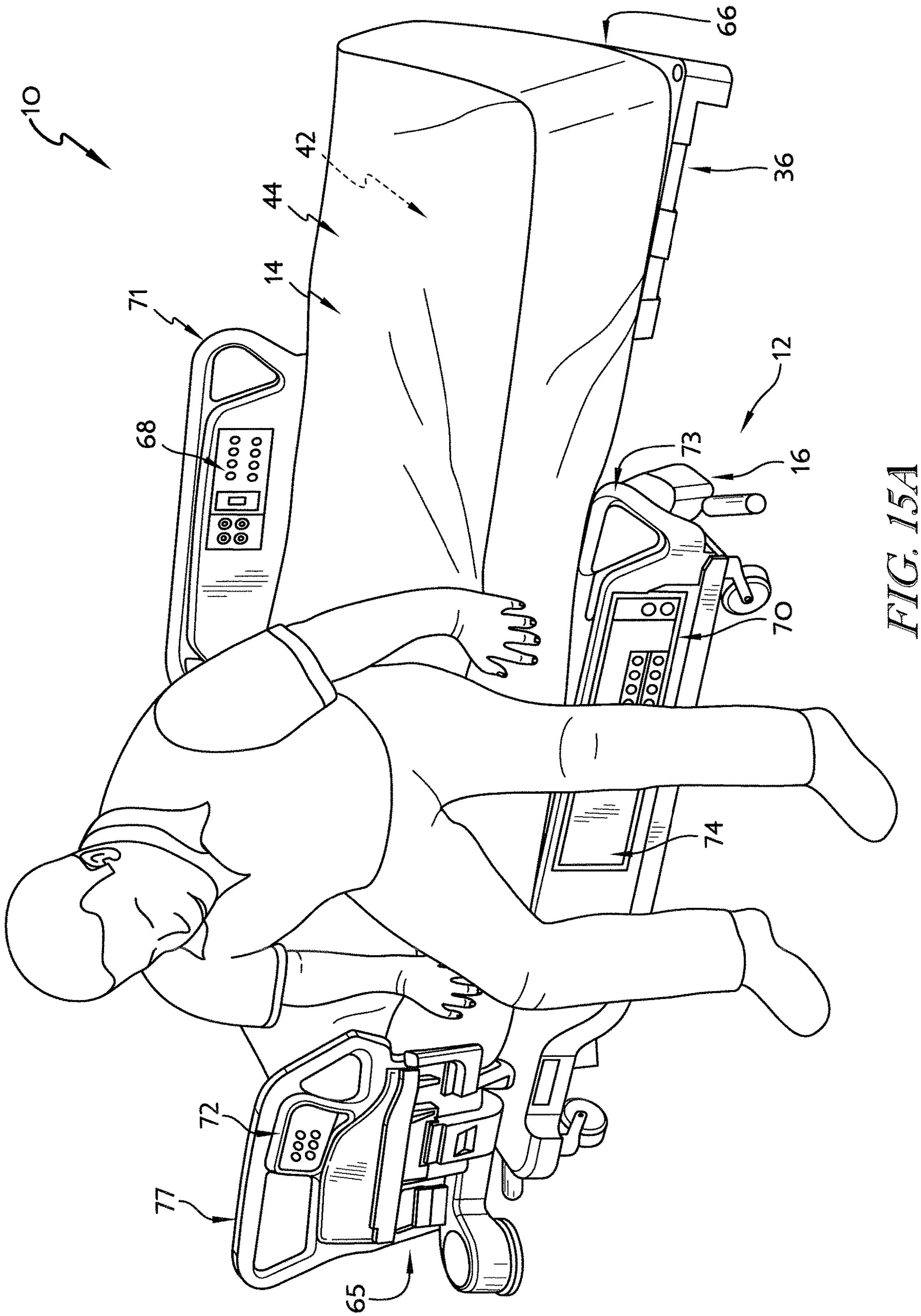
FIG. 15A is a perspective view of the patient support system moved to the side-egress configuration in response to a caregiver pressing and holding a side-egress button included in the second user interface panel (shown in FIG. 5A) to reconfigure the patient support system with an upper frame of the patient support apparatus lowered and with a siderail of the patient support apparatus lowered to allow a patient to exit the patient support system along a side of the patient support system.
Figure 15B:
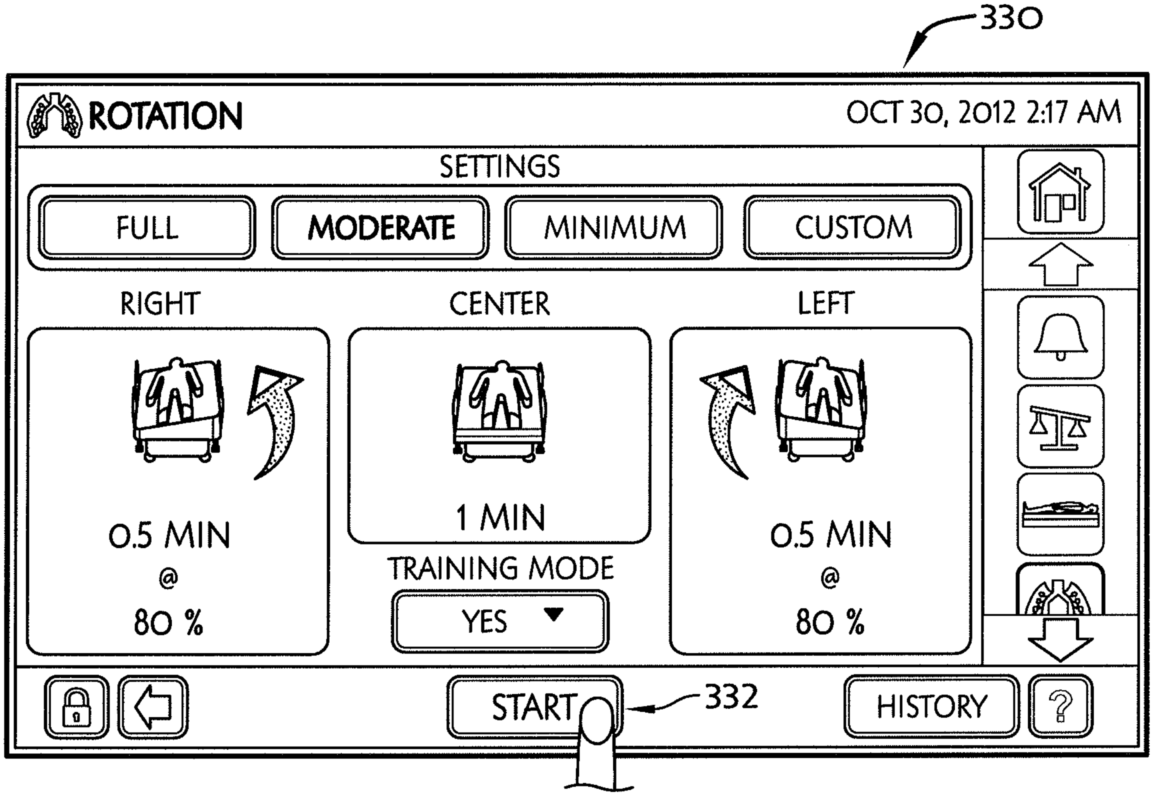
Figure 16B:
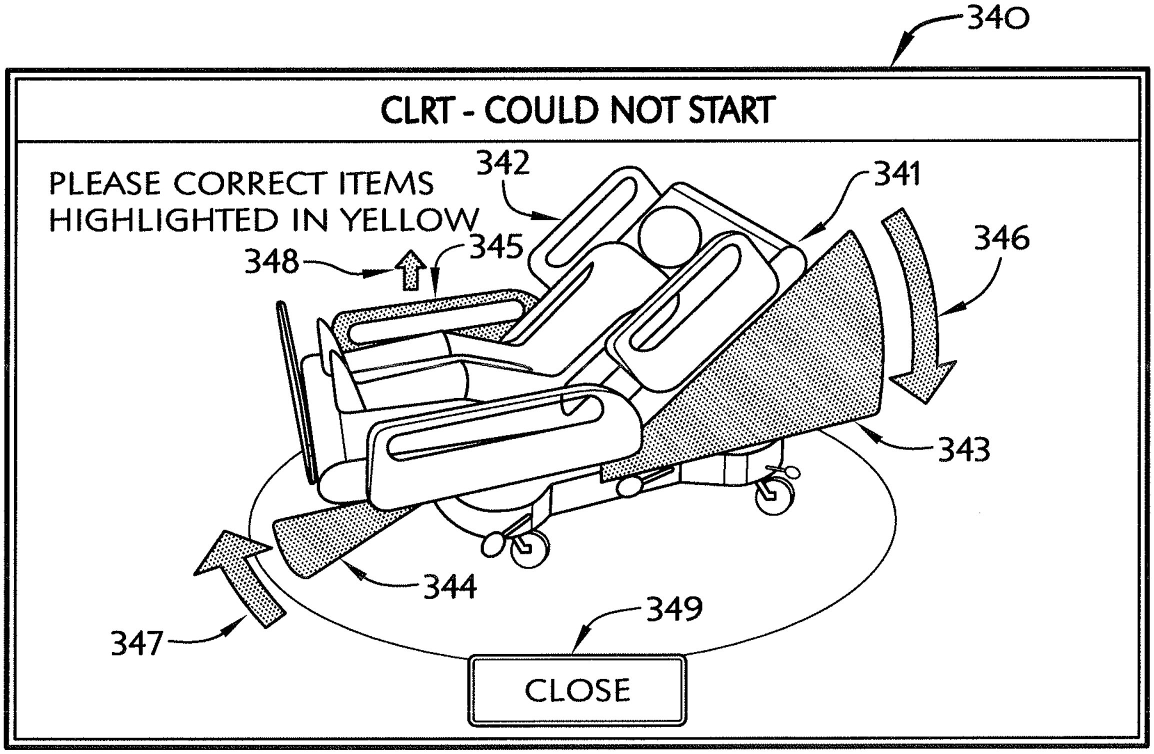
FIGS. 16A-18A are a series of partially diagrammatic side elevation views of the deck and the support surface showing the deck of the patient support apparatus in the flat configuration and showing the support bladders of the support surface inflated to support a patient exiting the patient support system.
Figure 16A:
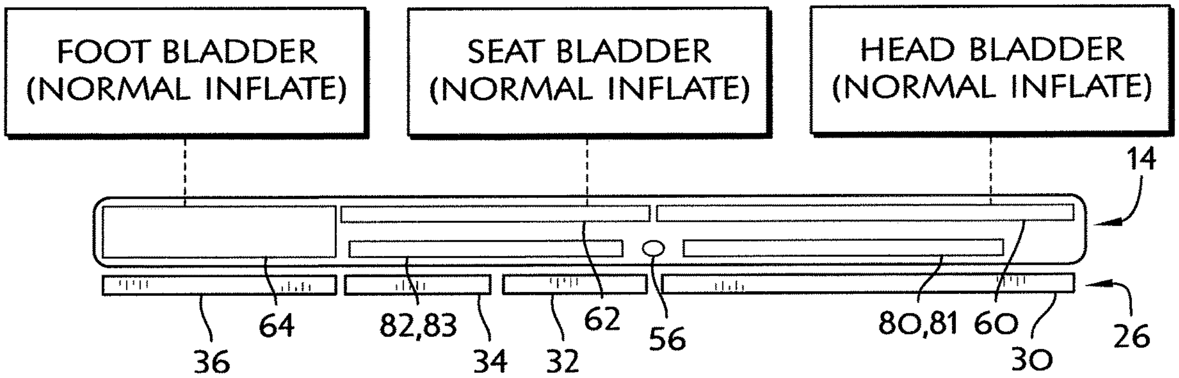
Figure 17A:
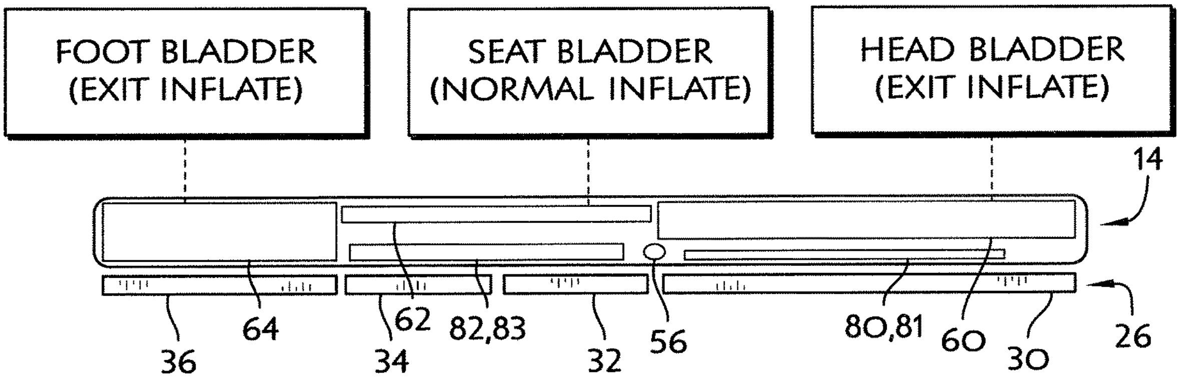
FIG. 17A is a view similar to FIG. 16A showing head bladder and the foot bladder inflated to an exit inflation level to support a patient pushing down with his hands to push himself up during exit from the patient support system as suggested in FIG. 13A.
Figure 18A:
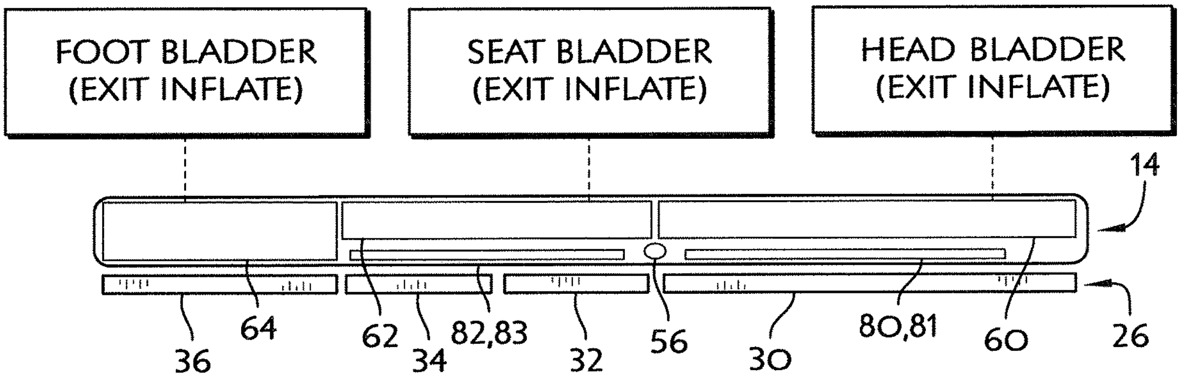
Figure 17B:
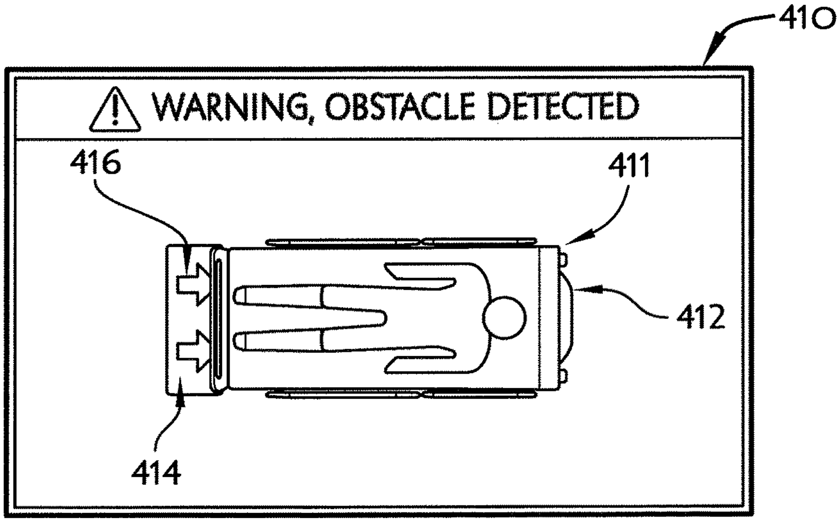
Figure 18B:
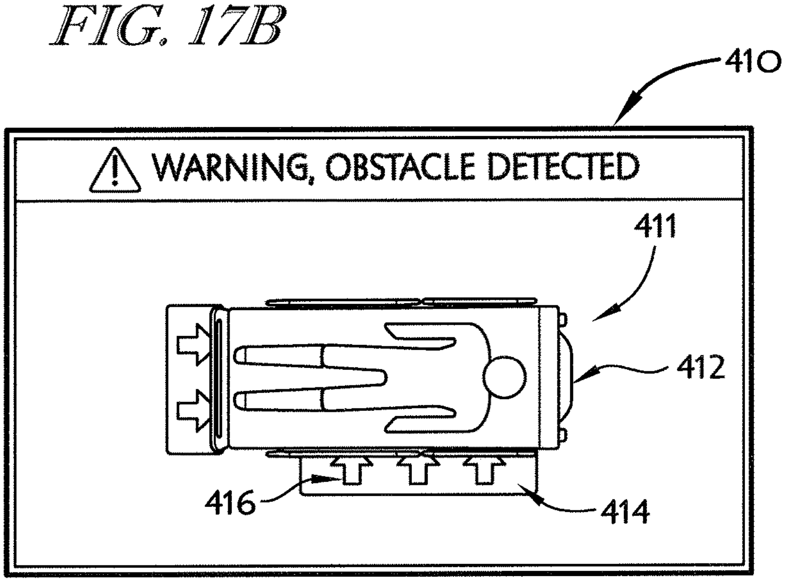
Figure 19B:
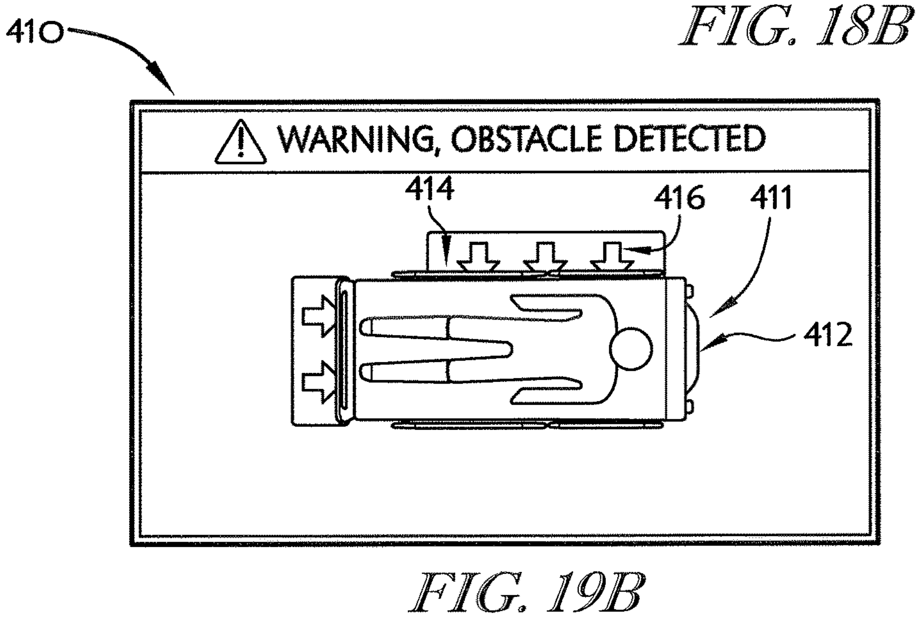

The detailed description particularly refers to the accompanying figures in which:

FIG. 1B is a perspective view of a patient support system including a patient support apparatus with a movable deck and a patient support surface mounted on the deck of patient support apparatus;

FIG. 2B is a diagrammatic view of the patient support system of FIG. 1 showing that the patient support apparatus includes a scale system, a lift system, and a number of sensors;

FIG. 3B is a detail view of a first user input included in the patient support apparatus;

FIG. 4B is a detail view of a second user input included in the patient support apparatus;

FIG. 5B is a detail view of a home screen that is displayed on a user interface included in the patient support apparatus showing a user selecting a scale system icon included in the home screen;

FIG. 6B is a detail view of a main scale screen;

FIG. 7B is a detail view of a scale operation screen indicating that the patient support apparatus is not properly configured to detect an accurate weight of a patient on the patient support system;

FIG. 8B is a detail view of a first recommended position screen including an icon that indicates how to move components of the patient support apparatus so that the patient support apparatus is properly configured to detect an accurate weight of a patient on the patient support system;

FIG. 9B is a detail view of a second recommended position screen including an icon indicating that the patient support apparatus is properly configured to detect an accurate weight of a patient on the patient support system;

FIG. 10B is a detail view of a first reminder screen including an icon and text indicating that items coupled to the deck of the patient support apparatus should be moved prior to recording the weight of a patient on the deck;

FIG. 11B is a detail view of a new patient weight screen showing a recorded patient weight;

FIG. 12B is a detail view of a second reminder screen including an icon and text indicating that items moved from the deck prior to recording the weight of a patient on the deck can be replaced;

FIG. 13B is a detail view of the home screen showing a user selecting a therapy system icon;

FIG. 14B is a detail view of main therapy screen;

FIG. 15B is a detail view of rotation therapy screen;

FIG. 16B is a detail view of a could not start CLRT (lateral rotation therapy) screen including an icon indicating that the patient support apparatus is not properly configured to for the application of lateral rotation therapy;

FIG. 17B is a detail view of a first obstacle detection warning screen with an icon indicating that an obstruction is detected between a lower frame and an upper frame of the patient support apparatus along a foot end of the patient support apparatus;

FIG. 18B is a detail view of a second obstacle detection warning screen with an icon indicating that an obstruction is detected between the lower frame and the upper frame of the patient support apparatus along a left side of the patient support apparatus; and FIG. 19B is a detail view of a third obstacle detection warning screen with an icon indicating that an obstruction is detected between the lower frame and the upper frame of the patient support apparatus along a right side of the patient support apparatus.

DETAILED DESCRIPTION OF THE DRAWINGS

Referring to FIG. 1A, a patient support system is embodied as a hospital bed 10 including a patient support apparatus 12 (sometimes called a bed frame), a support surface 14 (sometimes called a mattress) mounted on the patient support apparatus 12, and a control system 15 coupled to both the patient support apparatus 12 and to the support surface 14. The patient support apparatus 12 is reconfigurable to support a patient on the bed 10 in different positions. The support surface 14 is adapted for use with the patient support apparatus 12 to support the patient in each different position induced by the patient support apparatus 12 and is configured to apply therapies to the patient while supported on the bed 10. The control system 15 controls movement of the patient support apparatus 12 and operation of the support surface 14.

The patient support apparatus 12 illustratively includes a lower frame 16, an upper frame 18, and a lift system 20 coupled to the lower frame 16 and the upper frame 18, as shown in FIG. 1A. The lift system 20 includes a plurality of lift arms 21, 22, 23, 24 and is configured to raise and lower the upper frame 18 relative to the lower frame 16. The lift system 20 is coupled to and controlled by the control system 15 as shown in FIG. 2AA.

The patient support apparatus 12 also includes a deck 26 coupled to the upper frame 18 and repositionable to a plurality of positions as suggested in FIG. 1A. The deck is also coupled to and controlled by the control system 15 as shown in FIG. 2AA.

With regard to movement of the deck 26, the head-deck section 30 is mounted to the upper frame 18 to pivot about an axis relative to the seat-deck section 32 and to slide relative to the seat-deck section 32 and the upper frame 18 as described in U.S. Publication Nos. U.S. 2010/0122415 A1 and U.S. 2012/0005832 A1, both incorporated by reference herein in their entirety, except as they are inconsistent with the present disclosure. The seat-deck section 32 is coupled to the upper frame 18 to move with the upper frame 18. The thigh-deck section 34 is coupled to the seat-deck section 32 to pivot relative to the seat-deck section 32. The foot-deck section 36 is coupled to the thigh-deck section 34 to pivot relative to the thigh-deck section 34. The foot-deck section 36 is also extendable and retractable to lengthen or shorten the deck 26 as desired by a caregiver or to accommodate repositioning of the deck 26.

The control system 15 illustratively includes a controller 25, a plurality of user interfaces 68, 70, 72, 74, 76, a plurality of sensors 78, an air source 79, and a bleed valve 85 as shown in FIG. 2AA. The controller 25 illustratively includes a processor 61 and a memory 91 coupled to the processor 61 and including instructions to be executed by the processor 61. The user interfaces 68, 70, 72, 74, 76 are coupled to the controller 25 and communicate with the controller 25. The sensors 78 are also coupled to the controller 25 to communicate with the controller 25. The air source 79 is coupled to the controller 25 to communicate with the controller 25 and is pneumatically coupled to the bladders 42 included in the support surface 14 to inflate and deflate the bladders 42. The bleed valve 85 is coupled to the controller 25 to communicate with the controller 25 and is pneumatically coupled between the air source 79 and the bladders 42. The bleed valve 85 is configured to selectively vent air passing between the air source 79 and the bladders 42 to the atmosphere around the control system 15.

Sensors 78 illustratively include pressure sensors, load cells, and potentiometers positioned throughout the bed 10. In particular, the pressure sensors are configured to detect the pressure in each bladder of the support surface. The load cells are positioned between the upper frame 18 and the deck 26 and are configured to detect patient weight. The potentiometers are configured to detect the angle of the deck sections 30, 32, 34, 46 and the angle of the upper frame 18 relative to the floor underlying the bed 10.

The support surface 14 is coupled to the deck 26 and moves with the deck 26 as the deck 26 is repositioned as suggested in FIGS. 6A-8A and 11A-13A. The support surface 14 illustratively includes a foam shell 40, a plurality of inflatable bladders 42 supported by the foam shell 40, and a cover 44 encasing the foam shell 40 and the bladders 42 as shown in FIGS. 2AA and 3A. The foam shell 40 underlies the inflatable bladders 42 and supports the bladders 42. The inflatable bladders 42 are coupled to a valve box 45 included in the support surface 14 and are configured to be inflated and deflated to support and apply therapies to a patient on the support surface 14. The cover 44 encapsulates the foam shell 40 and the bladders 42 and accommodates movement of the foam shell 40 and the inflatable bladders 42 during repositioning of the deck 26.

The inflatable bladders 42 included in the support surface 14 illustratively include support bladders 50, rotation bladders 52, percussion and vibration bladders 54, and a fill bladder 56 as shown in FIGS. 2AA and 3A. The support bladders 50 are configured to be inflated to support a patient lying on the support surface 14. The rotation bladders 52 are positioned below the support bladders 50 and are configured to inflate to rotate a patient on the support surface 14 about a longitudinal axis 14A of the support surface. The percussion and vibration bladders 54 are positioned above the support bladders 50 and are configured to apply percussive and/or vibratory therapies to a patient lying on the support surface 14. The fill bladder 56 is located below the support bladders 50 and is configured to fill a gap G1 formed between the support bladders 50 when the deck 26 of the patient support apparatus is repositioned as suggested in FIGS. 6A-8A.

The support bladders 50 include head-support bladder 60, seat-support bladder 62, and foot-support bladder 64 as shown, for example, in FIGS. 2AA and 3A. The head-support bladder 60 having a plurality of laterally extending inflatable cells 60' is located at a head end 65 of the support surface 14. The foot-support bladder 64 having a plurality of laterally extending inflatable cells 64' is located at a foot end 66 of the support surface 14 and is encased in a cover 67. The seat-support bladder 62 having a plurality of laterally extending inflatable cells 62' is located between the head-support bladders 60 and the foot-support bladders 64.

The rotation bladders illustratively include left and right head-turn bladders 80, 81 and seat-turn bladders 82, 83 as shown in FIGS. 2AA and 3A. The left and right head-turn bladders 80, 81 are arranged to lie under a patient's torso when the patient is lying on the bed 10 to turn the patient's torso along the longitudinal axis 14A depending on which head-turn bladder 80, 81 is inflated. The left and right seat-turn bladders 82, 83 are arranged to lie under a patient's seat and thighs when the patient is lying on the bed 10 to turn the patient's legs along the longitudinal axis 14A depending on which seat-turn bladder 82, 83 is inflated.

In the illustrative embodiment, the left head-turn bladder 80 and the left seat-turn bladder 82 are plumbed together to provide left and right inflatable cells for concurrent inflation but in other embodiments may be separately plumbed. Similarly, in the illustrative embodiment, the right head-turn bladder 81 and the right seat-turn bladder 83 are plumbed together for concurrent inflation but in other embodiments may be separately plumbed. The left and right head-turn bladders 80, 81 are spaced apart from the left and right seat turn bladders, 83 to accommodate formation of the gap G2 when the deck 26 of the patient support apparatus is repositioned as suggested in FIGS. 6A-8A.

The cover 44 illustratively includes a topper 86, a fire barrier 88, and a lower ticking 90 as shown in FIGS. 2AA and 3A. The topper 86 is illustratively a low-air-loss topper configured to conduct air along a top side 85 of the support surface 14 to influence the temperature and humidity of a patient's skin supported on the support surface 14. The topper 86 is coupled to the lower ticking 90 by a zipper and overlies the fire barrier 88. The fire barrier 88 is coupled to the lower ticking 90 and extends over the lower ticking to encase the foam shell 40, the bladders 42, and the valve box 45 inside the cover 44.

The lower ticking 90 includes a head-end section 92, a foot-end section 94, and a series of folds 96 coupled to the head-end section 92 and the foot-end section 94 as shown in FIGS. 2AA and 3A. The series of folds 96 are configured to allow expansion of a bottom side 95 of the support surface 14 to accommodate formation of the gap G1 between in the support bladders 50 and the gap G2 between the deck sections 30, 32 when the deck 26 of the patient support apparatus is repositioned as suggested in FIGS. 6A-8A.

Turning now to FIG. 2BA, another diagram showing the pneumatic system of the patient support system is shown. The air source 79 illustratively includes a pump 84 and a valve 95. The pump 84 has a positive pressure outlet 87 and a negative pressure inlet 89 that are connected to the valve 95. In operation, the valve 95 connects either the positive pressure outlet 87 or the negative pressure inlet 89 with the valve box 45 so that the air source 79 can inflate or deflate (vacuum) bladders included in the support surface 14. Additionally, the valve box 45 includes a vent valve 97 that can be opened to vent bladders included in the support surface 14 to cause natural deflation of the bladders.

Figure 4A:
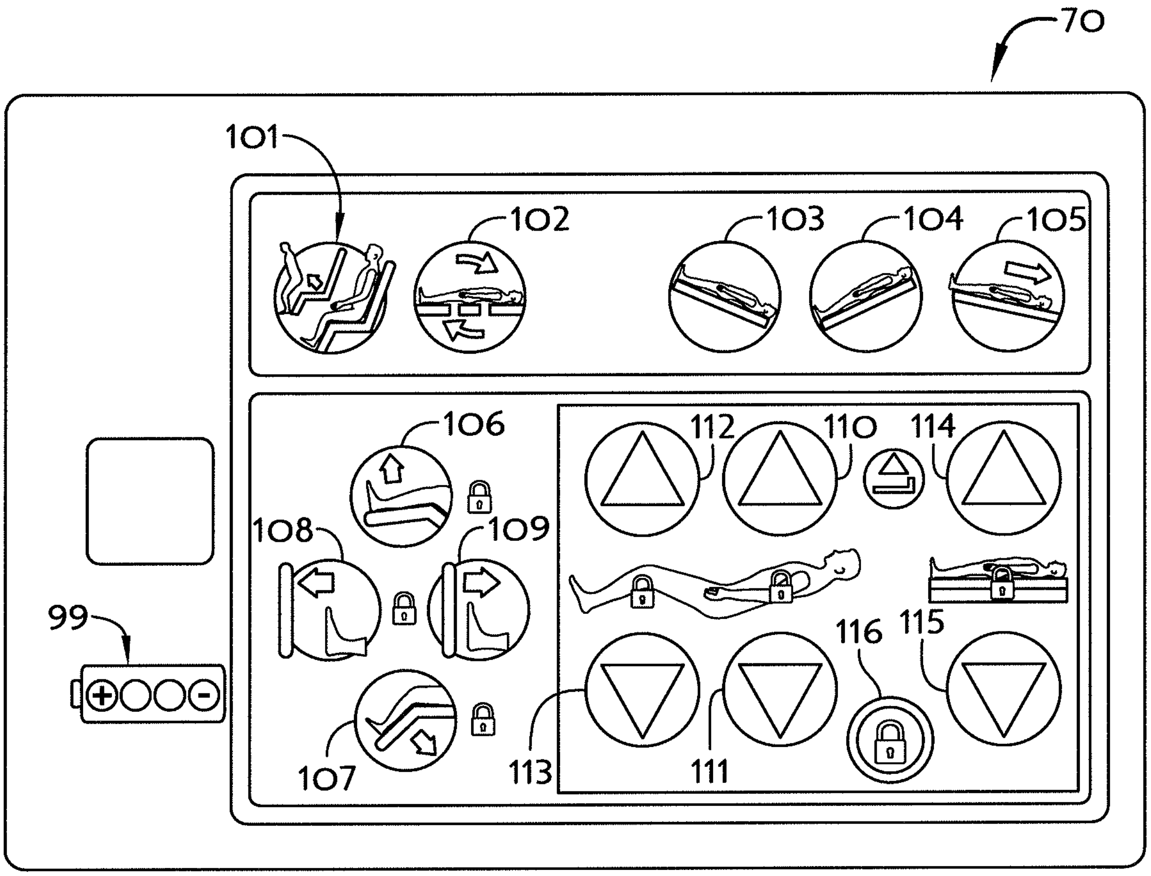
Figure 10A:
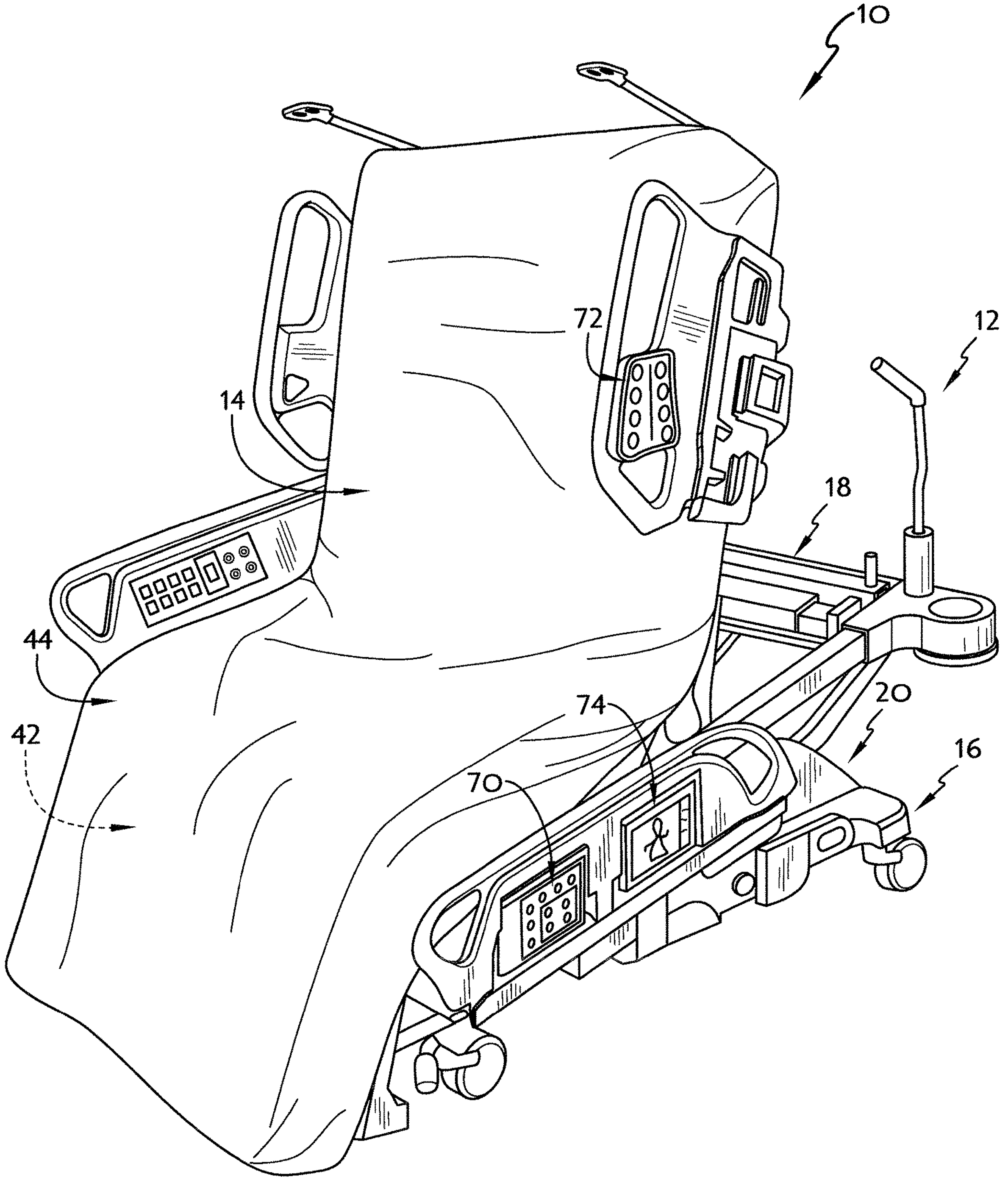
Figure 11A:
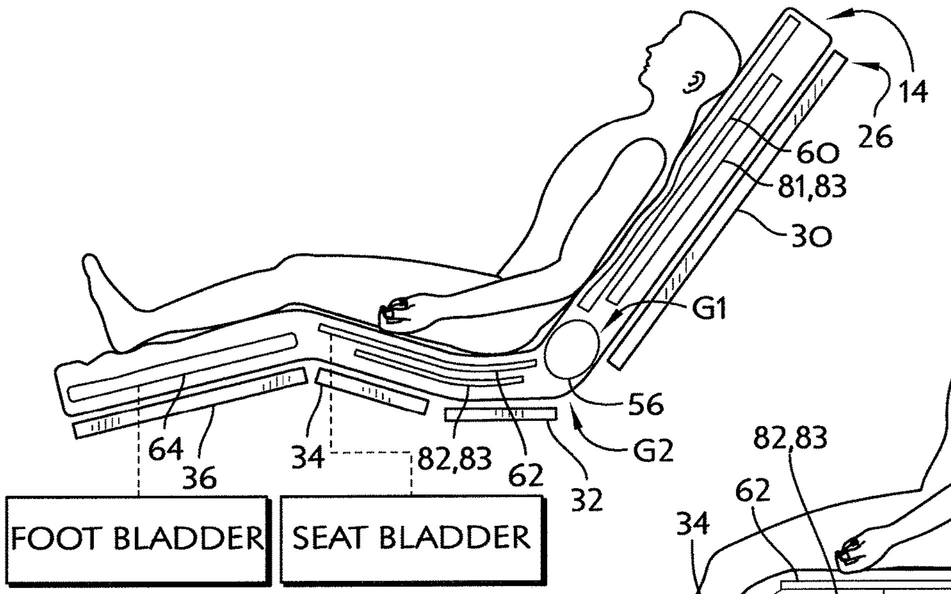
FIGS. 11A-13A are a series of partially diagrammatic side elevation views of the deck and the support surface showing the deck of the patient support apparatus moving from the fully inclined position, shown in FIG. 10A, to the chair-egress configuration, shown in FIG. 12A, and showing that bladders in the support surface deflate and inflate during movement from the fully-inclined configuration to the chair-egress configuration.
Figure 12A:
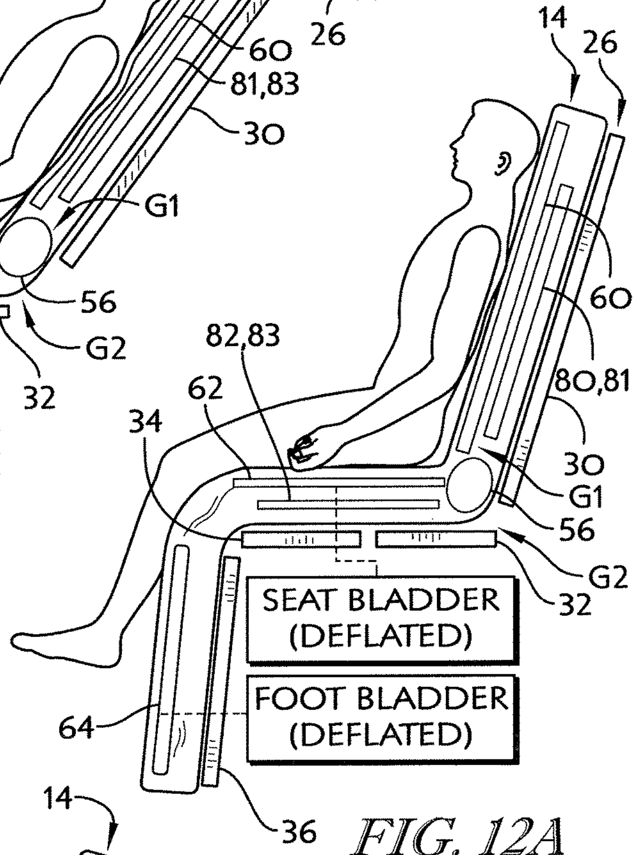
FIG. 12A is a view similar to FIG. 11A showing the deck moved to a chair-egress configuration and showing that the seat bladder and the foot bladder are deflated.

Referring now to FIG. 4A, the first user interface 70 includes a battery level indicator 99 and a plurality of buttons 101-116. Buttons 101-116 are operable by a caregiver to reconfigure the bed 10 by communicating with the controller to operate the deck 26, the lift system 20, the valve box 45, and the air supply 79. Specifically, the first user interface 70 includes the following buttons:

- Chair-egress button 101 for reconfiguring the bed 10 to a chair-egress configuration as shown in FIG. 10A,
- Return-to-flat button 102 for reconfiguring the bed 10 from a non-flat configuration (such as chair-egress) to a flat position,
- Trendelenberg button 103 for reconfiguring the bed 10 to a Trendelenberg configuration,
- Reverse-Trendelenberg button 104 for reconfiguring the bed 10 to a reverse-Trendelenberg configuration,
- Pull-up-in-bed button 105 for flattening the deck and raising the foot end 66 of the deck 26 above the head end 65 of the deck 26 to assist a caregiver pulling a patient up in the bed 10,
- Foot-raise button 106 for raising the foot-deck section 36 as suggested by the icon on the foot-raise button 106,
- Foot-lower button 107 for lowering the foot-deck section 34 as suggested by the icon on the foot-lower button 107,
- Foot-extend button 108 for extending the foot-deck section 36,
- Foot-retract button 109 for retracting the foot-deck section 36,
- Head-deck incline button 110 for increasing the incline of the head-deck section 30 by pivoting the head-deck section 30 relative to the seat-deck section 32 and sliding the head-deck section 30 relative to the seat-deck section 32 and the upper frame 18 as suggested in FIGS. 6A-8A,
- Head-deck decline button 111 for decreasing the incline of the head-deck section 30,
- Thigh-deck incline button 112 for increasing the incline of the thigh-deck section 34,
- Thigh-deck decline button 113 for decreasing the incline of the thigh-deck section 34,
- Upper-frame raise button 114 for lifting the upper frame 18 relative to the lower frame 16,
- Upper-frame lower button 115 for lowering the upper frame 18 relative to the lower frame 16, and
- Unlock button 116 for activating the functions of buttons 101-115 in response to holding down unlock button 116 to prevent unwanted activation of buttons 101-113.

Referring now to FIG. 5A, the second user interface 72 includes a plurality of buttons 117-124. Buttons 117-124 are operable by a caregiver to reconfigure the bed 10 by communicating with the controller to operate the deck 26, the lift system 20, the valve box 45, and the air supply 79. Specifically, the first user interface 70 includes the following buttons:

- Side-egress button 117 for reconfiguring the bed 10 to a side-egress configuration as shown in FIG. 15A,
- Return-to-rest button 118 for returning the bed 10 to a resting configuration from the side-egress configuration,
- Head-deck incline button 119 for increasing the incline of the head-deck section 30 by pivoting the head-deck section 30 relative to the seat-deck section 32 and sliding the head-deck section 30 relative to the seat-deck section 32 and the upper frame 18 as suggested in FIGS. 6A-8A,
- Head-deck decline button 120 for decreasing the incline of the head-deck section 30,
- Thigh-deck incline button 121 for increasing the incline of the thigh-deck section 34,
- Thigh-deck decline button 122 for decreasing the incline of the thigh-deck section 34,
- Upper-frame raise button 123 for lifting the upper frame 18 relative to the lower frame 16, and
- Upper-frame lower button 124 for lowering the upper frame 18 relative to the lower frame 16.

Turning now to FIGS. 6A-8A, the deck 26 of the patient support apparatus 12 is shown moving from a flat position (shown in FIG. 6A) to a fully-inclined position (shown in FIG. 8A) and showing that the fill bladder 56 of the support surface 14 is inflated to fill the gap G1 formed in the support surface 14 and the gap G2 created in the deck 26 during movement to the fully-inclined position. More particularly, when a caregiver presses one of the head-deck incline buttons 110, 119, the controller 25 operates the deck 26 so that the head-deck section 30 pivots and slides relative to the seat-deck section 32 to form in inclined angle with the seat-deck section 32. As the head-deck section 30 moves relative to the seat-deck section 32, the gap G2 expands as shown in FIGS. 7A and 8A. As the gap G2 is formed between the head-deck section 30 and the seat-deck section 32, the gap G1 between the head-support bladders 60 and the seat-support bladders 62 is formed when the head-support bladders 60 move with the head-deck section 30 away from the seat-deck section 32.

The controller 25 is configured to inflate the fill bladder 56 to a level corresponding to the movement of the head-deck section 30 relative to the seat-deck section 32 as suggested in FIGS. 7A and 8A. Specifically, when the head-deck section 30 is moved from a flat position (shown in FIG. 6A) to a partially-inclined position (shown in FIG. 7A), the controller 25 operates the air source 79 and the valve box 45 to inflate the fill bladder 56 to a partially inflated pressure. The partially inflated pressure is pulled by the controller 25 from a look-up table with pressure levels corresponding to the angle of head-deck section 30 incline. When the head-deck section 30 is moved to the fully-inclined position (shown in FIG. 8A), the controller operates the air source 79 to inflate the fill bladder 56 to a fully inflated pressure from the look-up table. As a result of inflating the fill bladder 56 when the head-deck section 30 moves away from the seat-deck section 32, a patient is properly supported on the bed 10 even though the gap G2 is formed in the deck 26 under the patient.

Correspondingly, the controller 25 is configured to deflate the fill bladder 56 in response to a decrease in the angle of the head deck section 30. Specifically, when the head-deck section 30 is moved from the fully-inclined position (shown in FIG. 8A) toward a partially-inclined position, the controller 25 operates the air source 79 to vacuum air from the fill bladder 56 to quickly deflate the fill bladder 56. Once the final position of the head-deck section 30 is established, the controller 25 operates the air source 79 or the vent valve 85 to inflate the fill bladder 56 to a pressure from the look-up table corresponding to the final position of the head-deck section 30.

A program 1000 performed by the controller 25 during movement of the head-deck section 30 to fill any gap G between the head-deck section 30 and the seat-deck section 32 is shown in FIG. 9A. In a first step 1002 of the program 1000, the controller 25 receives an input causing movement of the head-deck section 30. The controller 25 then determines in a step 1004 if the incline of the head-deck section 30 is increasing or decreasing based either on the input or on information from the sensors 78.

If the incline of the head-deck section 30 is decreasing, the controller 25 activates the air source 79 to actively deflate (vacuum) the fill bladder 56 for a predetermined time T in a step 1006 as shown in FIG. 9A. In other embodiments, the controller actively deflates the fill bladder 56 until a predetermined pressure is reached. In a step 1008, the controller 25 receives final incline position information relating to the head-deck section 30 from the sensors 78. The final incline position information is used to determine a desired pressure for the fill bladder 56 in a step 1010. In the illustrative embodiment, the desired pressure is retrieved from a lookup table including matched incline angles and fill bladder pressures.

The controller 25 compares the current pressure in the fill bladder 56 to the determined desired pressure in a step 1012 as shown in FIG. 9A. If the current pressure is lower than desired, the controller 25 activates the air source 79 to actively inflate (blower) to increase pressure in the fill bladder 56 in a step 1014. The controller 25 then deactivates the air source 79 when the desired pressure is reached in a step 1016 and maintains the desired pressure in a step 1018. If the current pressure is higher than desired, the controller 25 opens the vent valve 97 included in the valve box 45 to passively deflate the fill bladder 56 in a step 1020. The controller 25 then closes the vent valve 97 when the desired pressure is reached in a step 1022 and maintains the desired pressure in step 1018.

If the incline of the head-deck section is increasing, the controller 25 activates the air source 79 to actively inflate (blower) the fill bladder 56 in a step 1024 as shown in FIG. 9A. In a step 1026, the controller 25 receives final incline position information relating to the head-deck section 30 from the sensors 78. The final incline position information is used to determine a desired pressure for the fill bladder 56 in a step 1028. Once the desired pressure is known, the controller 25 waits and deactivates the air source 79 (blower) when the desired pressure is reached in step 1016 and maintains the desired pressure in step 1018.

In addition to the fill bladder 56 inflating, the folds 96 of the lower ticking 90 expand during movement of the head-deck section 30 away from the seat-deck section 32. The expansion of the folds 96 between the head-end section 92 and the foot-end section 94 of the lower ticking 90 prevents tearing or over-stretching of the lower ticking 90 during movement of the deck 26.

Referring now to FIG. 10A, the bed 10 is shown moved to the chair-egress configuration. When a caregiver presses the chair-egress button 101, the controller 25 operates the lift system 20 to lower the upper frame 18. The controller 25 also operates the deck 26 to lower the foot-deck section 36 and raise the head-deck section 30 as shown in FIGS. 11A-12A. During movement to the chair-egress configuration, the bed 10 passes through a number of predetermined positions including a sit-up in bed position, a full-chair configuration, and a number of other positions for supporting a patient on the bed 10.

Figure 14A:
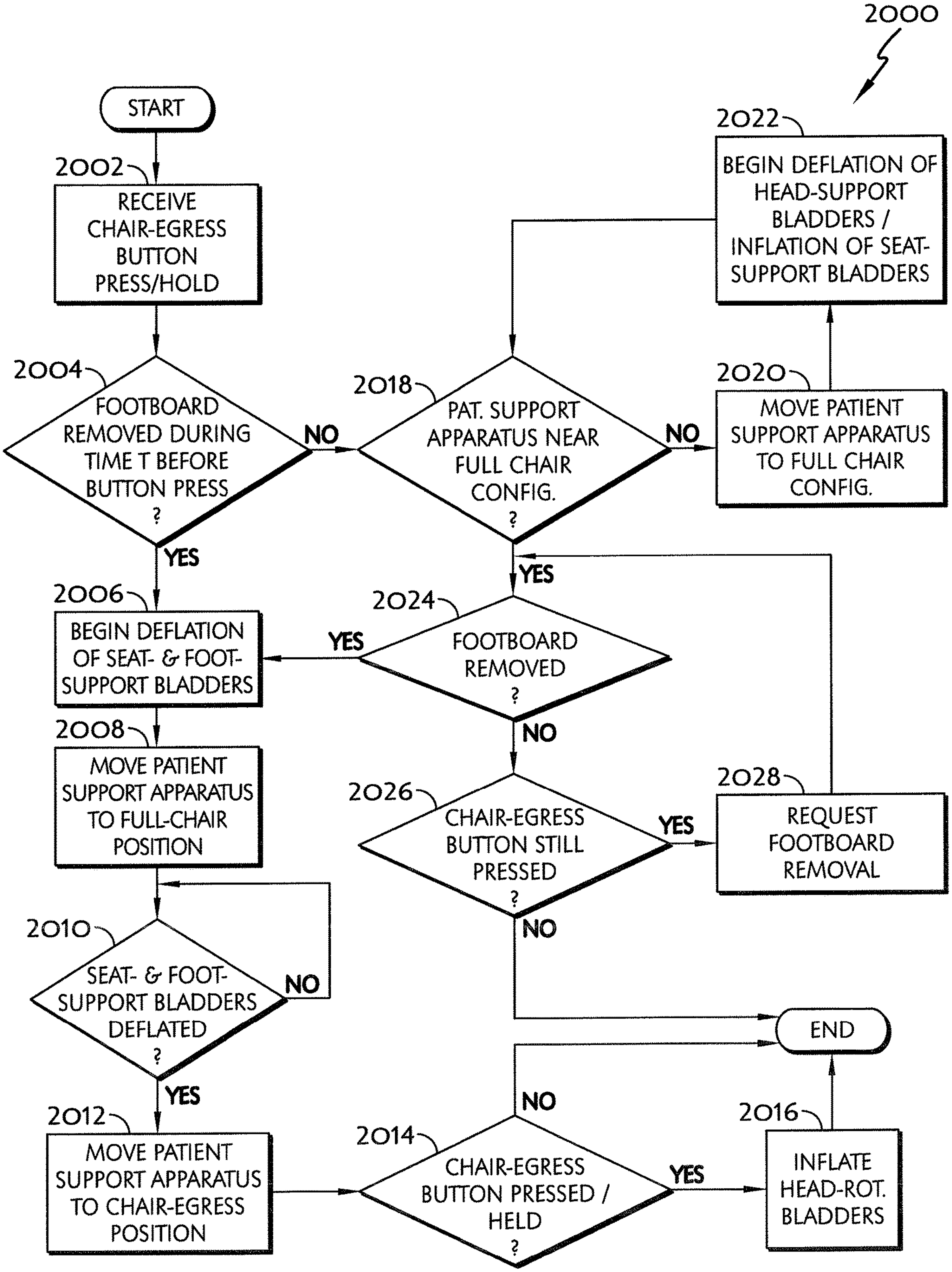

In the illustrative embodiment, if a caregiver presses and holds the chair-egress button 101, the controller 25 performs a program 2000 as shown in FIG. 14A. In a first step 2002 of the program 2000, the controller 25 receives a signal that the chair-egress button has been pressed and held. The controller 25 then determines if a footboard 37 has been removed during a predetermined time period T (illustratively 30 minutes) prior to the pressing and holding of the chair-egress button 101 in a step 2004. If the footboard 37 was removed in the time period before the button press, the controller 25 concludes that the caregiver is likely moving the bed 10 all the way to the chair-egress configuration; if the footboard was not removed in the time period, the controller 25 concludes that the caregiver may be moving the bed 10 only part-way to the chair-egress configuration.

If the footboard 37 has been removed, the controller 25 begins deflation of seat and foot bladders 62, 64 in a step 2006 as shown in FIG. 14A. In the illustrative embodiment, the seat and foot bladders 62, 64 are passively deflated by opening the vent valve 97 included in the valve box 45. The controller 25 also moves the patient support apparatus 12 to the full-chair configuration which is near the chair-egress configuration in a step 2008.

Before moving to the chair-egress configuration, the controller 25 determines if the seat and foot bladders 62, 64 are deflated in a step 2010 as shown in FIG. 14A. If the seat and foot bladders 62, 64 are deflated so that the patient is supported on the stable surfaces of the seat-deck section 32, thigh-deck section 34, and foot-deck section 36 of the deck 26, the controller 25 proceeds to move the bed 10 to the chair-egress configuration in a step 2012. If the seat and foot bladders 62, 64 are not deflated, the controller 25 waits for additional deflation of the seat and foot bladders 62, 64 as suggested in FIG. 14A.

When the chair-egress configuration is reached, the controller 25 determines if the chair-egress button 101 is still (or again) pressed in a step 2014. If the chair-egress button 101 is still pressed, the controller inflates the head-turn bladders 80, 81 so that a patient is gently pushed forward out of the bed 10 in a step 2016. In the illustrative embodiment, air inflating the head-turn bladders 80, 81 is also supplied to the seat-turn bladders 82, 83 since the turn bladders 80/82 and 81/83 are plumbed together. However, since a patient supported on the bed 10 while in the chair-egress configuration is sitting on the seat-turn bladders 82, 83, the head-turn bladders 80, 81 will inflate first to provide a gentle push.

If the footboard 37 has not been removed during time T prior to a user pressing the chair-egress button, the controller 25 determines is the patient support apparatus 12 is near the full-chair configuration in a step 2018 as shown in FIG. 14A. If the patient support apparatus 12 is not near the full-chair configuration, the controller 25 moves the patient support apparatus 12 to the full-chair configuration in a step 2020. Additionally, the controller 25 deflates the head bladder 60 and inflates the seat bladder 62 to maintain even pressure under the patient as the patient's weight is shifted to the seat bladder 62 so that the patient does not "bottom out" when the full-chair configuration is reached.

If the controller 25 determines that the patient support apparatus 12 is near the full-chair configuration, the controller 25 checks to see if the footboard 37 has been removed in a step 2024. If the footboard 37 is not removed, the controller 25 checks to confirm that the chair-egress button 101 is still pressed in a step 2026. If the chair-egress button 101 is still pressed, the controller 25 requests footboard removal in a step 2028. In the illustrative embodiment, footboard removal is requested via a message displayed on the user interface 74. However, in other embodiments, removal may be requested via audio or other signals. If the footboard 37 is removed, the controller 25 proceeds to steps 2006-2014 of the program 2000 to properly adjust the support surface 14 of the bed 10 as suggested in FIG. 14A and described herein.

In some embodiments, the controller 25 coordinates movement of the deck 26 to the chair-egress configuration with deflation of the seat-support bladder 62 and the foot-support bladder 64. More specifically, the controller 25 simultaneously moves the deck 26 toward the chair-egress configuration while deflating the seat-support bladder 62 and the foot-support bladder 64. During movement of the deck 26 and deflation of the seat-support bladder 62 and the foot-support bladder 64, the controller 25 monitors progress of deflation via pressure sensors in the seat-support bladder 62 and the foot-support bladder 64. The controller 25 may slow or pause movement of the deck 26 if pressure in the seat-support bladder 62 and the foot-support bladder 64 are not at a predetermined level corresponding to the position of the deck 26 or if the pressure is not dropping at a predetermined rate. Further, the controller 25 may stop movement of the deck 26 and trigger an alarm to communicate an error or a fault to a caregiver if deflation of the seat-support bladder 62 and the foot-support bladder 64 is not progressing. Thus, the controller 26 prevents movement of the deck 26 to the chair-egress configuration without full deflation of the seat-support bladder 62 and the foot-support bladder 64. Similarly, the controller 25 may coordinate movement of the deck 26 from the chair-egress configuration to the flat position with inflation of the seat-support bladder 62 and the foot-support bladder 64.

As a result of deflating the seat-support bladder 62, a patient supported on the bed 10 is lowered and supported on the hard surface of the seat-deck section 32 and the thigh-deck section 34 when the chair-egress configuration is reached. Supporting the patient on the hard surfaces of the seat-deck section and the thigh-deck section 34 provides stability to the patient so that the patient can stand up out of the bed 10. Additionally, because the foot-support bladder 64 is deflated, the patient is able to place her feet on the floor adjacent to the foot-deck section 36 when exiting the bed 10 as suggested in FIG. 12A.

When the chair-egress configuration is reached, the controller 25 is configured to operate the air source 79 and the valve box 45 to inflate the head-turn rotation bladders 80, 81 (sometimes called boost bladders) to assist a patient exiting the bed 10 as suggested in FIG. 13A. The head-turn rotation bladders 80, 81 are inflated to a push-pressure determined by the controller 25. The push-pressure is illustratively a pressure based at least in part on the most recent patient weight determined by the controller 25.

Referring now to FIG. 15A, the bed 10 is shown moved to the side-egress configuration. When a caregiver presses the side-egress button 117, the controller 25 operates the lift system 20 to lower the upper frame 18. The controller 25 also operates the deck 26 to flatten the deck 26 as shown in FIG. 15A.

In the illustrative embodiment, if a caregiver presses and holds the side-egress button 117 after the patient support apparatus 12 reaches the side-egress configuration, the controller 25 is configured to operate the valve box 45 and the air source 79 to inflate the head-support bladder 60 and the foot-support bladder 64 to an exit pressure as shown in FIG. 17A. Additionally, the rotation bladders 52 are inflated to exit pressures. When the head-support bladder 60 and the foot-support bladder 64 are inflated, the controller 25 is configured to inflate the seat-support bladder 62 to an exit pressure to assist a patient exiting the bed 10 as suggested in FIG. 18A. Exit pressures of the support bladders 60, 62, 64 are generally greater than normal operating pressures as further described below.

As a result of inflating the head-support bladder 60 and the foot-support bladder 64 to the exit pressures, a patient supported on the bed 10 able to push downwardly with his hands to push himself up out of the bed 10 as suggested in FIG. 15A. Additionally, because the seat-support bladder 62 is inflated to an exit pressure, the patient is assisted in exiting the bed 10 as suggested in FIG. 15A.

In the illustrative embodiment, the algorithm for determining the exit pressures of the head-support bladder 60, the seat-support bladder 62, and the foot support bladder 64 are dependent upon patient weight determined by the controller 25 based, at least in part, on information from the load cells sensors 78. The exit pressures are illustratively determined according to the following equations wherein PWSP=patient weight for set points in pounds. All pressures are determined in inches of water and are limited to 32 inches of water.

Head Exit Pressure=(15/400)*PWSP+14, up to 32

Seat Exit Pressure=(15/400)*PWSP+14, up to 32

Foot Exit Pressure=(15/400)*PWSP+14, up to 32

Rotation Exit Pressure=2

Figure 19A:
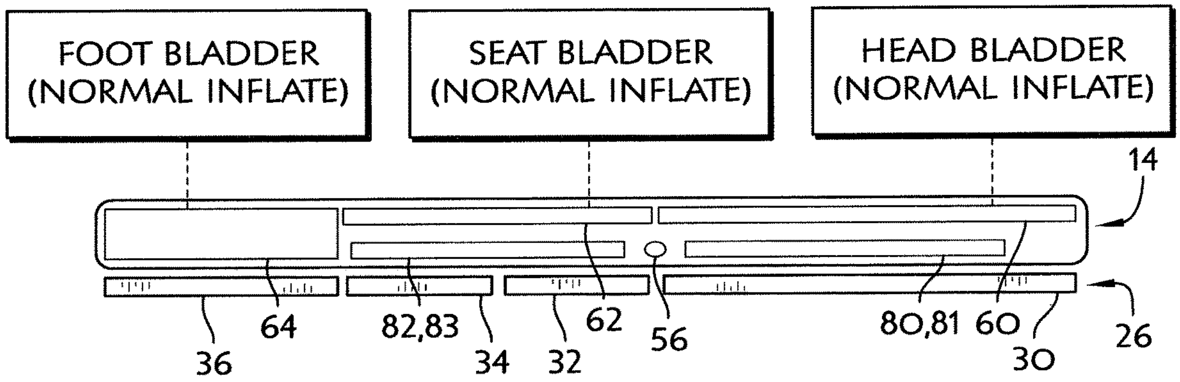
Figure 20A:
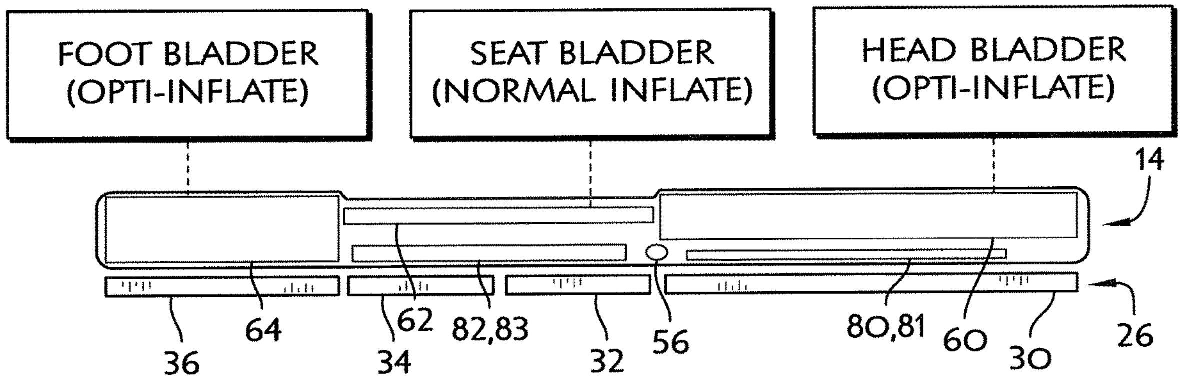
FIG. 20A is a view similar to FIG. 19A showing the head and foot bladders at an opti-rest inflation level, greater than normal inflation, while the seat bladder remains at the normal inflation level during opti-rest therapy.
Figure 21A:
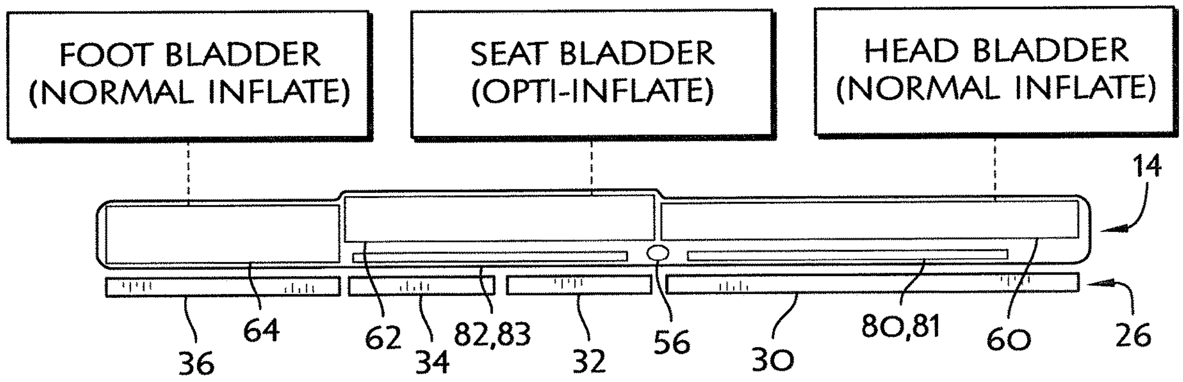

Turning now to FIGS. 19A-21A, the support surface 14 is shown providing an opti-rest or alternating-pressure therapy. During the application of opti-rest therapy, head, seat, and foot bladders 60, 62, 64 are inflated and deflated to shift the pressure profile of the patient support surface 14 under a patient. In the illustrative embodiment, the support surface 14 passes through three different phases during application of the opti-rest therapy. In a first phase, head, seat, and foot bladders 60, 62, 64 are inflated to normal pressures as shown in FIG. 19A. In a second phase, head and foot bladders 60, 64 are inflated to an opti-rest pressure, greater than the normal pressure, while the seat bladder 62 is returned to its normal pressure as shown in FIG. 20A. In a third phase, the seat bladder 62 is inflated while the head and foot bladders 60, 64 are returned to their normal pressures as shown in FIG. 21A. In other embodiments, opti-rest pressures may be less than the normal pressures. In some embodiments, the head, seat, and foot bladders 60, 62, 64 may be inflated/deflated sequentially during opti-rest therapy so that a wave is formed along the top side of the support surface 14.

Figure 22A:
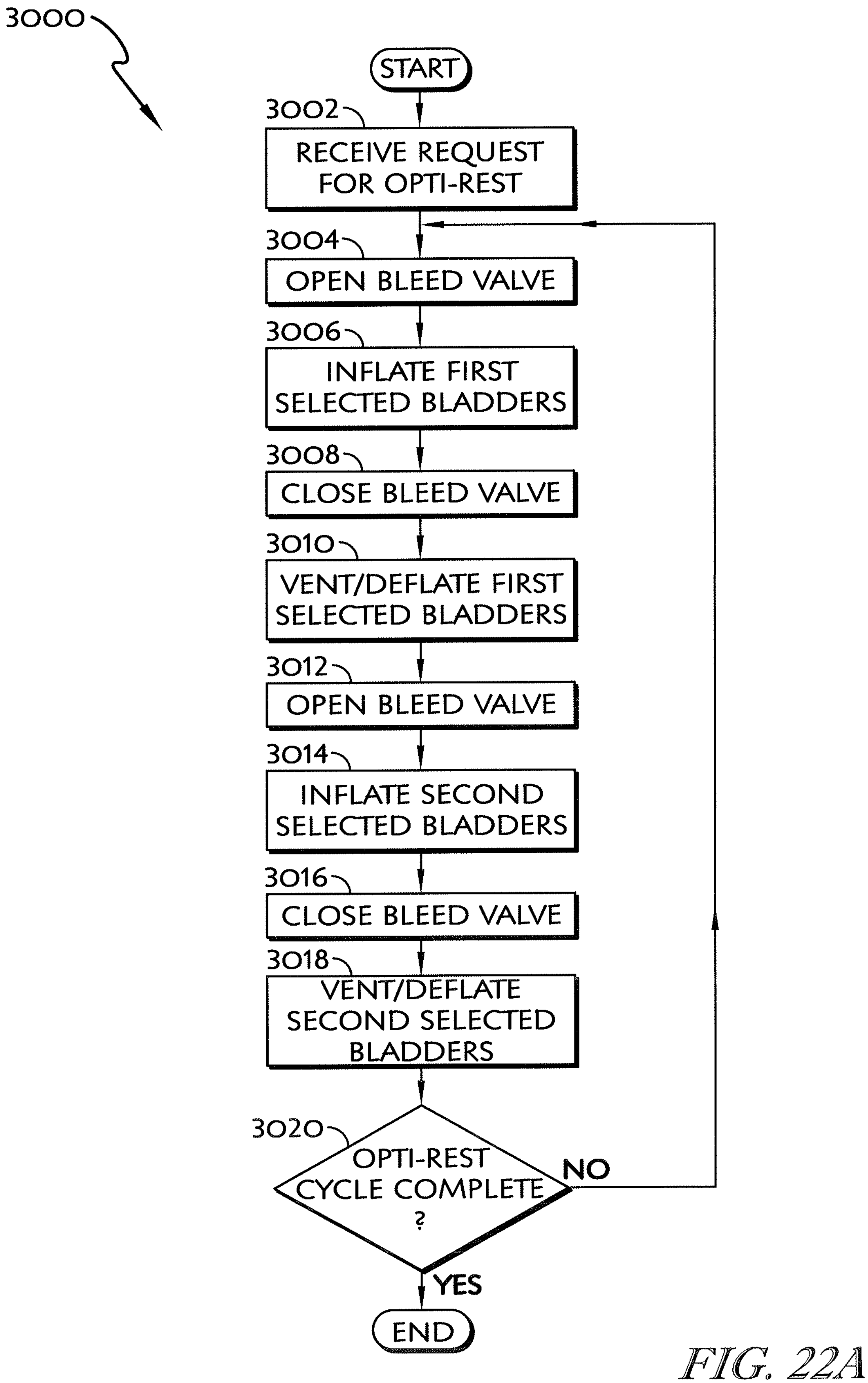
FIG. 22A is a is a block diagram showing a program executed by the controller to provide an opti-rest therapy to a patient supported on the patient support system.

The controller 25 executes a program 3000, shown in FIG. 22A, during application of opti-rest therapy shown in FIGS. 19A-21A. In a first step 3002 of the program 3000, the controller 25 receives a request for opti-rest therapy to be applied. To provide the opti-rest therapy, the controller 25 opens the bleed valve 85 between the air source 79 and the valve box 45 in a step 3004 and inflates a first set of bladders to an opti-rest pressure in a step 3006. In the illustrative embodiment, the first set of bladders include the head bladder 60 and the foot bladder 64. The controller 25 then closes the bleed valve 85 in a step 3008 and passively deflates the first set of bladders to their normal pressure by opening the vent valve 95 included in the valve box 45 in a step 3010.

The controller 25 then opens the bleed valve 85 between the air source 79 and the valve box 45 in a step 3012 and inflates a second set of bladders to an opti-rest pressure in a step 3014 as shown in FIG. 22A. In the illustrative embodiment, the second set of bladders include the seat bladder 62. The controller 25 then closes the bleed valve 85 in a step 3016 and passively deflates the second set of bladders to their normal pressure by opening the vent valve 95 included in the valve box 45 in a step 3018. In some embodiments, the controller 25 may similarly inflate other sets of select bladders to provide various pressure profiles for supporting a patient. The controller 25 then determines if the requested opti-rest cycle is complete (timed out/turned off) in a step 3020. If the opti-rest cycle is not complete, the controller 25 loops back and repeats steps 3004-3018. By opening the bleed valve 85 during inflation of the head, seat, and foot bladders 60, 62, 64, the rate of inflation of the head, seat, and foot bladders 60, 62, 64 can be reduced while continuing to run the pump 89 of the air source 79 at an efficient speed.

Figure 23A:
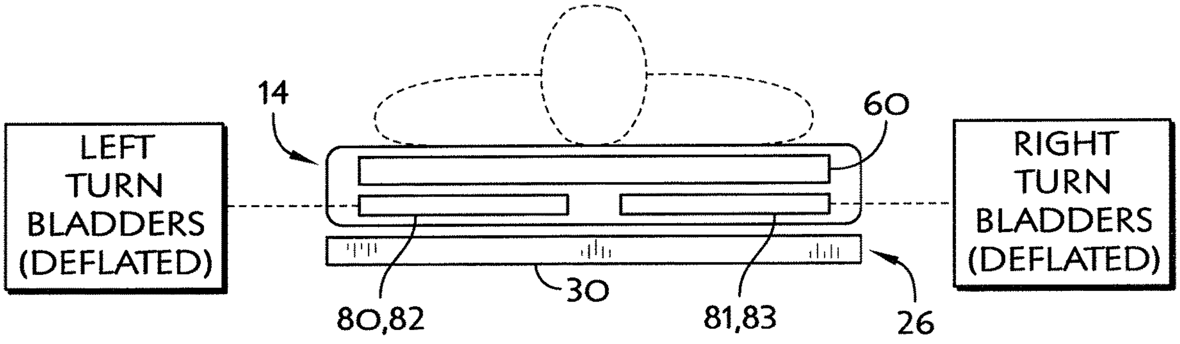

Referring now to FIGS. 23A-25A, the support surface 14 is shown on the deck 26 providing lateral rotation therapy. During lateral rotation therapy, the right turn bladders 81, 83 and the left turn bladders 80, 82 are alternately inflated and deflated to rotate a patient about a longitudinal axis of the patient support surface 14. More specifically, in the illustrative embodiment, the support surface 14 passes through three phases during lateral rotation therapy as shown in FIGS. 23A-25A. In a first phase, the right and left turn bladders 80-83 are deflated as shown in FIG. 23A. In a second phase, the right run bladders 81, 83 are inflated while the left turn bladders 80, 82 remain deflated so that a patient supported on the support surface 14 is rotated in a first direction as suggested in FIG. 24A. In a third phase, the left run bladders 80, 82 are inflated while the right turn bladders 81, 83 are deflated so that a patient supported on the support surface 14 is rotated in a second direction as suggested in FIG. 24A.

Figure 24A:
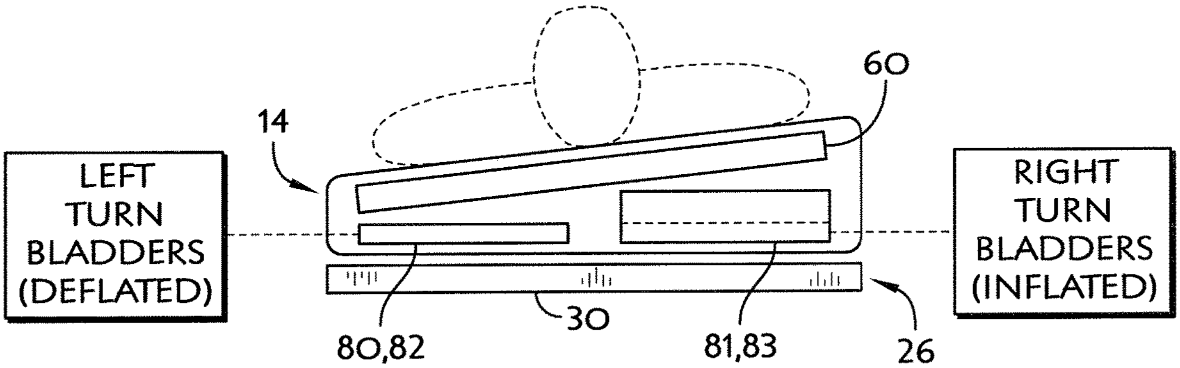
FIG. 24A is a view similar to FIG. 23A showing the right rotation bladders inflated and the left rotation bladders deflated so that a patient is supported on an inclined top side of the support surface and is rotated about the longitudinal axis of the support surface.
Figure 25A:
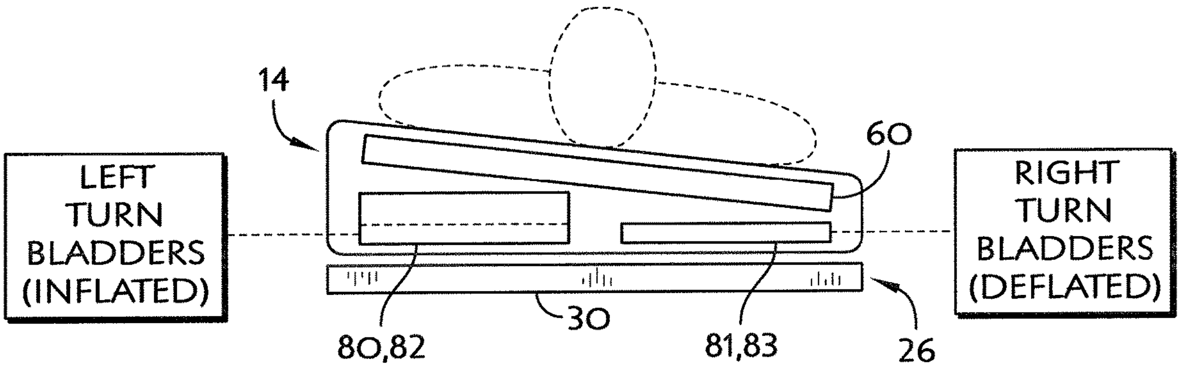
Figure 26A:
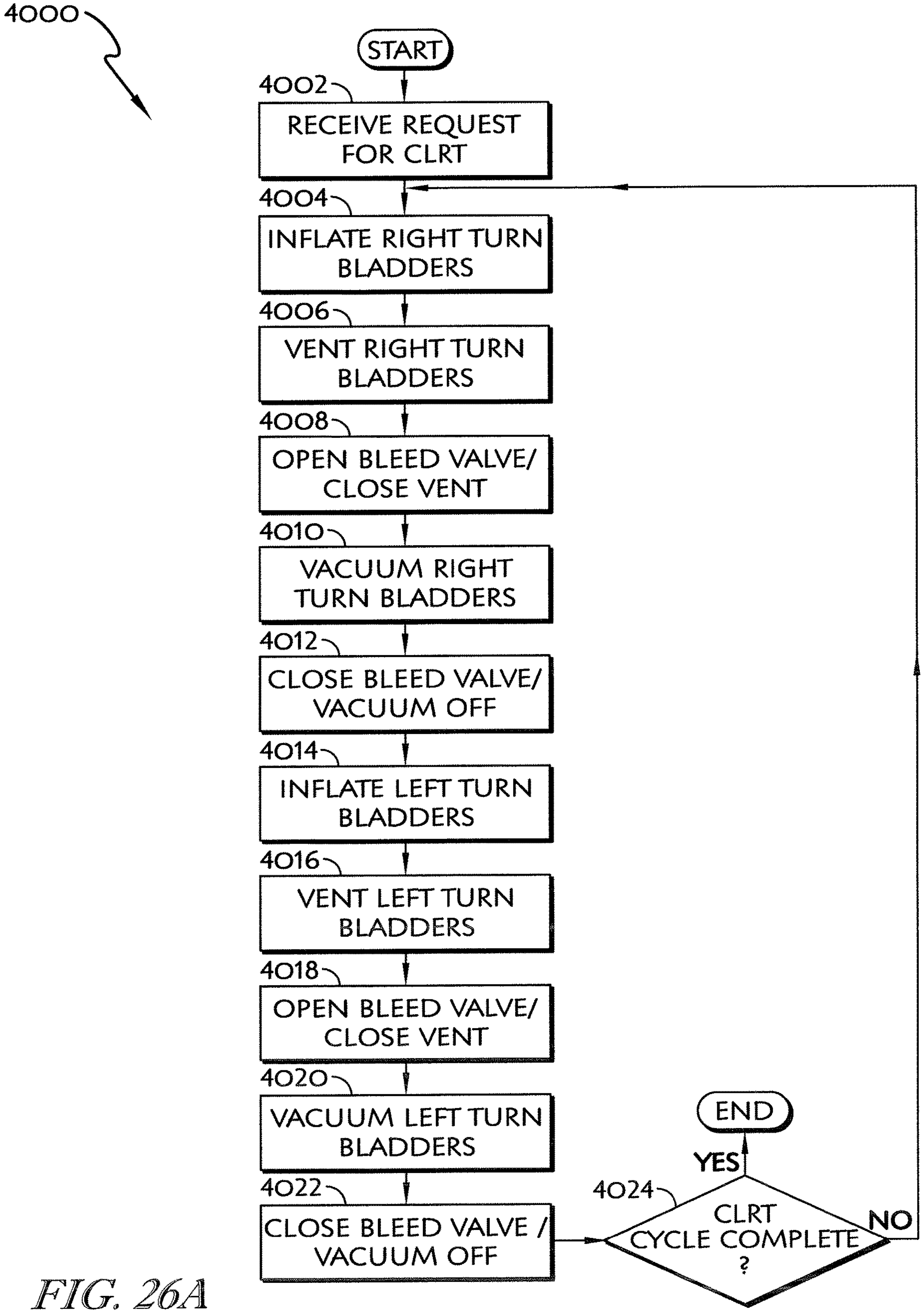
FIG. 26A is a block diagram showing a program executed by the controller to provide a lateral rotation therapy to a patient supported on the patient support system.

The controller 25 executes a program 4000, shown in FIG. 26A, during application of lateral rotation therapy shown in FIGS. 23A-25A. In a step 4002, the controller 25 receives a request for lateral rotation therapy from the user interface 72. Then, in a step 4004, the controller 25 inflates the right turn bladders 81, 83 by engaging the air source 79 as a blower and adjusting the valve box 45 to couple the air source 79 to the right turn bladders 81, 83 as shown in FIG. 24A. Because of the inflated right turn bladders 81, 83, a patient on the support surface 14 is rotated as suggested in FIG. 24A.

After inflation of the right turn bladders 80, 82, the controller 25 passively deflates the right turn bladders 81, 83 by opening the vent valve 97 included in the valve box 45 in a step 4006 as shown in FIG. 26A. The controller 25 closes the vent valve 97 and opens the bleed valve 85 in a step 4008 before engaging the air source 79 to actively deflate (vacuum) the right turn bladders 80, 82 in a step 4010. When all turn bladders 80-83 are again deflated, the controller 25 closes the bleed valve 85 and disengages the air source 79 in a step 4012.

In a step 4014, the controller 25 inflates the left turn bladders 82, 84 by engaging the air source 79 as a blower and adjusting the valve box 45 to couple the air source 79 to the left turn bladders 80, 82 as shown in FIG. 25A. Because of the inflated left turn bladders 80, 82, 83, a patient on the support surface 14 is rotated as suggested in FIG. 26A.

After inflation of the left turn bladders 81, 83, the controller 25 passively deflates the left turn bladders 80, 82 by opening the vent valve 97 included in the valve box 45 in a step 4016 as shown in FIG. 26A. The controller 25 closes the vent valve 97 and opens the bleed valve 85 in a step 4018 before engaging the air source 79 to actively deflate (vacuum) the left turn bladders 81, 83 in a step 4020. When all turn bladders 80-83 are again deflated, the controller 25 closes the bleed valve 85 and disengages the air source 79 in a step 4022. The controller 25 then determines if the requested lateral rotation therapy cycle is complete (timed out/turned off) in a step 4024. If the lateral rotation therapy is not complete, the controller 25 loops back and repeats steps 4002-4022. By opening the bleed valve 85 and actively deflating the turn bladders during lateral rotation therapy, the controller 25 may avoid overheating and/or overwork of the pump 84 of the air source 79. Additionally, opening the bleed valve 85 may allow for a slower predetermined deflation rate.

Referring now to FIGS. 27A-29A, the support surface 14 is coupled to the patient support apparatus 12 by a plurality of lugs 130-135 received in corresponding lug-receiver apertures 136-141. A first pair of lugs 130, 131 is coupled to the head-end section 92 of the lower ticking 90 along the head end 65 of the support surface 14. The first pair of lugs 130, 131 is received in a corresponding pair of keyhole slots 136, 137 formed in the head-deck section 30 of the deck 26 as suggested in FIGS. 17A-19A. A second pair of lugs 132, 133 is coupled to the foot-end section 94 of the lower ticking 90 along the foot end 66 of the support surface 14. The second pair of lugs 132, 133 are received in a corresponding pair of keyhole slots 138, 139 formed in the foot-deck section 36 of the deck 26 as suggested in FIGS. 27A-29A. A third pair of lugs 134, 135 is coupled to the ticking 90 between the head end 65 and the foot end 66 of the support surface 14. The third pair of lugs 130, 131 is received in a corresponding pair of notches 140, 141 formed in the seat-deck section 32 of the deck 26 as suggested in FIGS. 27A-29A.

Figures 27A, 27B, 27C:
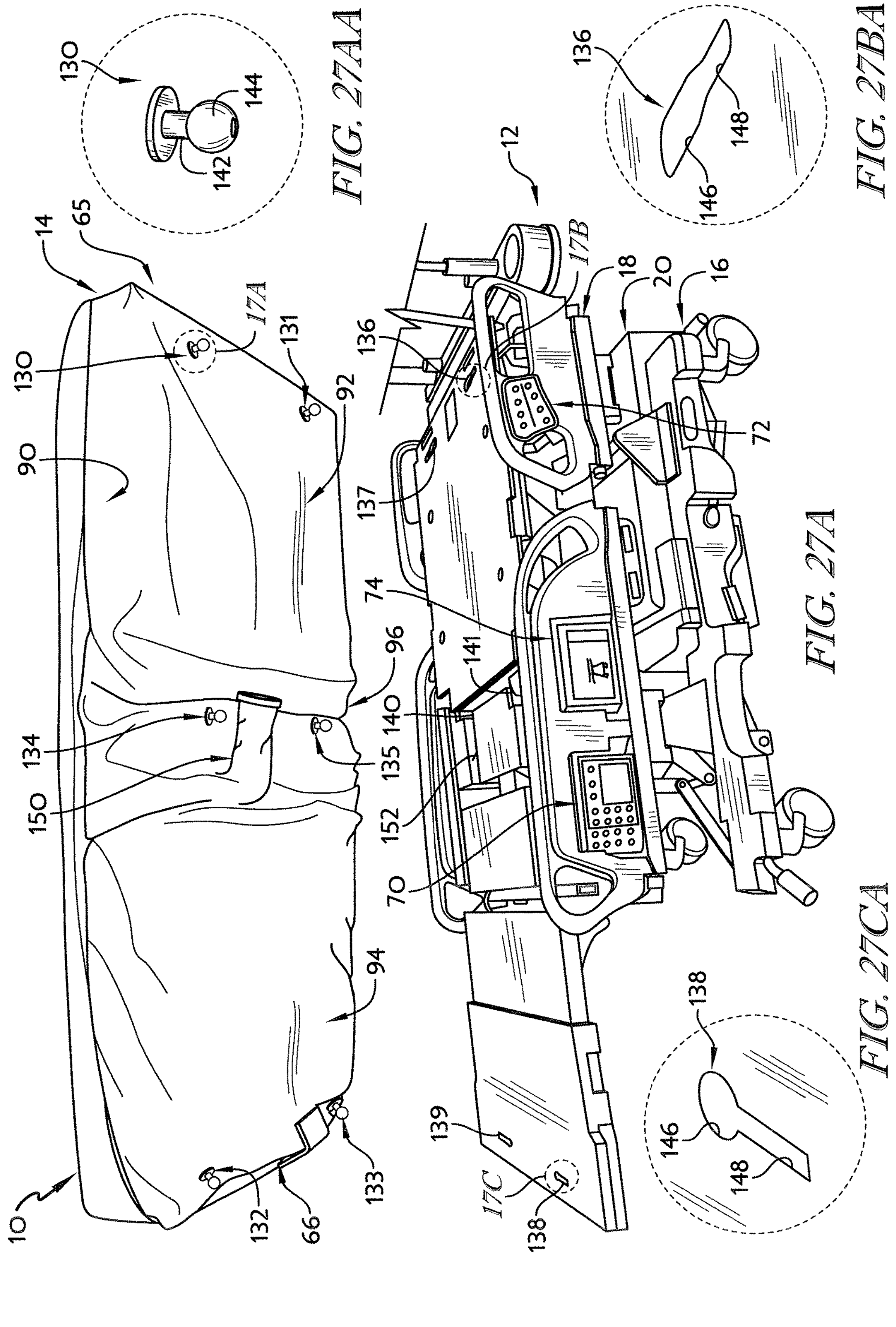
FIG. 27A is a perspective view of the patient support system of FIG. 1A showing the support surface lifted up off of the patient support apparatus to expose the deck of the patient support apparatus.
FIG. 27BA is a detail view of one of the lug-receiving apertures shown in FIG. 27A.
FIG. 27CA is a detail view of another of the lug-receiving apertures shown in FIG. 27A.
Figure 28A:
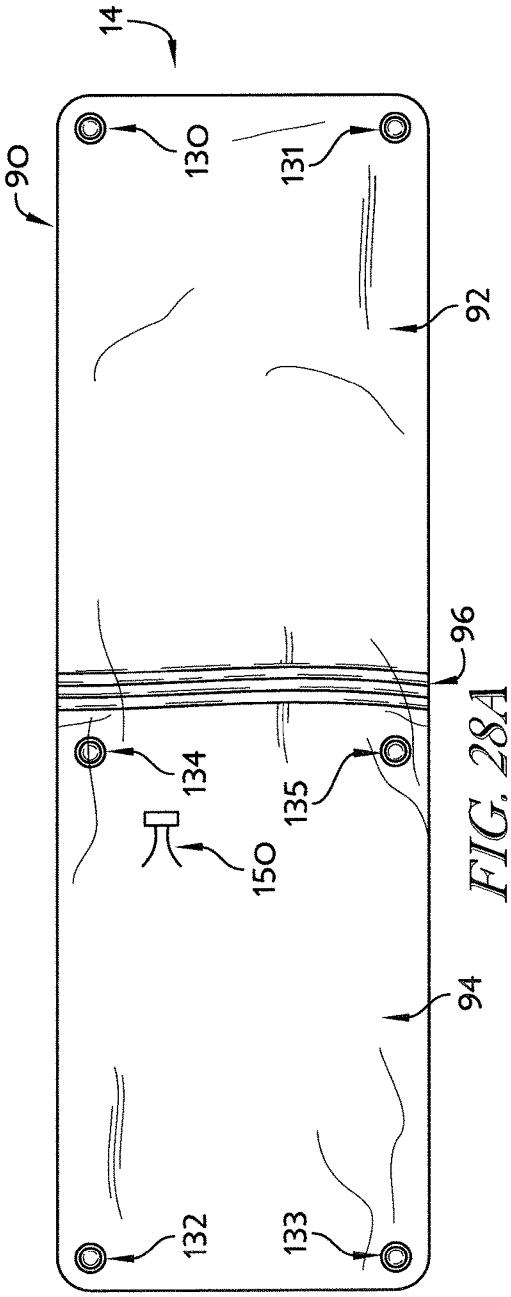
FIG. 28A is a bottom plan view of the support surface of FIGS. 1A and 17A showing the location of the lugs used to couple the support surface to the deck of the patient support apparatus.

As suggested in FIG. 27AA, each lug includes a stem 142 and a ball 144 coupled to the stem and spaced apart from the lower ticking 90. The stems 142 extend through the deck 26 and the balls 144 are trapped below the deck 26 by the lug-receiver apertures 136-141 when the support surface 14 is mounted on the patient support apparatus 12.

Figure 29A:
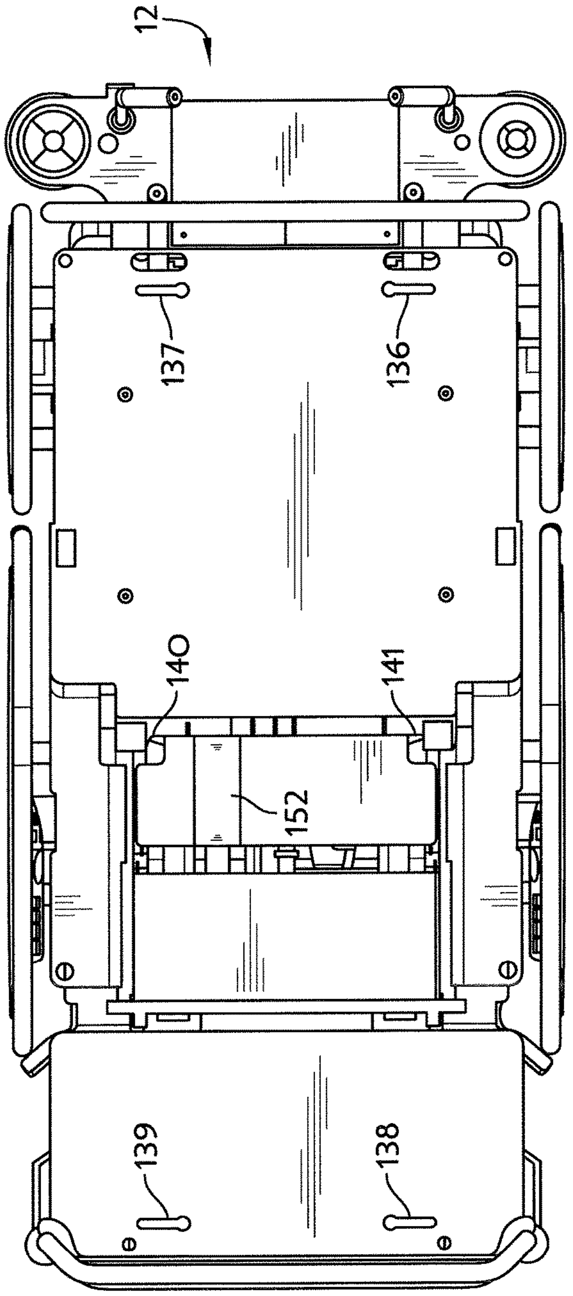
FIG. 29A is a top plan view of the patient support apparatus of FIGS. 1A and 17A showing the location of the lug apertures formed in the deck to receive the lugs used to couple the support surface to the patient support apparatus.

In the illustrative embodiment, the keyhole slots 136, 137, 138, 139 have a wide portion 146 and a narrow portion 148 as shown in FIGS. 27BA and 27CA. The wide portions 146 are illustratively located inwardly of the narrow portions 148 as shown in FIG. 29A.

Referring again to FIGS. 27A-29A, the support surface 14 includes a trunk 150 extending downwardly from the foot-end section 94 of the lower ticking 90 as shown in FIG. 27A. The seat-deck section 32 is formed to include a channel 152 extending downwardly toward the floor underlying the bed 10 and arranged to receive the trunk 150 of the support surface 14 as suggested in FIGS. 27A-29A. The trunk 150 includes air lines and communication lines for coupling the controller 25 and the air source 79 to the support surface 14 as shown in FIG. 2AA.

Figure 30A:
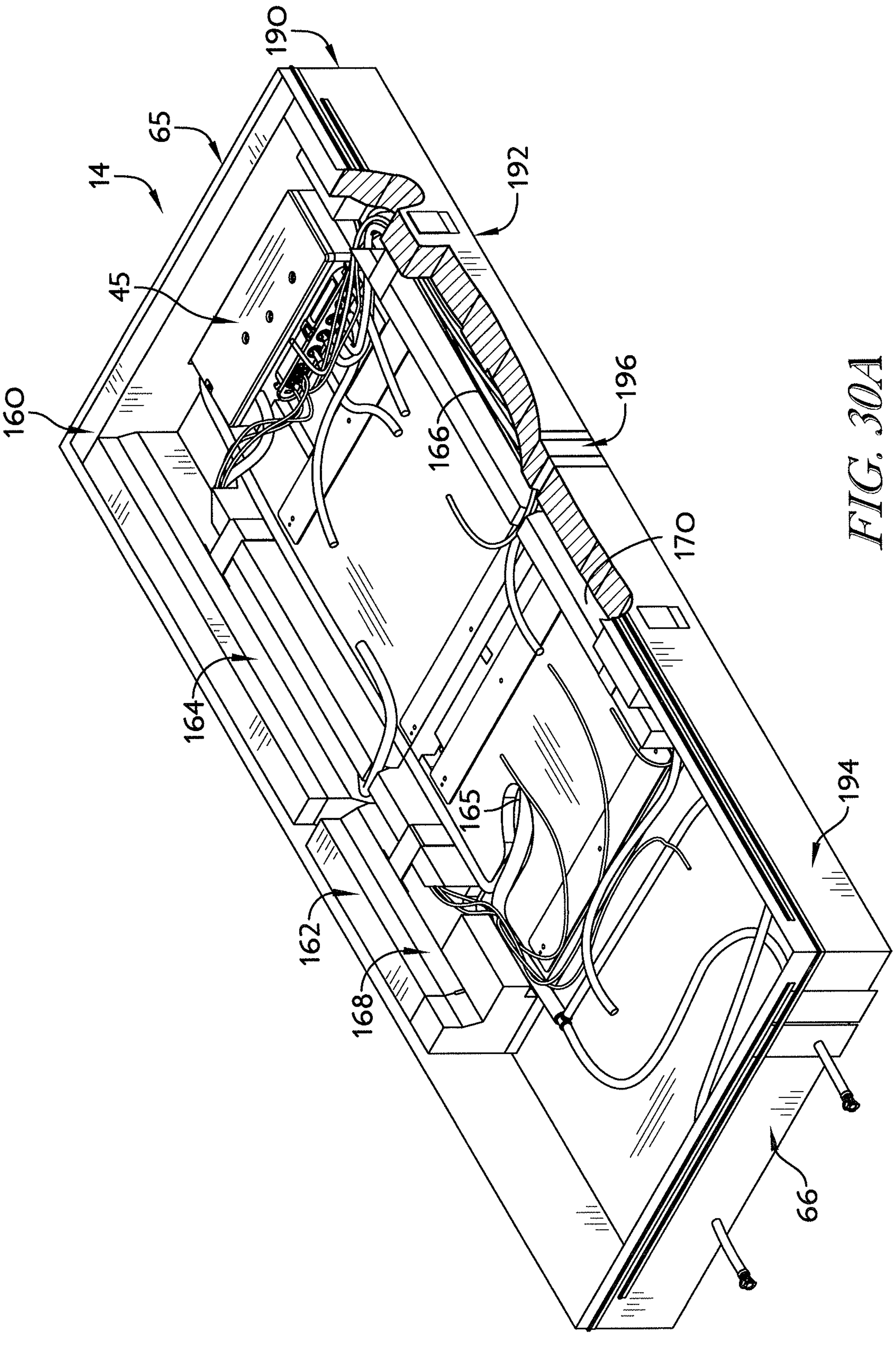
FIG. 30A is a perspective view of the support surface of FIG. 1A showing components removed to expose the foam shell and to show that the foam shell includes a head portion formed to include line routing channels and a seat portion formed to include an entry port.
Figure 31A:
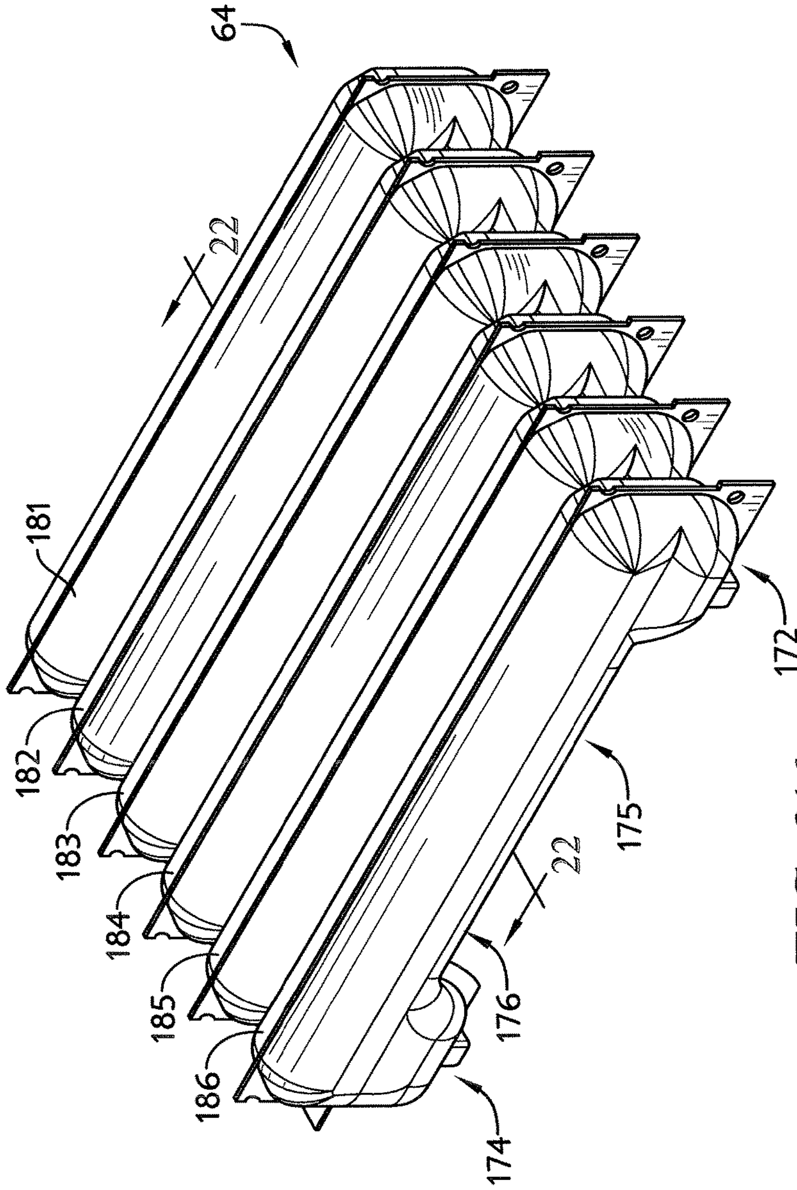
FIG. 31A is an enlarged perspective view of the foot bladder included in the support surface of FIGS. 1A-3A showing that the foot bladder has a reduced thickness central section configured to conform to a patient's heel in response to a patient's foot resting on the foot bladder.
Figure 32A:
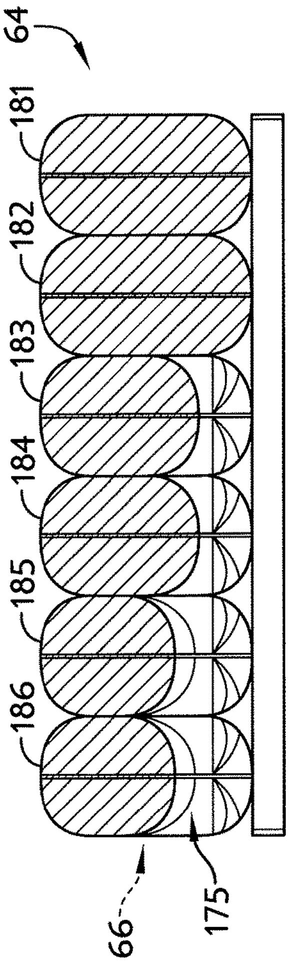
FIG. 32A is a cross-sectional view of the foot bladder in FIG. 31A taken at line 22-22 showing that the central section of the foot bladder has a gradually diminishing thickness while outer sections of the foot bladder have an equal thickness along the length of the foot bladder.

Turning now to FIG. 30A, the support surface 14 is shown with the topper 86, the fire barrier 88, and the bladders 42 removed to expose the foam shell 40 and valve box 45 inside the lower ticking 90. The foam shell 40 illustratively includes a head shell 160 and a seat shell 162 as shown in FIGS. 3A and 20A. The head shell 160 is formed to include a left channel 164 and a right channel 166 arranged to extend along the sides of the support surface 14 to provide a path for air and communication lines to pass from the valve box 45 along the interior of the support surface 14. The seat shell 162 is formed to include a line aperture 165 extending through the seat shell 162 to allow air and communication lines inside the support surface 14 to be connected with the trunk 150 of the support surface 14. Additionally, the seat shell 162 is formed to include a left channel 168 and a right channel 170 arranged to extend along the sides of the support surface 14 to provide a path for air and communication lines to pass from the line aperture 165 along the interior of the support surface 14 toward the head end 65 and the foot end 66 of the support surface 14.

Referring now to FIGS. 21A and 22A, the foot-support bladder 64 illustratively includes a plurality of cells 181, 182, 183, 184, 185, 186 that cooperate to form a left rail section 172, a right rail section 174, and a central section 176. The left and the right rail sections 172, 174 of the foot-support bladder 64 have a substantially similar cross-sectional area as shown in FIGS. 21A, 22A. However, the central section 176 has a diminishing cross-sectional area moving toward the foot end 66 of the support surface 14 as suggested in FIGS. 21A and 22A. The result of the diminishing cross-sectional area is the formation of a space 175 formed under a portion of the central section 176 that allows for bucking of the foot-support bladder 64 when a patient's heel is supported on the central section 176. Buckling of the cells 181-186 adds the surface area of the foot-support bladder 64 in contact with the heel and foot of a patient. Therefore, the local pressure on the skin is reduced as the patient's feet are partially immersed in the foot-support bladder 64.

Referring back to FIG. 1A, the patient support apparatus 12 includes siderails 71, 73 coupled to the seat-deck section 32 and headrails 75, 77 coupled to the head-deck section 30. The patient support apparatus 12 also includes a headboard 19 coupled to the upper frame 18 and a removable footboard 37 coupled to the foot-deck section 36. The controller 25 is configured to move the bed 10 to the chair-egress configuration only if the footboard 37 is removed from the foot-deck section 36. If the footboard 37 is not removed and a user requests the chair-egress configuration, an instructional screen appears on the user interface 74 suggesting that the caregiver remove the footboard 37.

The user interface 68 is a push-button panel coupled to an inner side of the siderail 71 included in the patient support apparatus 12. The user interface 70 is a push-button panel pivotably coupled to an outer side of the siderail 73 included in the patient support apparatus 12. The user interface 72 is a push-button panel coupled to an outer side of the headrail 77. The user interface 74 is a touch screen graphical user interface coupled to the outer side of the side rail 73.

Figure 33A:
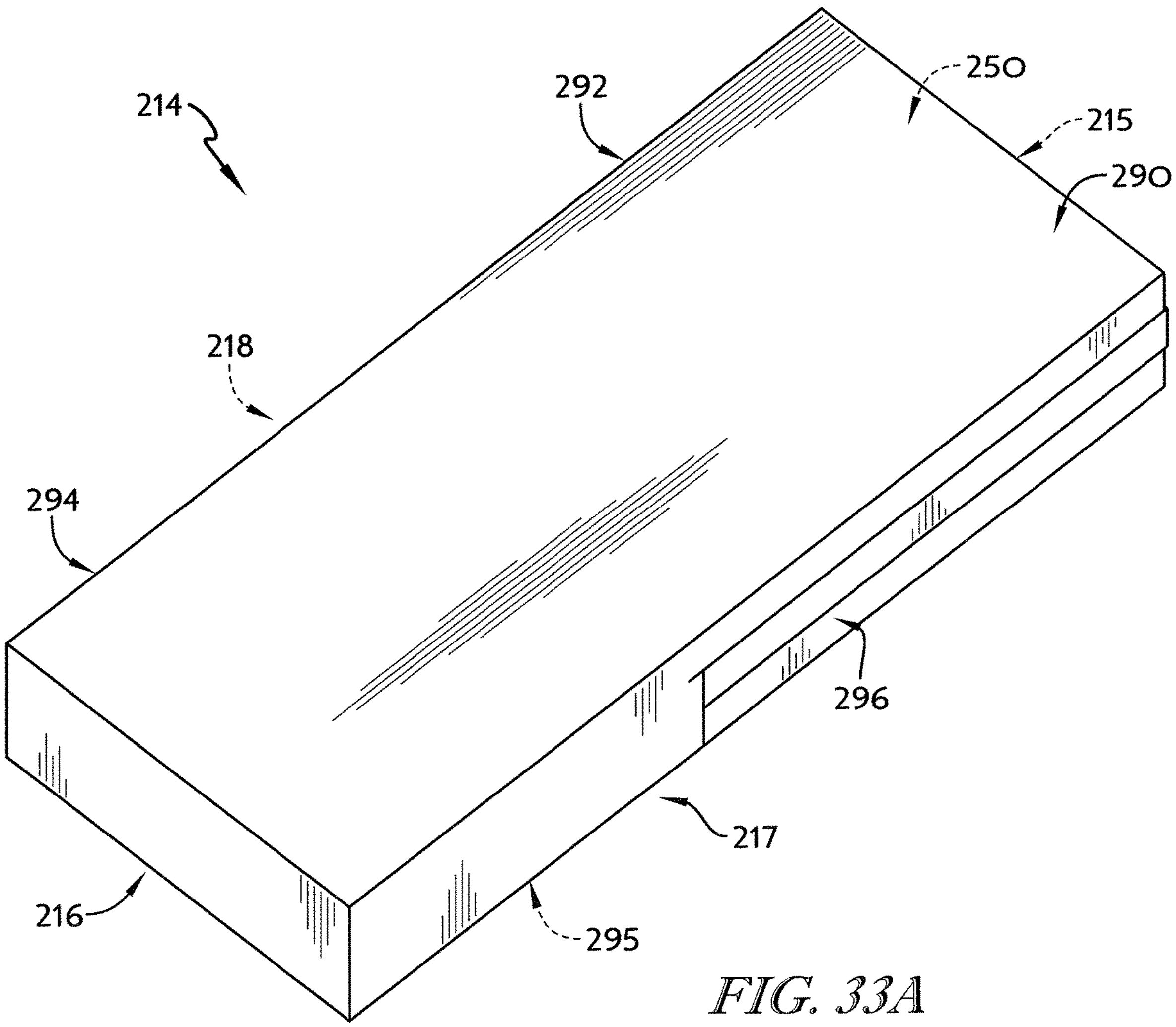
FIG. 33A is a perspective view of a second support surface configured for use with the patient support apparatus of FIG. 1A.
Figure 34A:
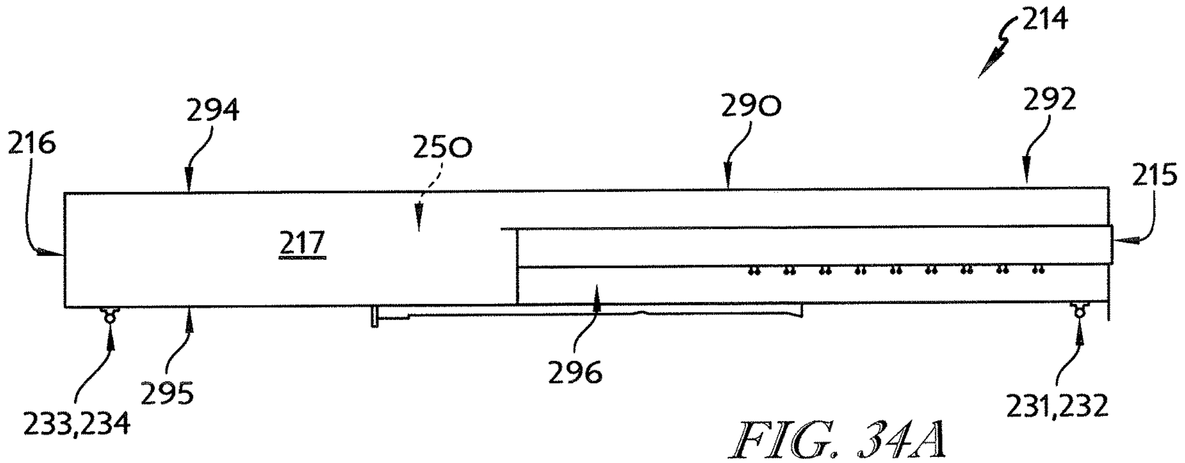
FIG. 34A is a side elevation view of the second support surface shown in FIG. 33A.
Figure 35A:
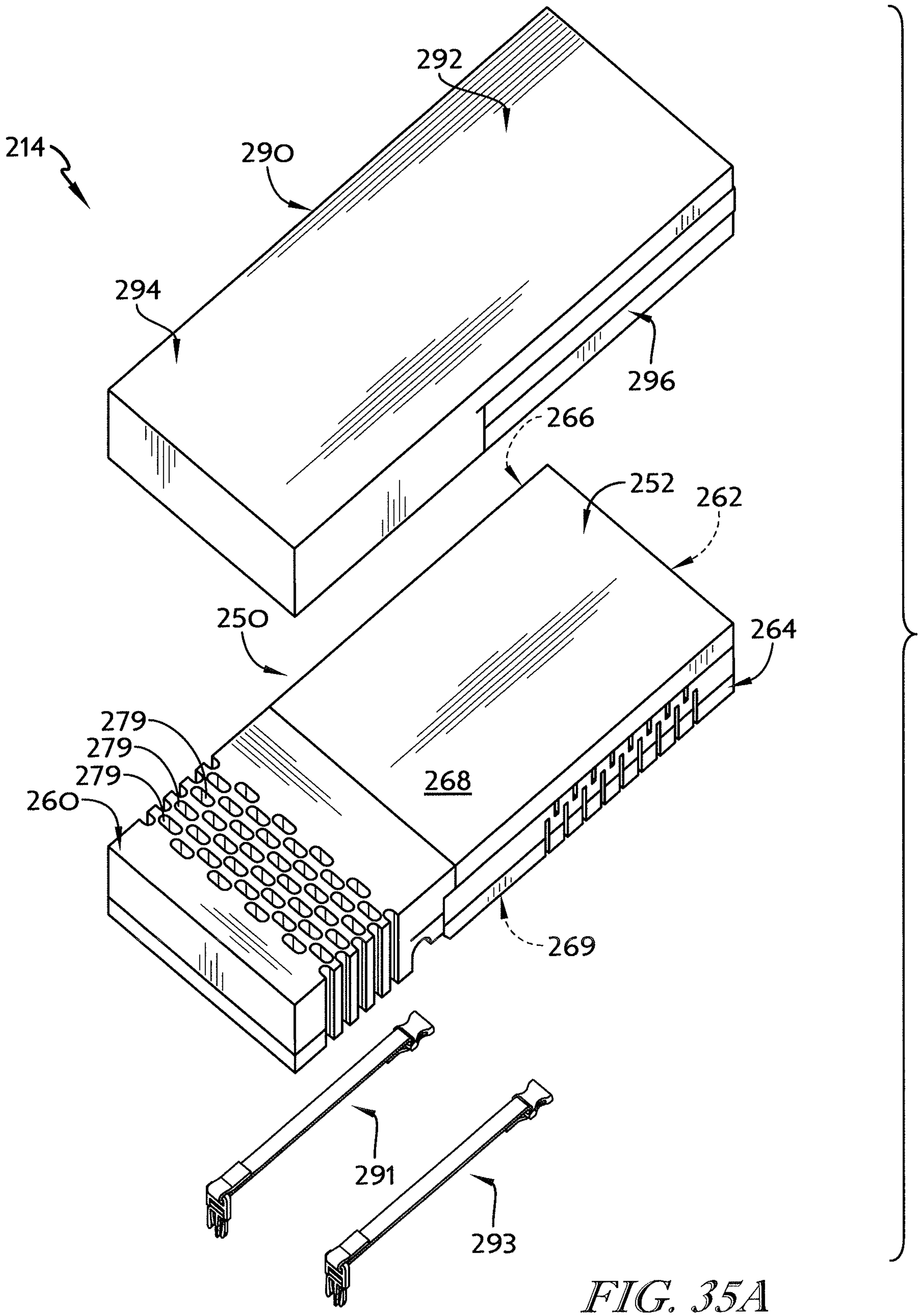
FIG. 35A is a perspective view of the second support surface of FIGS. 23A and 24A showing that the second support surface includes an outer ticking, an interior cushion, and a pair of frame straps.

Turning now to FIG. 33A, an alternative support surface 214 for use with the patient support apparatus 12 is shown. The support surface 214 has a head end 215, a foot end 216, a left side 217 and a right side 218 as shown in FIGS. 23A and 24A. The support surface 214 illustratively includes an outer ticking 290, an interior cushion 250, and a pair of frame straps 291, 293 as shown in FIG. 35A. The outer ticking 290 encases the interior cushion 250 as shown in FIG. 34A. The interior cushion 250 supports a patient lying on the support surface 214. Both the outer ticking 290 and the interior cushion 250 are configured to accommodate movement of the deck 26 from the flat position (shown in FIG. 6A) to the fully-inclined position (shown in FIG. 8A) without including an inflatable fill bladder.

The outer ticking 290 illustratively includes a head-end section 292, a foot-end section 294, and an elastic section 296 coupled to the head-end section 292 and the foot-end section 294 as shown in FIGS. 23A-25A. The elastic section 296 is configured to allow expansion of a bottom side 295 of the support surface 214 to accommodate formation of the gap G2 between the deck sections 30, 32 when the deck 26 of the patient support apparatus 12 is repositioned as suggested in FIGS. 6A-8A. In some embodiments, the outer ticking 290 may include a plurality of expandable folds similar to the expandable folds 96 described herein in place of the elastic section 296.

Figure 36A:
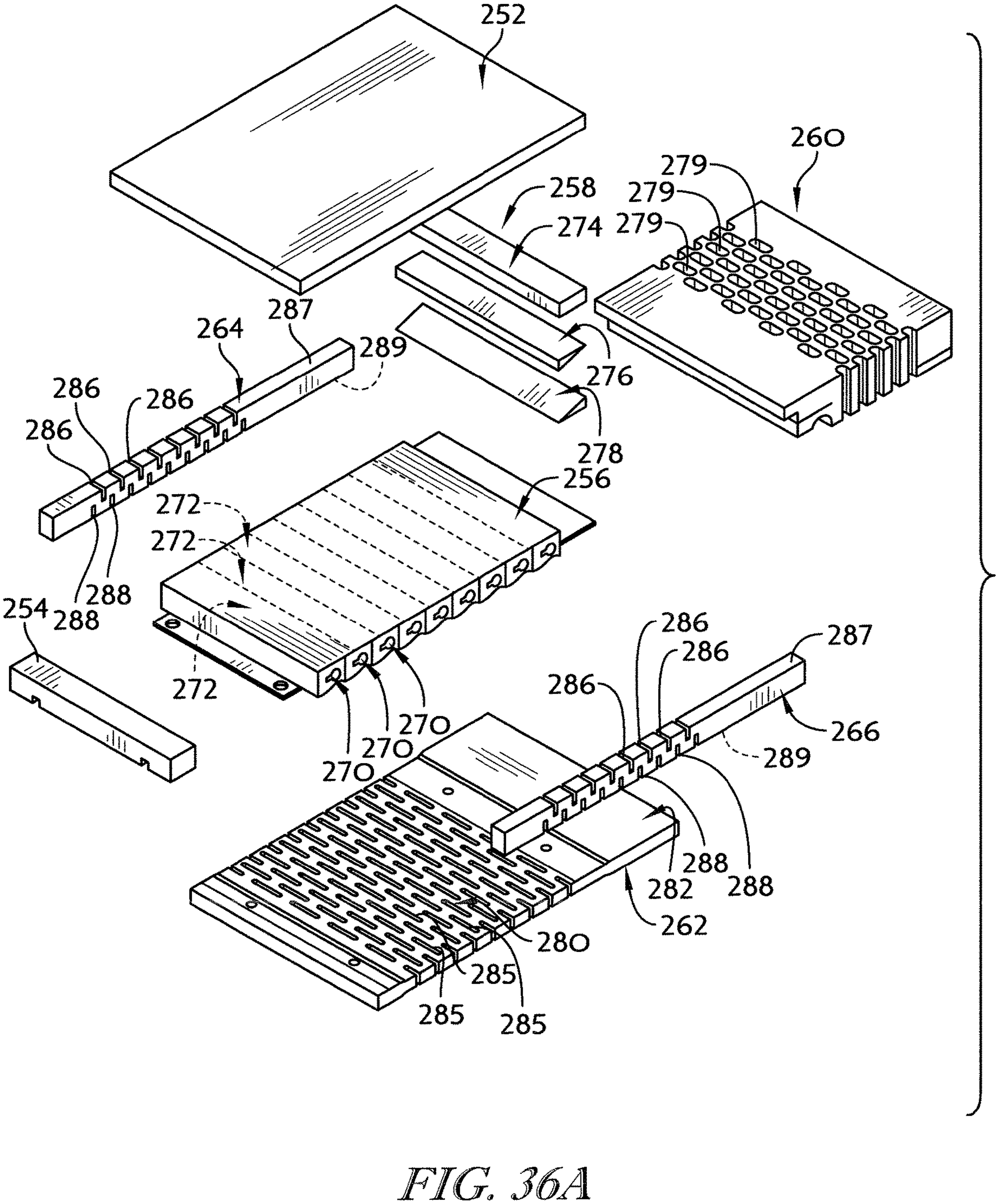
FIG. 36A is an exploded perspective view of the interior cushion of FIG. 35A.
Figure 37A:
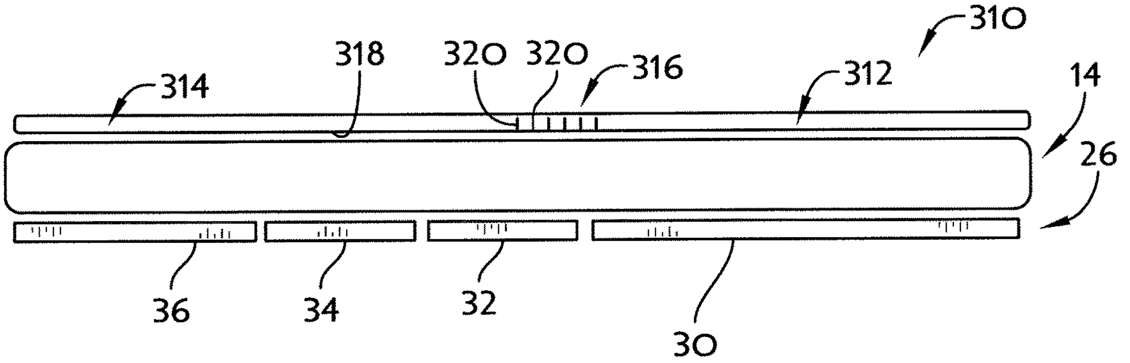
FIG. 37A is a view similar to FIG. 6A showing an optional overlay adapted for use with the patient support system of FIGS. 1A-22A.
Figure 38A:
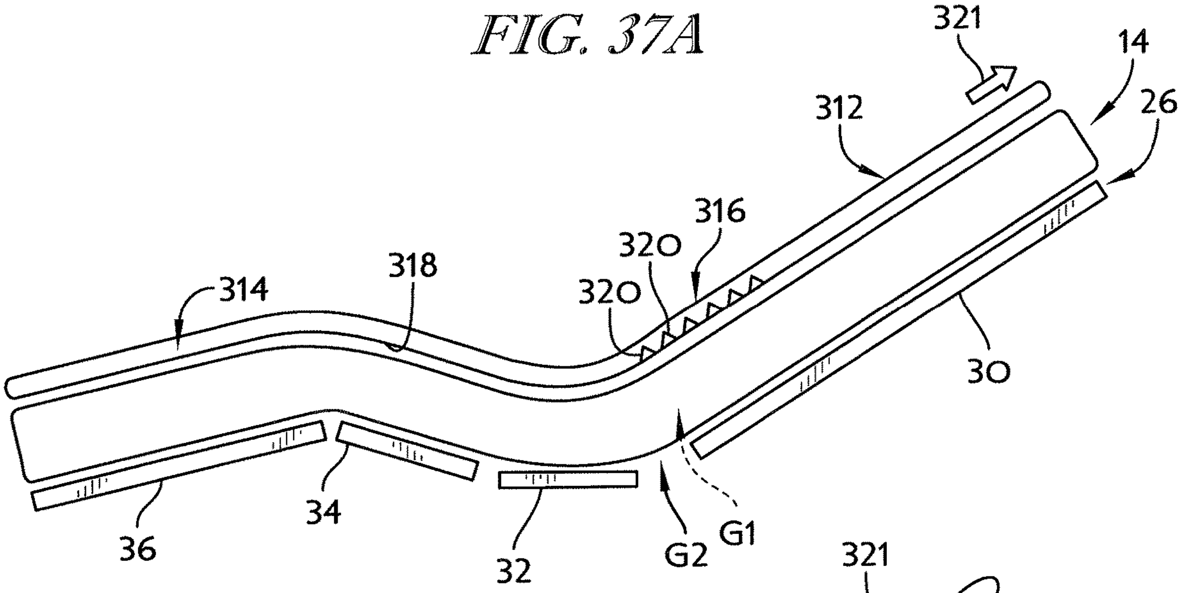
FIG. 38A is a view similar to FIG. 7A with the overlay of FIG. 37A mounted to the patient support system of FIGS. 1A-22A.

Turning now to FIG. 36A, the interior cushion 250 illustratively includes a top pad 252, a head pad 254, an air pad 256, a knee-joint pad assembly 258, a foot pad 260, an expandable bottom pad 262, and a pair of side bolsters 264, 266. The top pad 252, the head pad 254, the knee-joint pad assembly 258, the foot pad 260, the expandable bottom pad 262, and the side bolsters 264, 266 are made from foam. The air pad 256 includes a plurality of sealed air cells 270 each containing a foam pad 272.

The top pad 252 forms a portion of a top surface 268 of the cushion 250 and is arranged to extend from the head end 215 of the surface 214 toward the foot end 216 of the patient support surface 214 as shown in FIGS. 25A and 26A. The head pad 254 underlies the top pad 252 and is arranged to extend from the head end 215 of the patient support surface 214 toward the foot end 216 of the surface 214. The air pad 256 underlies the top pad 252 and extends from the head pad 254 toward the foot end 216 of the surface 214. The knee joint pad assembly 258 also underlies the top pad 252 and a portion of the foot pad 260. The knee-joint pad assembly 258 extends between the air pad 256 and the foot pad 260.

The expandable bottom pad 262 forms a portion of a bottom surface 269 of the cushion 250 and underlies the top pad 252, the head pad 254, the air pad 256, the knee-joint pad assembly 258, a portion of the foot pad 260 and the side bolsters 264, 266 as shown in FIGS. 25A and 26A. The expandable bottom pad 262 extends from the head end 215 of the surface 214 toward the foot end 216 of the surface 214. The side bolsters 264, 266 underlie the top pad 252 and a portion of the foot pad 260. The side bolsters 264, 266 further extend from the head end 215 of the surface 214 toward the foot end 216 of the surface 214 along the left and right sides 217, 218, respectively, of the surface 214.

The knee joint pad assembly 258 illustratively includes a knee block 274, a first knee wedge 276, and a second knee wedge 278 as shown in FIG. 36A. The knee wedges 276, 278 underlie the knee block 274 and cooperate to provide a joint between the air pad 256 and the foot pad 260 to facilitate bending of the surface 214 when the foot deck section 36 pivots relative to the thigh deck section 34 of the deck 26 as suggested in FIG. 1A.

The foot pad 260 forms a portion of the top and bottom surfaces 268, 269 of the cushion 250 as shown in FIGS. 25A and 26A. The foot pad 260 is formed to include a plurality of perforations 279 extending from the top surface 268 to the bottom surface 269 of the cushion 250. The perforations 279 expand to allow extension of the foot pad 260 when the foot deck section 36 is extended and to allow retraction of the foot pad 260 when the foot deck section 36 is retracted. The perforations 279 may also reduce interface pressure between a patient's feet and the surface 214 to reduce the risk of pressure ulcer formation on the patient's feet.

The expandable bottom pad 262 includes a perforated portion 280 and a solid portion 282 as shown in FIG. 36A. The perforated portion 280 extends from the head end 215 of the surface 214 toward the foot end 216 of the surface 214 to overlie the head deck section 30 of the deck 26 when the surface 214 is mounted on the patient support apparatus 12. The solid portion 282 extends from the perforated portion 280 toward the foot end 216 of the surface 214 to overlie the seat deck section 32 of the deck 26.

The perforated portion 280 of the expandable bottom pad 262 is formed to include a plurality of perforations 285 as shown in FIG. 36A. The perforations 285 extend through the expandable bottom pad 262 from the bottom surface 269 of the cushion 250 toward the top surface 268 of the cushion 250. The perforations 285 expand during movement of the deck 26 from the flat position (shown in FIG. 6A) to the fully-inclined position (shown in FIG. 8A) so that the gap G2 formed between the head deck section 30 and the seat deck section 32 is covered. Thus, the surface 214 is prevented from buckling or bunching into the gap G2 when the head deck section 30 moves away from the seat deck section 32.

Each of the side bolsters 264, 266 is formed to include a plurality of top-side slits 286 and bottom-side slits 288 as shown in FIG. 36A. The top-side slits 286 extend from a top side 287 of the bolsters 264, 266 toward a bottom side 269 of the bolsters 264, 266. The bottom-side slits 288 extend from the bottom side 269 toward the top side 267 of the bolsters 264, 266. In operation, the top-side slits 286 and the bottom-side slits 288 expand during movement of the deck 26 from the flat position to the fully-inclined position.

The patient support surface 214 also includes a plurality of lugs 231-234 configured to be received in corresponding lug-receiver apertures 136-139 included in the deck 26 of the patient support apparatus 12. A first pair of lugs 231, 232 is coupled to the head-end section 292 of the ticking 290 and to the expandable bottom pad 262 of the cushion 250 along the head end 215 of the support surface 214. The first pair of lugs 231, 232 is configured to be received in the corresponding pair of keyhole slots 136, 137 formed in the head-deck section 30 of the deck 26 shown in FIG. 27A. A second pair of lugs 233, 234 is coupled to the foot-end section 294 of the ticking 90 and to the foot pad 260 along the foot end 216 of the support surface 214. The second pair of lugs 233, 234 are received in the corresponding pair of keyhole slots 138, 139 formed in the foot-deck section 36 of the deck 26 shown in FIG. 27A.

Turning now to FIGS. 37A-39A, an overlay 310 adapted for use with the patient support system 10 is shown. The overlay 310 illustratively includes a head portion 312, a foot portion 314, and an expandable portion 316 arranged between the head portion 312 and the foot portion 314. The overlay 310 also has a low-friction underside 318 that engages the top side of the patient support surface 14. In the illustrative embodiment, the expandable portion 316 includes a plurality of expandable folds 320 but in other embodiments may be an elastic material.

Figure 39A:
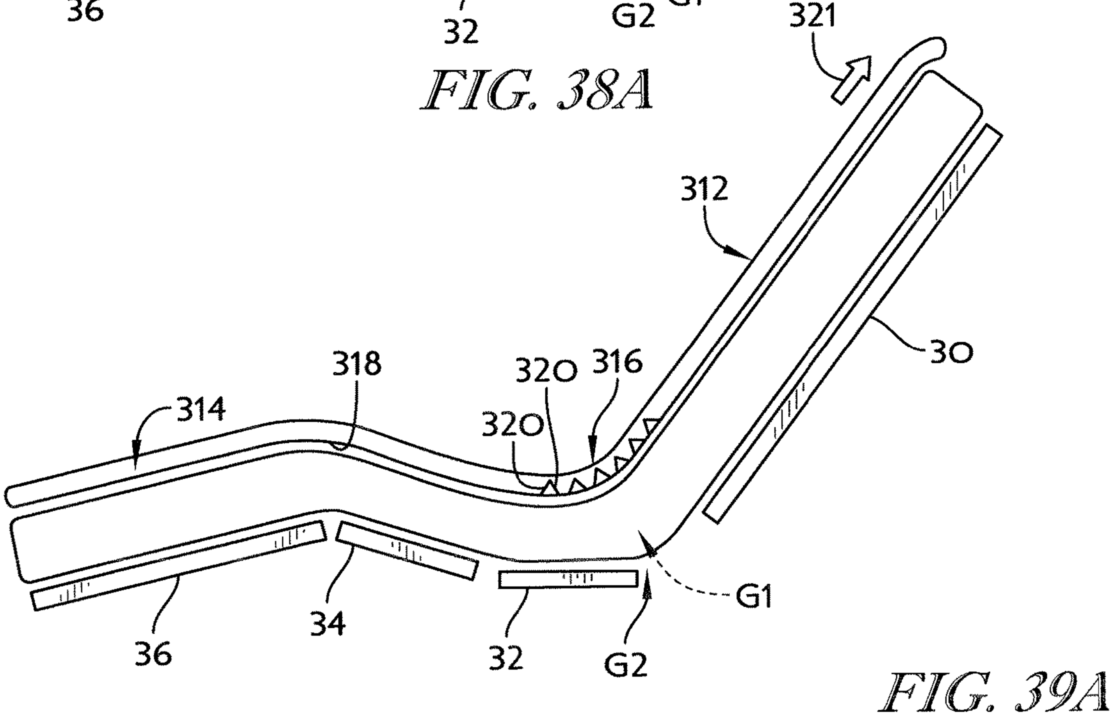
FIG. 39A is a view similar to FIG. 8A with the overlay of FIGS. 27A and 28A mounted to the patient support system of FIGS. 1A-22A.

In operation, the expandable portion 316 of the overlay 310 expands during movement of the deck 26 from the flat position (shown in FIG. 37A) to the fully-inclined position (shown in FIG. 39A). Thus, the overlay 310 operates to further support a patient over the gaps G1 and gap G2 formed in the deck 26 and the surface 14. Further, the low-friction surface 318 of the overlay 310 is allowed to slide slightly relative to the surface 14 as suggested by arrow 321 thereby relieving additional shear stresses that might be applied to a patient's skin during movement from the flat position to the fully-inclined position.

Figure 40A:
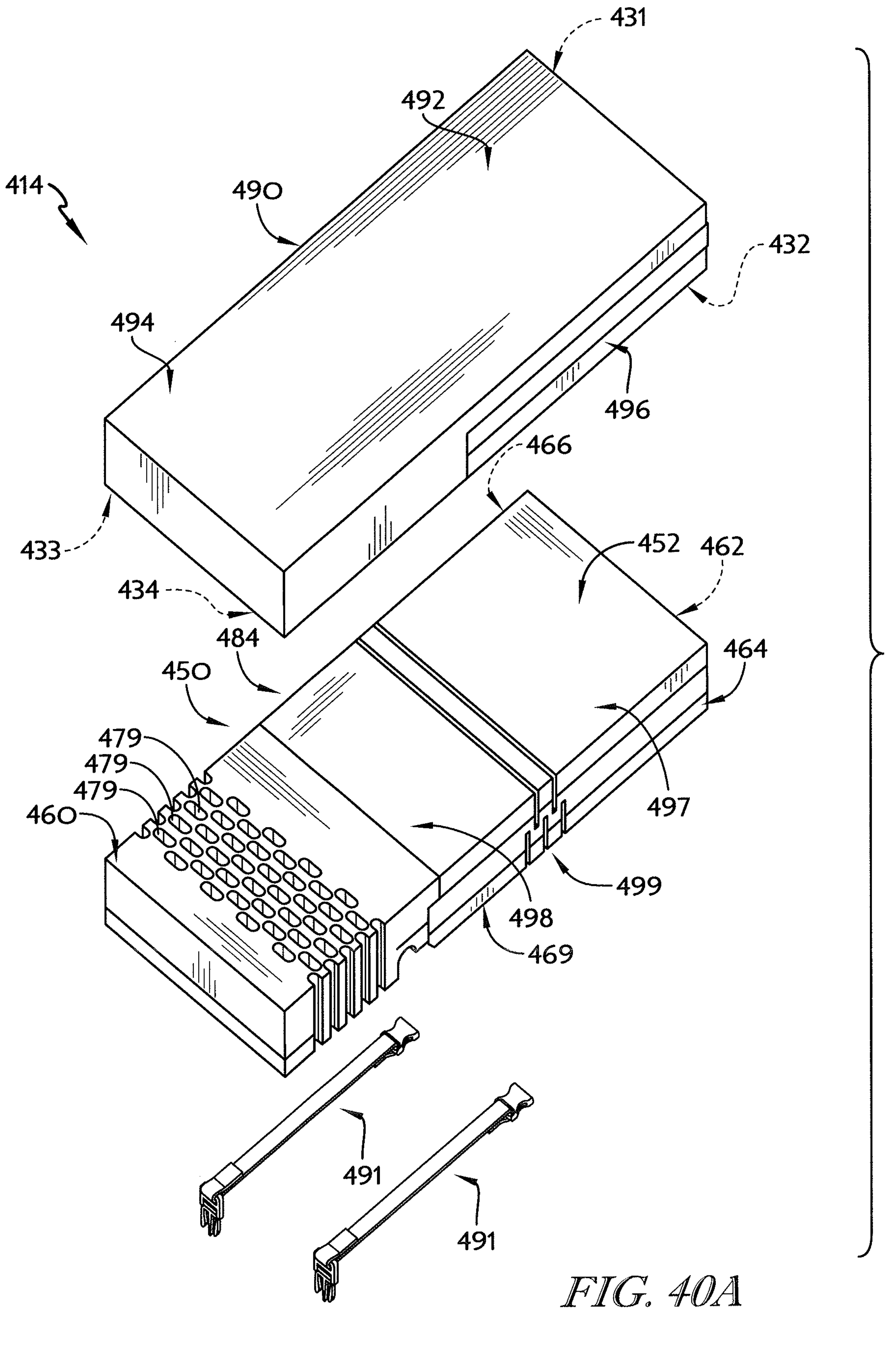
FIG. 40A is an exploded perspective view of a third support surface similar to the second support surface shown in FIGS. 23A-26A adapted for use with the patient support apparatus of FIG. 1A showing that the third support surface includes an outer ticking, an interior cushion formed to include an expandable serpentine section, and a pair of frame straps.

Referring now to FIG. 40A, an alternative support surface 414 is shown. The support surface 414 is substantially similar to the support surface 214 shown in FIGS. 33A-36A and described herein. Accordingly, similar reference numbers in the 400 series indicate features that are common between the support surface 414 and the support surface 214. Thus, the description of the support surface 214 is hereby incorporated by reference to apply to the support surface 414, except in instances when it conflicts with the specific description and drawings of the support surface 414.

Unlike the support surface 214, the support surface 414 includes an interior cushion 450 having a torso pad 452 and a foot pad 560 as shown in FIG. 40A. The torso pad 452 has a head section 497, a seat section 498, and an expandable section 499. The expandable section 499 is illustratively a serpentine foam band arranged to interconnect the head section 497 and the seat section 498. The expandable section 499 expands when the head section 498 moves with the head-deck section 30 of the patient support apparatus 12 during incline of the head-deck section 30 to fill the gap G formed between the seat-deck section 32 and the head-deck section 30.

Figure 41A:
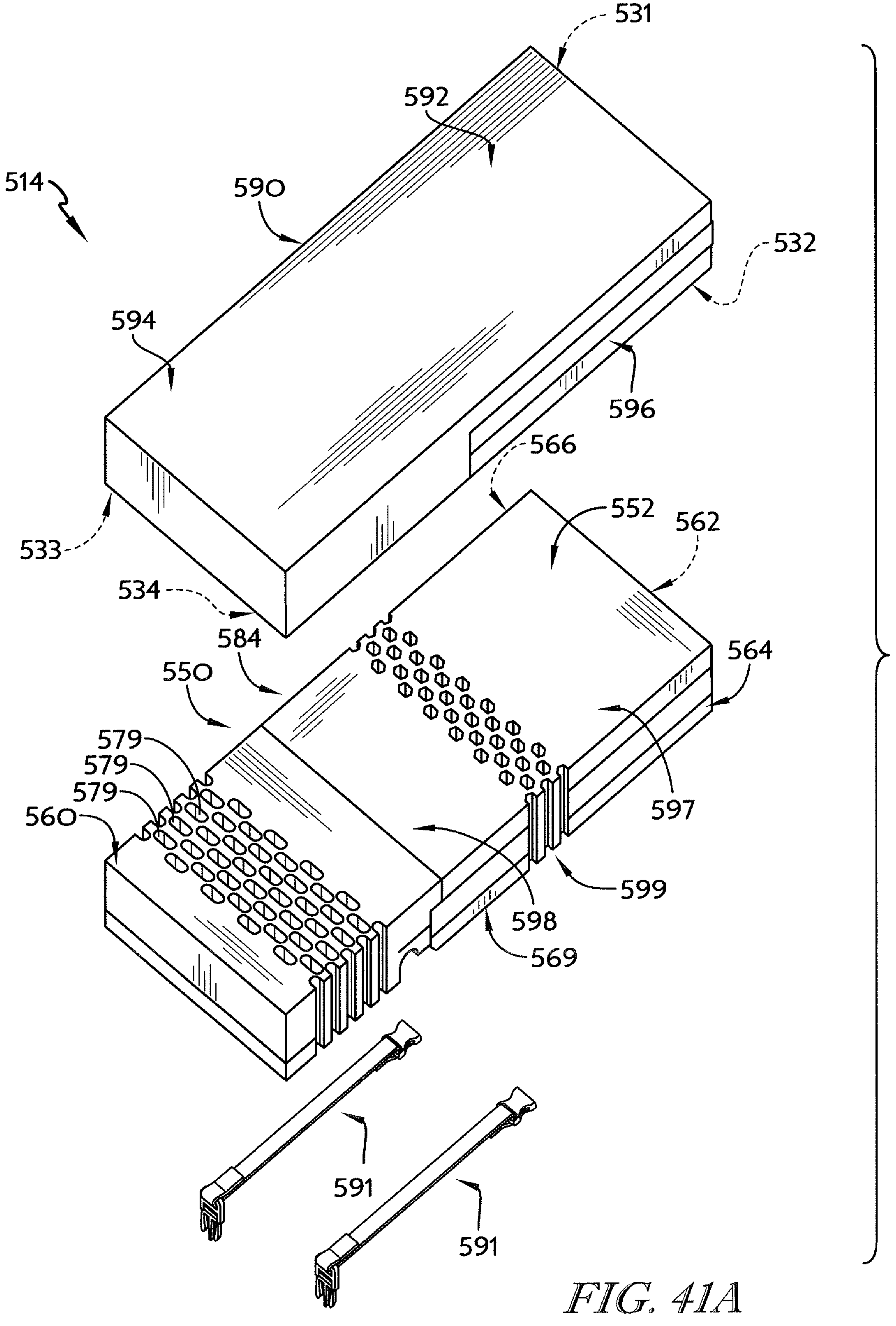
FIG. 41A is an exploded perspective view of a fourth support surface similar to the second support surface shown in FIGS. 23A-26A adapted for use with the patient support apparatus of FIG. 1A showing that the fourth support surface includes an outer ticking, an interior cushion formed to include an expandable honeycombed section, and a pair of frame straps.

Referring now to FIG. 41A, an alternative support surface 514 is shown. The support surface 514 is substantially similar to the support surface 214 shown in FIGS. 33A-36A and described herein. Accordingly, similar reference numbers in the 500 series indicate features that are common between the support surface 514 and the support surface 214. Thus, the description of the support surface 214 is hereby incorporated by reference to apply to the support surface 514, except in instances when it conflicts with the specific description and drawings of the support surface 514.

Unlike the support surface 214, the support surface 514 includes an interior cushion 550 having a torso pad 552 and a foot pad 560 as shown in FIG. 41A. The torso pad 552 has a head section 597, a seat section 598, and an expandable section 599. The expandable section 599 is illustratively a honeycombed foam section arranged to interconnect the head section 597 and the seat section 598. The expandable section 599 expands when the head section 598 moves with the head-deck section 30 of the patient support apparatus 12 during incline of the head-deck section 30 to fill the gap G formed between the seat-deck section 32 and the head-deck section 30.

Although certain illustrative embodiments have been described in detail above, variations and modifications exist within the scope and spirit of this disclosure as described and as defined in the following claims.

PART B

Field of the Disclosure

A patient support system includes a scale system, an air system, and a lift system. The patient support system also includes a control system configured to graphically communicate information about the scale system, the air system, and the lift system to a user.

Background

The present disclosure is related to patient support systems and methods of using patient support systems. Specifically, the present disclosure is related to the patient support systems including user interfaces that communicate information to a user and that receive instructions from the user.

Some modern patient support systems include user interfaces for communicating operational information about the patient support system to a user. Some operational information may be unintelligible for inexperienced users.

SUMMARY

The present application discloses one or more of the features recited in the appended claims and/or the following features which, alone or in any combination, may comprise patentable subject matter:

According to the present disclosure, a patient support system may include a patient support apparatus and a control system. The patient support apparatus may include a base, a deck, and a scale. The deck may include a head-deck section movable relative to the base and a deck sensor configured to detect a head-deck position corresponding to the position of the head-deck section. The scale may be coupled to the deck and configured to detect the weight of a patient supported on the deck. The control system may include a user interface and a controller coupled to the deck sensor, the scale, and the user interface.

In some embodiments, the controller may be configured to display an icon including a first portion that graphically indicates if the head-deck section of the patient support apparatus is in one of a set of predetermined head-deck positions that allow an accurate weight of the patient to be detected by the scale. The icon may graphically indicate which direction the head-deck section should be moved to assume one of the predetermined head-deck positions.

In some embodiments, the deck may include a foot-deck section movable relative to the base. The deck sensor may be configured to detect a foot-deck position corresponding to the position of the foot-deck section. The icon may include a second portion that graphically indicates if the foot-deck section of the patient support apparatus is in one of a set of predetermined foot-deck positions that allow an accurate weight of the patient to be detected by the scale.

In some embodiments, the base may include a lower frame adapted to engage a floor, an upper frame coupled to the deck to support the deck above the floor, and a lift system coupled to the lower frame and to the upper frame. The lift system may be configured to move the upper frame relative to the lower frame. The icon may include a third portion that graphically indicates if the upper frame of the base is in one of a set of predetermined frame positions that allow an accurate weight of the patient to be detected by the scale.

In some embodiments, the icon may include an illustration of the patient support apparatus and a first graphic indicator associated with the head-deck section. The first graphic indicator may be displayed in a first color if the head-deck section is in one of the set of predetermined head-deck positions and may be displayed in a second color if the head-deck section is not in one of the set of predetermined head-deck positions.

In some embodiments, the icon includes a first directional indicator associated with the head-deck section showing a direction to move the head-deck section toward the set of predetermined head-deck positions. The directional indicator may be an arrow.

In some embodiments, the base may include a lower frame adapted to engage a floor, an upper frame coupled to the deck to support the deck above the floor, and a lift system coupled to the lower frame and to the upper frame. The lift system may be configured to move the upper frame relative to the lower frame. The icon may include a second graphic indicator associated with the upper frame and a second directional indicator associated with the upper frame. The second graphic indicator may be displayed in a first color if the upper frame is in one of the set of predetermined frame positions and may be displayed in a second color if the upper frame is not in one of the set of predetermined frame positions. The second directional indicator associated with the upper deck may show a direction to move the upper frame toward the set of predetermined frame positions.

In some embodiments, the deck may include a second deck section movable relative to the base. The deck sensor may be configured to detect a second-deck position corresponding to the position of the second deck section. The icon may include a third graphic indicator associated with the second deck section and a third directional indicator associated with the second deck section. The third graphic indicator may be displayed in a first color if the second deck section is in one of the set of predetermined second-deck positions and may be displayed in a second color if the second deck section is not in one of the set of predetermined second deck positions. The third directional indicator associated with the second deck section may show a direction to move the second deck toward the set of predetermined second deck positions.

According to another aspect of the present disclosure, a patient support system may include a patient support apparatus and a control system. The patient support apparatus may include a base, a deck, and an air source. The deck may include a head-deck section movable relative to the base and a deck sensor configured to detect a head-deck position corresponding to the position of the head-deck section. The air source may be configured to provide pressurized therapeutic air to a patient support surface mounted on the patient support apparatus. The control system may include a user interface and a controller coupled to the deck sensor, the air source, and the user interface.

In some embodiments, the controller may be configured to display an icon graphically indicating if the head-deck section of the patient support apparatus is in one of a set of predetermined head-deck positions that allow a pressurized air therapy to be applied to a patient. The icon may graphically indicate which direction the head-deck section should be moved to assume one of the predetermined head-deck positions.

In some embodiments, the deck may include a foot-deck section movable relative to the base. The deck sensor may be configured to detect a foot-deck position corresponding to the position of the foot-deck section. The icon may graphically indicate if the foot-deck section of the patient support apparatus is in one of a set of predetermined foot-deck positions that allow a pressurized air therapy to be applied to a patient.

In some embodiments, the icon may include an illustration of the patient support apparatus and a first graphic indicator associated with a representation of the head-deck section included in the illustration of the patient support apparatus. The first graphic indicator may be displayed in a first color if the head-deck section is in one of the set of predetermined head-deck positions and may be displayed in a second color if the head-deck section is not in one of the set of predetermined head-deck positions. The graphic indicator may be wedge-shaped and may extend between the representation of the head-deck section and a representation of the base included in the illustration of the patient support apparatus. The icon may include a first directional indicator associated with the representation of the head-deck section showing a direction to move the head-deck section toward the set of predetermined head-deck positions.

In some embodiments, the patient support apparatus may include a siderail movable between a lowered position and a raised position. A siderail portion of the illustration may be displayed in a first color if the siderail is in a predetermined position that allows a pressurized air therapy to be applied to a patient and is displayed in a second color if the siderail is not in the predetermined siderail position.

In some embodiments, the deck may include a second deck section movable relative to the base. The deck sensor may be configured to detect a second-deck position corresponding to the position of the second deck section. The icon may include a second graphic indicator associated with the second deck section and a second directional indicator associated with the second deck section. The second graphic indicator may be displayed in a first color if the second deck section is in one of a set of predetermined second-deck positions that allow a pressurized air therapy to be applied to a patient and may be displayed in a second color if the second deck section is not in one of the set of predetermined second deck positions. The second directional indicator associated with the second deck section may show a direction to move the second deck toward the set of predetermined second deck positions.

According to another aspect of the present disclosure, a patient support system may include a patient support apparatus and a control system. The patient support apparatus having a head end, a foot end, a left side, and a right side. The patient support apparatus may include a lower frame adapted to engage a floor, an upper frame supported over the lower frame, a lift system coupled to the lower frame and to the upper frame, and an obstruction sensor configured to detect obstructions between the lower frame and the upper frame. The control system may include a user interface and a controller coupled to the obstruction sensor, the air source, and the user interface.

In some embodiments, the controller may be configured to display an icon graphically indicating if an obstruction is detected by the obstruction sensor and indicating a location of the obstruction. The icon may include an illustration of the patient support apparatus and a first graphic indicator associated with one of the head end, the foot end, the left side, and the right side of the patient support apparatus.

In some embodiments, the first graphic indicator may be arranged along one of the head end, the foot end, the left side and the right side of the illustration of the patient support apparatus to indicate the location of a first obstruction.

In some embodiments, the icon may include a first directional indicator associated with the first graphic indicator arranged to indicate the location of the obstruction. The directional indicator may be an arrow overlying the first graphic indicator.

In some embodiments, first graphic indicator may be rectangular. The first graphic indicator may be displayed in one of yellow and red.

In some embodiments, the icon may include a second graphic indicator arranged along one of the head end, the foot end, the left side and the right side of the illustration of the patient support apparatus to indicate the location of a second obstruction. The icon may include a first arrow overlying the first graphic indicator and a second arrow overlying the second graphic indicator.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

DETAILED DESCRIPTION OF THE DRAWINGS

A patient support system 10 illustratively includes a patient support apparatus (sometimes called a bed frame) 12, a patient support surface (sometimes called a mattress) 14, and a control system 16 integrated into the patient support apparatus 12 as shown in FIG. 1B. The patient support apparatus 12 illustratively includes a scale system 18 configured to weigh a patient on the patient support apparatus 12, an air system 20 configured to provide pressurized air to rotation therapy bladders 24 included in the patient support surface 14, and a lift system 22 configured to raise and lower the patient support surface 14 relative to a floor 11 as shown in FIGS. 1B and 2B.

The control system 16 is coupled to each of the systems 18, 20, 22 and is coupled to a user interface 25 as shown in FIG. 2B. The user interface 25 is illustratively a touch-screen display mounted on a siderail 38 of the patient support apparatus 12 as shown in FIGS. 1B and 2B. The control system 16 is configured to display icons on the user interface 25 as suggested in FIGS. 8B, 16B, and 17B-19B to indicate to a user an action that should be taken in order to enable one of the systems 18, 20, 22.

More specifically, the control system 16 displays an icon 241 (shown in FIG. 8B) indicating how to rearrange components of the patient support apparatus 12 in order to allow the scale system 18 to take an accurate reading. Also, the control system 16 displays an icon 341 (shown in FIG. 16B) indicating how to rearrange components of the patient support apparatus 12 to allow the rotation therapy bladders 24 included in the patient support surface 14 to effectively provide lateral rotation therapy (CLRT). Finally, the control system 16 displays an icon 411 (shown in FIGS. 17B-19B) indicating which side of the patient support apparatus 12 is blocked by an obstruction that prevents the lift system 22 from lowering the patient support surface 14.

Referring again to FIG. 1B, the patient support apparatus 12 includes a base 34 and a deck 36 that support the patient support surface 14 above the floor 11. The base 34 is configured to raise and lower the deck 36 relative to the floor 11 to raise and lower the patient support surface 14 relative to the floor 11. The deck 36 is articulatable and may be reconfigured to support a patient on the patient support surface 14 in a variety of positions, for example in a lie-flat position or a sit-up position (shown in FIG. 1B). The patient support apparatus 12 also includes siderails 38 and headrails 40 coupled to the deck 36 to block a patient from accidentally rolling off of the patient support system 10.

The base 34 illustratively includes a lower frame 42 and an upper frame 44 as shown in FIGS. 1B and 2B. Additionally, the base 34 includes the scale system 18, the air system 20, the lift system 22, and lift system sensors 45 as shown diagrammatically in FIG. 2B. The scale system 18 is illustratively coupled between the upper frame 44 and the deck 36 to weight a patient on the patient support surface 14. The lift system 22 is illustratively coupled between the lower frame 42 and the upper frame 44 to raise and lower the upper frame 44 relative to the lower frame 42. The lift system sensors 21 illustratively include position sensors 47 and obstruction sensors 49 as shown in FIG. 1B. The air system 20 is pneumatically coupled to the rotation therapy bladders 24 (along with other inflatable bladders) included in the support surface 14.

The scale system 18 is illustratively made up of load cells coupled between the upper frame 44 and the deck 36 as suggested in FIG. 2B. The load cells are configured to detect the weight applied by a patient on the patient support system 10 when the patient support apparatus 12 is in one of a predetermined set of positions. However, the load cells may not be able to detect an accurate weight if the patient support apparatus 12 moved outside the predetermined set of positions. For example, when the patient support apparatus moves to a chair configuration (not shown) the load cells are unable to accurately detect a patient's weight. For this reason, the control system 16 is configured to indicate to a user trying to use the scale system 18 if the patient support apparatus 12 is out of position and how to move the patient support apparatus 12 to a position in which the scale system 18 can detect patient weight accurately as suggested in FIGS. 5B-12B.

The air system 20 illustratively includes an air source such as a blower, compressor, or the like housed in the lower frame 42 as suggested in FIG. 1B. In operation, the air system 20 provides pressurized air to the rotation therapy bladders 24 to rotate a patient supported on the patient support surface 14 about a longitudinal axis 14A of the patient support surface 14. However, the rotation therapy bladders 24 may not be able to effectively rotate a patient if the patient support apparatus 12 moved outside a predetermined set of positions. For example, when the patient support apparatus moves to a chair configuration (not shown) the rotation bladders do not underlie a patient and are unable to effectively rotate a patient to provide lateral rotation therapy (rocking a patient back and forth about the axis 14A). For this reason, the control system 16 is configured to indicate to a user trying to use the air system 20 and the rotation therapy bladders 24 if the patient support apparatus 12 is out of position and how to move the patient support apparatus 12 to a position in which the air system 20 and the rotation therapy bladders 24 can effectively rotate a patient as shown in FIGS. 13B-16B.

The lift system 22 illustratively includes lift arms 61, 62, 63, 64 that pivot relative to the lower frame 42 and the upper frame 44 to raise and lower the upper frame 44 relative to the lower frame 42 as shown in FIG. 1B. The obstruction sensors 49 included in the lift system sensors 45 are configured to detect the location of any obstructions present between the lower frame 42 and the upper frame 44. When the obstruction sensors 49 detect an obstruction between the lower frame 42 and the upper frame 44, the control system 16 is configured to disallow any downward movement of the upper frame 44 that might result in a collision with the detected obstruction. The control system 16 is further configured to indicate to a user where the detected obstruction is located relative to the patient support apparatus 12. More specifically, the control system 16 is configured to indicate which side of the patient support apparatus 12 corresponds to the detected obstruction to direct a user to that side for removal of the obstruction as shown in FIGS. 17B-19B. In the illustrative embodiment, the control system 16 may indicate an obstruction detected along a head end 71, a foot end 72, a left side 73, or a right side 74 of the patient support system 10.

The deck 36 illustratively includes a head-deck section 46, a seat-deck section 48, a thigh-deck section 50, and a foot-deck section 52 as shown in FIGS. 1B and 2B. The head-deck section 46 is mounted to the upper frame 44 to pivot about an axis relative to the seat-deck section 48 and to slide relative to the seat-deck section 48 and the upper frame 44 as described in U.S. Publication Nos. U.S. 2010/0122415 A1 and U.S. 2012/0005832 A1, both incorporated by reference herein in their entirety, except as they are inconsistent with the present disclosure. The seat-deck section 48 is coupled to the upper frame 44 to move with the upper frame 44. The thigh-deck section 50 is coupled to the seat-deck section 48 to pivot relative to the seat-deck section 48. The foot-deck section 52 is coupled to the thigh-deck section 50 to pivot relative to the thigh-deck section 50. The foot-deck section 52 is also extendable and retractable to lengthen or shorten the deck 36 as desired by a caregiver or to accommodate repositioning of the deck 36.

In addition to the deck sections, the deck 36 illustratively includes deck actuators 54 and deck sensors 56 as shown diagrammatically in FIG. 2B. The deck actuators 54 are coupled to the head-deck section 46, the thigh-deck section 50, and the foot-deck section 52 to move the deck sections 46, 50, 52. The deck actuators 54 are illustratively electric motors, pneumatic pistons, and/or the like. The deck sensors 56 are coupled to each of the deck sections 46, 48, 50, 52 and are configured to determine the position of the deck sections 46, 48, 50, 52.

The control system 16 illustratively includes a controller 60, the user interface 25, and user inputs 66, 68, 70 as shown in FIGS. 1B and 2B. The controller 60 is illustratively coupled to the scale system 18, the air system 20, the lift system 22, the user interface 25, the lift system sensors 45, the deck actuators 54, the deck sensors 56, and the user inputs 66, 68, 70 as shown diagrammatically in FIG. 2B. The controller 60 includes a processor 76 and a memory 78 coupled to the processor 76. The memory 78 stores instructions to be executed by the processor 76.

Referring now to FIG. 3B, the user input 68 includes a battery level indicator 99 and a plurality of buttons 101-116. Buttons 101-116 are operable by a caregiver to reconfigure the patient support apparatus 12 by communicating with the controller 60 to operate the deck actuators 54, the lift system 22, and the air system 20. Specifically, the user input 68 includes the following buttons:

Chair-egress button 101 for reconfiguring the patient support apparatus 12 to a chair-egress configuration,

- Return-to-flat button 102 for reconfiguring the patient support apparatus 12 from a non-flat configuration (such as chair-egress) to a flat position,
- Trendelenberg button 103 for reconfiguring the patient support apparatus 12 to a Trendelenberg configuration,
- Reverse-Trendelenberg button 104 for reconfiguring the patient support apparatus 12 to a reverse-Trendelenberg configuration,
- Pull-up-in-bed button 105 for flattening the deck 36 and raising the foot end 72 of the deck 36 above the head end 71 of the deck 36 to assist a caregiver pulling a patient up in the patient support apparatus 12,
- Foot-raise button 106 for raising the foot-deck section 52 as suggested by the icon on the foot-raise button 106,
- Foot-lower button 107 for lowering the foot-deck section 52 as suggested by the icon on the foot-lower button 107,
- Foot-extend button 108 for extending the foot-deck section 52,
- Foot-retract button 109 for retracting the foot-deck section 52,
- Head-deck incline button 110 for increasing the incline of the head-deck section 46 by pivoting the head-deck section 46 relative to the seat-deck section 48 and sliding the head-deck section 46 relative to the seat-deck section 48 and the upper frame 44,
- Head-deck decline button 111 for decreasing the incline of the head-deck section 46,
- Thigh-deck incline button 112 for increasing the incline of the thigh-deck section 50,
- Thigh-deck decline button 113 for decreasing the incline of the thigh-deck section 50,
- Upper-frame raise button 114 for lifting the upper frame 44 relative to the lower frame 42,
- Upper-frame lower button 115 for lowering the upper frame 44 relative to the lower frame 42, and
- Unlock button 116 for activating the functions of buttons 101-115 in response to holding down unlock button 116 to prevent unwanted activation of buttons 101-113.

Referring to FIG. 4B, the user input 70 includes a plurality of buttons 117-124. Buttons 117-124 are operable by a caregiver to reconfigure the patient support apparatus 12 by communicating with the controller 60 to operate the deck actuators 54, the lift system 22, and the air system 20. Specifically, the user input 70 includes the following buttons:

- Side-egress button 117 for reconfiguring the patient support apparatus 12 to a side-egress configuration,
- Return-to-rest button 118 for returning the patient support apparatus 12 to a resting configuration from the side-egress configuration,
- Head-deck incline button 119 for increasing the incline of the head-deck section 46 by pivoting the head-deck section 46 relative to the seat-deck section 48 and sliding the head-deck section 46 relative to the seat-deck section 48 and the upper frame 44,
- Head-deck decline button 120 for decreasing the incline of the head-deck section 46,
- Thigh-deck incline button 121 for increasing the incline of the thigh-deck section 50,
- Thigh-deck decline button 122 for decreasing the incline of the thigh-deck section 50,
- Upper-frame raise button 123 for lifting the upper frame 44 relative to the lower frame 42, and
- Upper-frame lower button 124 for lowering the upper frame 44 relative to the lower frame 42.

Referring now to FIGS. 5B-12B, screens associated with a user operating the scale system 18 are shown. In FIG. 5B, a home screen 200 that is displayed by the control system 16 on the user interface 25 is shown. The home screen 200 includes an icon 202 showing a dynamic representation of the patient support system 10, a plurality of alert icons 204, a home button 206, and a menu of selectable screen buttons 208. The dynamic representation 202 of the patient support system 10 is adjusted to show the condition of the system 10 including the head-angle of the head-deck section 46, operations of the support surface 14, and any therapies being applied by the support surface 14. The alert icons 204 are each indicative of a different piece of information about the system 10 and may be pressed to move to an expanded alert screen corresponding to the alert icon. The home button 206 may be pressed on any screen to return to the home screen 200. The menu of selectable screen buttons 208 may be selected to change screens, rotated by pressing arrows above and below the menu, or rotated by flicking or swiping upwardly or downwardly on the menu to expose additional screen buttons.

To begin operation of the scale system a user presses a scale button 210 included in the menu 208 as suggested in FIG. 5B. Pressing the scale button 210 causes the control system 16 to display a scale screen 220 shown in FIG. 6B. On the scale screen 220, a user can select from a zero button 222 configured to zero the scale, a scale button 224 to request that the scale system 18 record a patient weight, or an options button 226 to launch a screen for adjusting the operation of the scale system 18 (e.g. changing from English to metric units). To request that the scale system 18 record a patient weight, a user presses the scale button 224 as suggested in FIG. 6B.

If the control system 16 determines that an accurate weight cannot be determined a scale operation screen 230 (shown in FIG. 7B) is displayed on the user interface 25, otherwise, a first reminder screen 250 (shown in FIG. 10B) is displayed. An accurate may not be able to be determined either because the patient support apparatus 12 is not in one of a set of a predetermined positions or because a patient is moving.

The scale operation screen 230 includes a non-verified weight display 232 showing the information available (even though the weight detected may not be accurate), an initial weight display 234, and a weight trend display 235 as shown in FIG. 7B. Sometimes, the scale operation screen 230 includes an out of position warning display 236 (if the patient support apparatus 12 is not in one of the set of the predetermined positions approved for scale operation) and an unstable warning display 238 (if the patient is moving).

If a user presses a displayed out of position warning display 236, as suggested in FIG. 7B, a recommended position screen 240 is displayed on the user interface 25 by the control system 16. The recommended position screen 240 includes a graphic icon 241 that indicates which components of the patient support apparatus 12 are causing the out of position fault and indicates how to rearrange the patient support apparatus 12 to be in one of the predetermined positions that would allow accurate weight measurement. The icon 241 includes an illustration 242 of the patient support system 10, fault indicators 243, 244, 245 showing components that are out of position, and directional indicators 246, 247, 248 showing how to move the components out of position into position to allow an accurate weight to be detected.

The fault indicators 243, 244, 245 are illustratively a head-section indicator 243, a foot-section indicator 244, and an upper-frame indicator 245 that are displayed in yellow to indicate that a corresponding component 46, 52, 44 is out of position as shown in FIG. 7B. When the components 46, 52, 44 are in a predetermined position that allows accurate weighing of a patient, the corresponding fault indicator 243, 244, 245 turns green as shown in FIG. 9B.

The directional indicators 246, 247, 248 are illustratively a head-section arrow 246, a foot-section arrow 247, and an upper-frame arrow 248 as shown in FIG. 8B. Each arrow 246, 247, 248 indicates which direction to move the corresponding component 46, 52, 44 in order to get the component 46, 52, 44 into one of the predetermined set of positions that will allow the scale system 18 to detect an accurate weight. When the components 46, 52, 44 are in a predetermined position that allows accurate weighing of a patient, the corresponding directional indicator 246, 247, 248 disappears as shown in FIG. 9B.

Turning now to FIG. 9B, when the patient support apparatus 12 is moved to a position that will allow an accurate weight to be detected, the fault indicators 243, 244, 245 turn green and the directional indicators 246, 247, 248 are removed from the icon 241. A user can then press a continue button 249 to display the first reminder screen 250 shown in FIG. 10B.

The first reminder screen 250 includes an icon 251 that shows which portions of the patient support system 10 should not be supporting items not supported when the scale system 18 was last zeroed as shown in FIG. 10B. The icon 251 includes an illustration 252 of the patient support system 10 with the deck 36, the siderails 38, and the headrails 40 in yellow to indicate that these components will be weighed with the patient. The illustration 252 also includes a green hook 253 shown coupled to the upper frame 44 of the patient support apparatus 12. The icon 251 further includes an arrow 254 suggesting that drainage bags (not shown) hung on the yellow components be moved to the green hook 253. A user can then press a continue button 259 to display a new weight screen 260 shown in FIG. 11B.

The new weight screen 260 includes a weight display 262 and an initial weight display 264 as shown in FIG. 11B. A user can reweigh the patient using a reweigh button 265 or cancel recording of the patient weight using a cancel button 267. If a user is satisfied with the current weight detected and recorded by the scale system 18, the user can press an accept button 266 to display a second reminder screen 270 as shown in FIG. 12B. The second reminder screen 270 is similar to the first reminder screen 250 but suggests that the user put items back on the deck 36 and moves drainage bags back to deck hooks via an arrow 274. The user can then press a close button 279 to return to the home screen 200.

Referring now to FIGS. 13B-16B, screens associated with a user operating the air system 20 and rotation bladders 24 to provide lateral rotation therapy is shown. In FIG. 13B, the home screen 200 is shown with a user pressing a pulmonary therapy button 310 included in the menu 208. Once the pulmonary therapy button 310 is pressed, the control system 16 displays a main therapy screen 320 on the user interface 25 as shown in FIG. 14B. The main therapy screen includes a rotation button 322 and a percussion and vibration therapy button 324 as shown in FIG. 14B. A user pressing the rotation button 322 will advance to a rotation therapy screen 330 as shown in FIG. 15B.

On the rotation therapy screen 330, a user can adjust the rate, magnitude of the rotation, and duration of therapy that will be applied to a patient as suggested in FIG. 15B. Once a set of parameters are selected, a user can press a start button 332 to begin lateral rotation therapy. However, if the patient support apparatus is not in one of a set of predetermined positions in which the rotation bladders 24 are arranged to properly rotate a patient, a could not start CLRT screen 340 will be displayed on the user interface 25 as shown in FIG. 16B.

The could not start CLRT screen 340 illustratively includes a graphic icon 341 that indicates which components of the patient support apparatus 12 are causing the out of position fault and indicates how to rearrange the patient support apparatus 12 to be in one of the predetermined positions that would the therapy to be applied. The icon 341 includes an illustration 342 of the patient support system 10, fault indicators 343, 344, 345 showing components that are out of position, and directional indicators 346, 347, 348 showing how to move the components out of position into position to allow an accurate weight to be detected.

The fault indicators 343, 344, 345 are illustratively a head-section indicator 343, a foot-section indicator 344, and a siderail indicator 345 that are displayed in yellow to indicate that a corresponding component 46, 52, 38 is out of position as shown in FIG. 16B. When the components 46, 52, 38 are in a predetermined position that allows effective therapy to be applied, the corresponding fault indicator 343, 344, 345 is no longer colored.

The directional indicators 346, 347, 348 are illustratively a head-section arrow 346, a foot-section arrow 347, and a siderail arrow 348 as shown in FIG. 16B. Each arrow 346, 347, 348 indicates which direction to move the corresponding component 46, 52, 38 in order to get the component 46, 52, 38 into one of the predetermined set of positions that will allow therapy to be applied to a patient. When the components 46, 52, 38 are in a predetermined position that allows accurate weighing of a patient, the corresponding directional indicator 346, 347, 348 disappears. Once all indicators are cleared, a user can press a close button 349 to return to the rotation therapy screen 330 to start the therapy.

Referring now to FIGS. 17B-19B, a set of warning screens 410 are shown that are displayed by the control system 16 on the user interface if an obstruction is detected between the upper frame 44 and the lower frame 42. The warning screens 410 each include an icon 411 with an illustration 412 of the patient support system 10, a fault indicator 414, and a set of arrows 416. The fault indicator 414 of each icon 411 is associated with one of the head end 71, the foot end 72, the left side 73, and the right side 74 of the patient support system 10. A fault indicator 414 is arranged to indicate where obstructions between the lower frame 42 and the upper frame 44 are located so that a user can remove the obstruction to allow the upper frame 44 to be lowered relative to the lower frame 42. The arrows 416 overlie the fault indicators 414 to further indicate where the obstruction is located.

The warning screens 410 are illustratively displayed when a user tries to lower the upper frame 44 toward the lower frame 42 and the obstruction sensor 49 detects an obstruction between the upper frame 44 and the lower frame 42. By indicating to a user where an obstruction is located, the user can quickly clear the obstruction to allow lowering of the upper frame 44. This feature may be helpful when nuisance obstructions such as bed sheets trigger the obstruction sensor 49 and prevent lowering of the upper frame 44.

Although certain illustrative embodiments have been described in detail above, variations and modifications exist within the scope and spirit of this disclosure as described and as defined in the following claims.

What is claimed is:

1. A patient support system comprising a support surface including a plurality of inflatable bladders including a first bladder, an air source coupled to the plurality of bladders, a bleed valve coupled to the air source, the bleed valve configured to be selectively opened to connect the air source to atmosphere, a controller coupled to the air source and the bleed valve, the controller configured to open the bleed valve and to operate the air source to inflate the first bladder by inflating the first bladder to a therapy pressure at an inflation rate slower than if the bleed valve was closed in response to receiving a therapy request, wherein the first bladder comprises a right-turn inflatable cell, the plurality of bladders includes a second bladder that comprises a left-turn inflatable cell, the air source is configured to actively inflate and actively deflate the right-turn inflatable cell and the left-turn inflatable cell, and the controller is configured to open the bleed valve and to operate the air source to actively deflate the right-turn inflatable cell during the application of a lateral rotation therapy in which the controller operates the air source to actively inflate the right-turn inflatable cell and the left-turn inflatable cell to rotate a patient about a longitudinal axis of the support surface, and a valve box coupled to the right-turn inflatable cell and configured to selectively couple the right-turn inflatable cell to the atmosphere to passively deflate the right-turn inflatable cell, wherein the controller is coupled to the valve box, and the controller is configured to operate the valve box to couple the right-turn inflatable cell to the atmosphere to passively deflate the right-turn inflatable cell.

2. The patient support system of claim 1, wherein the valve box is coupled to each of the plurality of bladders and configured to selectively couple one or more of the plurality of bladders to the atmosphere in addition to the first bladder.

3. The patient support system of claim 2, wherein the controller is configured to operate the valve box to couple the one or more plurality of bladders to the atmosphere after the first bladder is inflated to the therapy pressure so that the plurality of bladders deflates.

4. The patient support system of claim 3, wherein the controller is configured to open the bleed valve and to operate the air source to inflate a second bladder of the plurality of bladders to inflate the second bladder to a second therapy pressure at an inflation rate slower than if the bleed valve was closed in response to receiving a therapy request.

5. The patient support system of claim 4, wherein the controller is configured to operate the valve box to couple the second bladder to the atmosphere after the second bladder is inflated to the second therapy pressure so that the second bladder deflates.

6. The patient support system of claim 1, wherein the controller is configured to close the bleed valve in response to the first bladder reaching the therapy pressure.

7. The patient support system of claim 1, wherein the valve box is situated within the support surface and wherein the bleed valve is located outside the support surface and is coupled pneumatically between the support surface and the air source.

8. The patient support system of claim 1, wherein the controller is configured to operate the valve box to stop deflation of the plurality of bladders in response to the plurality of bladders reaching a baseline pressure established prior to inflation of the first bladder to the therapy pressure.

9. The patient support system of claim 1, wherein the controller is configured to operate the valve box to couple the right-turn inflatable cell to the atmosphere to passively deflate the right-turn inflatable cell before opening the bleed valve and operating the air source to actively deflate the right-turn inflatable cell.

10. The patient support system of claim 1, wherein the right-turn inflatable cell includes a right head-turn bladder arranged to underlie the right side of a patient torso when a patient is supported on the support surface and a right seat-turn bladder arranged to underlie a right side of a patient's seat when a patient is supported on the support surface.

11. The patient support system of claim 10, wherein the right head-turn bladder is pneumatically coupled to the right seat-turn bladder and is moveable away from the right seat-turn bladder.

12. The patient support system of claim 1, wherein the controller is configured to open the bleed valve and to operate the air source to actively deflate the right-turn inflatable cell.

13. A patient support system comprising a support surface including a plurality of inflatable bladders including a first bladder, an air source coupled to the plurality of bladders, a bleed valve coupled to the air source, the bleed valve configured to be selectively opened to connect the air source to atmosphere, and a controller coupled to the air source and the bleed valve, the controller configured to open the bleed valve and to operate the air source to inflate the first bladder by inflating the first bladder to a therapy pressure at an inflation rate slower than if the bleed valve was closed in response to receiving a therapy request, wherein the first bladder comprises a right-turn inflatable cell, the plurality of bladders includes a second bladder that comprises a left-turn inflatable cell, the air source is configured to actively inflate and actively deflate the right-turn inflatable cell and the left-turn inflatable cell, and the controller is configured to open the bleed valve and to operate the air source to actively deflate the right-turn inflatable cell during the application of a lateral rotation therapy in which the controller operates the air source to actively inflate the right-turn inflatable cell and the left-turn inflatable cell to rotate a patient about a longitudinal axis of the support surface, and a valve box coupled to the left-turn inflatable cell and configured to selectively couple the left-turn inflatable cell to the atmosphere to passively deflate the left-turn inflatable cell, wherein the controller is coupled to the valve box, and the controller is configured to operate the valve box to couple the left-turn inflatable cell to the atmosphere to passively deflate the left-turn inflatable cell.

14. The patient support system of claim 13, wherein the controller is configured to open the bleed valve and to operate the air source to actively deflate the left-turn inflatable cell.

15. The patient support system of claim 13, wherein the controller is configured to operate the valve box to couple the left-turn inflatable cell to the atmosphere before opening the bleed valve and operating the air source to actively deflate the left-turn inflatable cell.

16. The patient support system of claim 13, wherein the left-turn inflatable cell includes a left head-turn bladder arranged to underlie the left side of a patient torso when a patient is supported on the support surface and a left seat-turn bladder arranged to underlie a left side of a patient's seat when a patient is supported on the support surface.

17. The patient support system of claim 16, wherein the left head-turn bladder is pneumatically coupled to the left seat-turn bladder and is moveable away from the left seat-turn bladder.

18. The patient support system of claim 13, wherein the valve box is coupled to each of the plurality of bladders and configured to selectively couple one or more of the plurality of bladders to the atmosphere in addition to the second bladder.

19. The patient support system of claim 18, wherein the controller is configured to operate the valve box to couple the one or more plurality of bladders to the atmosphere after the second bladder is inflated to the therapy pressure so that the plurality of bladders deflates.

20. The patient support system of claim 13, wherein the controller is configured to operate the valve box to stop deflation of the plurality of bladders in response to the plurality of bladders reaching a baseline pressure established prior to inflation of the first bladder to the therapy pressure.

* * * * *